US007979856B2

(12) United States Patent
Murray et al.

(10) Patent No.: US 7,979,856 B2
(45) Date of Patent: Jul. 12, 2011

(54) NETWORK-BASED SOFTWARE EXTENSIONS

(75) Inventors: Michael C. Murray, Kirkland, WA (US); Paul R. Erickson, Sammamish, WA (US); Oliver G. Fisher, Ottawa (CA); Suryanarayanan V. Raman, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 886 days.

(21) Appl. No.: 11/218,149

(22) Filed: Sep. 1, 2005

(65) Prior Publication Data

US 2005/0289535 A1 Dec. 29, 2005

Related U.S. Application Data

(63) Continuation of application No. 09/599,048, filed on Jun. 21, 2000, now Pat. No. 7,000,230.

(51) Int. Cl.
*G06F 9/44* (2006.01)

(52) U.S. Cl. ........................................ 717/173; 717/178

(58) Field of Classification Search ........................ None
See application file for complete search history.

(56) References Cited

U.S. PATENT DOCUMENTS

| | | | |
|---|---|---|---|
| 2,804,878 | A | 9/1957 | Fishwood et al. |
| 3,091,077 | A | 5/1963 | Erickson et al. |
| 3,104,520 | A | 9/1963 | Cazier et al. |
| 3,195,805 | A | 7/1965 | Cholvin et al. |
| 3,196,606 | A | 7/1965 | Cholvin et al. |
| 3,812,942 | A | 5/1974 | Espenschied et al. |
| 3,874,828 | A | 4/1975 | Herschler et al. |
| 3,961,748 | A | 6/1976 | McNabney |
| 4,005,578 | A | 2/1977 | McNabney |
| 4,005,579 | A | 2/1977 | Lloyd |
| 4,060,340 | A | 11/1977 | Yanik et al. |
| 4,089,623 | A | 5/1978 | Hofmann, Jr. |
| 4,201,978 | A | 5/1980 | Nally |
| 4,256,019 | A | 3/1981 | Braddick |
| 4,362,475 | A | 12/1982 | Seitz |
| 4,391,184 | A | 7/1983 | Yamane et al. |
| 4,396,345 | A | 8/1983 | Hutchinson |
| 4,498,147 | A | 2/1985 | Agnew et al. |
| 4,514,800 | A | 4/1985 | Gruner et al. |
| 4,514,985 | A | 5/1985 | Cadeddu |

(Continued)

FOREIGN PATENT DOCUMENTS

CN 1536483 10/2004

(Continued)

OTHER PUBLICATIONS

Laura Acklen & Read Gilgen, "Using Corel Wordperfect 9", 251-284, 424-434, 583-586 (1998).

(Continued)

*Primary Examiner* — Michael J Yigdall

(57) ABSTRACT

Methods and systems for network-based or Internet-based software delivery are described. In one embodiment, an application program or software platform resides on a client. The program or platform is configured so that it is extensible based on software extensions that are deliverable over a network such as the Internet. In the described embodiment, extension files that comprise a software extension are hosted on an Internet server. Additional files are also hosted on the Internet server and describe aspects of the software extension. Extensions are incorporated on a client by navigating to a particular Internet site through which the extensions can be accessed. The files describing the extension files are downloaded on the client. The extension files are then downloaded and incorporated into the program or platform.

20 Claims, 16 Drawing Sheets

U.S. PATENT DOCUMENTS

| | | | | | |
|---|---|---|---|---|---|
| 4,564,752 | A | | 1/1986 | Lepic et al. | |
| 4,641,274 | A | | 2/1987 | Swank | |
| 4,674,040 | A | | 6/1987 | Barker et al. | |
| 4,723,211 | A | | 2/1988 | Barker et al. | |
| 4,739,477 | A | | 4/1988 | Barker et al. | |
| 4,815,029 | A | | 3/1989 | Barker et al. | |
| 4,847,749 | A | | 7/1989 | Collins et al. | |
| 4,910,663 | A | | 3/1990 | Bailey | |
| 4,926,476 | A | | 5/1990 | Covey | |
| 4,933,880 | A | | 6/1990 | Borgendale et al. | |
| 4,962,475 | A | | 10/1990 | Hernandez et al. | |
| 5,025,484 | A | | 6/1991 | Yamanari et al. | |
| 5,072,412 | A | | 12/1991 | Henderson, Jr. et al. | |
| 5,140,563 | A | | 8/1992 | Thinesen | |
| 5,179,703 | A | | 1/1993 | Evans | |
| 5,182,709 | A | | 1/1993 | Makus | |
| 5,187,786 | A | | 2/1993 | Densmore et al. | |
| 5,191,645 | A | | 3/1993 | Carlucci et al. | |
| 5,195,183 | A | | 3/1993 | Miller et al. | |
| 5,204,947 | A | | 4/1993 | Bernstein et al. | |
| 5,206,951 | A | | 4/1993 | Khoyi et al. | |
| 5,218,672 | A | | 6/1993 | Morgan et al. | |
| 5,220,649 | A | | 6/1993 | Forcier | |
| 5,222,160 | A | | 6/1993 | Sakai et al. | |
| 5,228,100 | A | | 7/1993 | Takeda et al. | |
| 5,237,680 | A | | 8/1993 | Adams et al. | |
| 5,249,275 | A | | 9/1993 | Srivastava | |
| 5,251,273 | A | | 10/1993 | Betts et al. | |
| 5,257,646 | A | | 11/1993 | Meyer | |
| 5,274,803 | A | | 12/1993 | Dubin et al. | |
| 5,297,249 | A | | 3/1994 | Bernstein et al. | |
| 5,297,283 | A | | 3/1994 | Kelly, Jr. et al. | |
| 5,313,631 | A | | 5/1994 | Kao | |
| 5,313,646 | A | | 5/1994 | Hendricks et al. | |
| 5,317,686 | A | | 5/1994 | Salas et al. | |
| 5,333,317 | A | | 7/1994 | Dann | |
| 5,339,423 | A | | 8/1994 | Beitel et al. | |
| 5,339,424 | A | | 8/1994 | Fushimi | |
| 5,341,478 | A | | 8/1994 | Travis, Jr. et al. | |
| 5,369,766 | A | | 11/1994 | Nakano et al. | |
| 5,369,778 | A | | 11/1994 | San Soucie et al. | |
| 5,371,675 | A | | 12/1994 | Greif et al. | |
| 5,377,323 | A | | 12/1994 | Vasudevan | |
| 5,379,419 | A | | 1/1995 | Heffeman et al. | |
| 5,381,547 | A | | 1/1995 | Flug et al. | |
| 5,388,967 | A | | 2/1995 | Firnhaber et al. | |
| 5,388,968 | A | | 2/1995 | Wood et al. | |
| 5,390,325 | A | | 2/1995 | Miller | |
| 5,396,623 | A | | 3/1995 | McCall et al. | |
| 5,408,665 | A | | 4/1995 | Fitzgerald | |
| 5,410,646 | A | | 4/1995 | Tondevold et al. | |
| 5,410,688 | A | | 4/1995 | Williams et al. | |
| 5,412,772 | A | | 5/1995 | Monson | |
| 5,428,738 | A | | 6/1995 | Carter et al. | |
| 5,434,975 | A | | 7/1995 | Allen | |
| 5,436,637 | A | | 7/1995 | Gayraud et al. | |
| 5,438,659 | A | | 8/1995 | Notess et al. | |
| 5,440,744 | A | | 8/1995 | Jacobson et al. | |
| 5,446,842 | A | | 8/1995 | Schaeffer et al. | |
| 5,455,875 | A | | 10/1995 | Chevion et al. | |
| 5,456,582 | A | | 10/1995 | Firnhaber et al. | |
| 5,459,865 | A | | 10/1995 | Heninger et al. | |
| 5,481,722 | A | | 1/1996 | Skinner | |
| 5,497,489 | A | | 3/1996 | Menne | |
| 5,504,898 | A | | 4/1996 | Klein | |
| 5,517,655 | A | | 5/1996 | Collins et al. | |
| 5,535,389 | A | | 7/1996 | Elder et al. | |
| 5,537,596 | A | | 7/1996 | Yu et al. | |
| 5,540,558 | A | | 7/1996 | Harden et al. | |
| 5,542,070 | A | | 7/1996 | LeBlanc et al. | |
| 5,550,976 | A | | 8/1996 | Henderson et al. | |
| 5,551,035 | A | | 8/1996 | Arnold et al. | |
| 5,555,325 | A | | 9/1996 | Burger | |
| 5,556,271 | A | | 9/1996 | Zuercher et al. | |
| 5,566,330 | A | | 10/1996 | Sheffield | |
| 5,572,643 | A | | 11/1996 | Judson | |
| 5,572,648 | A | | 11/1996 | Bibayan | |
| 5,577,252 | A | | 11/1996 | Nelson et al. | |
| 5,581,686 | A | | 12/1996 | Koppolu et al. | |
| 5,581,760 | A | | 12/1996 | Atkinson et al. | |
| 5,600,789 | A | | 2/1997 | Parker et al. | |
| 5,602,996 | A | | 2/1997 | Powers, III et al. | |
| 5,608,720 | A | | 3/1997 | Biegel et al. | |
| 5,613,837 | A | | 3/1997 | Konishi et al. | |
| 5,625,783 | A | | 4/1997 | Ezekiel et al. | |
| 5,627,979 | A | | 5/1997 | Chang et al. | |
| 5,630,126 | A | | 5/1997 | Redpath | |
| 5,630,706 | A | | 5/1997 | Yang | |
| 5,634,113 | A | | 5/1997 | Rusterholz | |
| 5,634,121 | A | | 5/1997 | Tracz et al. | |
| 5,634,124 | A | | 5/1997 | Khoyi et al. | |
| 5,640,544 | A | | 6/1997 | Onodera et al. | |
| 5,644,738 | A | | 7/1997 | Goldman et al. | |
| 5,649,099 | A | | 7/1997 | Theimer et al. | |
| 5,655,887 | A | | 8/1997 | Chou | |
| 5,659,729 | A | | 8/1997 | Nielsen | |
| 5,664,133 | A | | 9/1997 | Malamud et al. | |
| 5,664,178 | A | | 9/1997 | Sinofsky | |
| 5,664,938 | A | | 9/1997 | Yang | |
| 5,668,966 | A | | 9/1997 | Ono et al. | |
| 5,669,005 | A | | 9/1997 | Curbow et al. | |
| 5,681,151 | A | | 10/1997 | Wood | |
| 5,682,536 | A | | 10/1997 | Atkinson et al. | |
| 5,689,667 | A | | 11/1997 | Kurtenbach | |
| 5,689,703 | A | | 11/1997 | Atkinson et al. | |
| 5,692,540 | A | | 12/1997 | Huang | |
| 5,704,029 | A | | 12/1997 | Wright, Jr. | |
| 5,706,501 | A | | 1/1998 | Horikiri et al. | |
| 5,717,939 | A | | 2/1998 | Bricklin et al. | |
| 5,721,824 | A | | 2/1998 | Taylor | |
| 5,740,439 | A | | 4/1998 | Atkinson et al. | |
| 5,742,504 | A | | 4/1998 | Meyer et al. | |
| 5,745,683 | A | | 4/1998 | Lee et al. | |
| 5,745,712 | A | | 4/1998 | Turpin et al. | |
| 5,748,807 | A | | 5/1998 | Lopresti et al. | |
| 5,758,184 | A | | 5/1998 | Lucovsky et al. | |
| 5,758,358 | A | | 5/1998 | Ebbo | |
| 5,761,408 | A | | 6/1998 | Kolawa et al. | |
| 5,761,683 | A | | 6/1998 | Logan et al. | |
| 5,764,984 | A | | 6/1998 | Loucks | |
| 5,764,985 | A | | 6/1998 | Smale | |
| 5,778,372 | A | | 7/1998 | Cordell et al. | |
| 5,778,402 | A | | 7/1998 | Gipson | |
| 5,784,555 | A | | 7/1998 | Stone | |
| 5,785,081 | A | | 7/1998 | Krawczyk et al. | |
| 5,787,274 | A | | 7/1998 | Agrawal et al. | |
| 5,790,796 | A | | 8/1998 | Sadowsky | |
| 5,798,757 | A | | 8/1998 | Smith | |
| 5,799,311 | A | | 8/1998 | Agrawal et al. | |
| 5,801,701 | A | | 9/1998 | Koppolu et al. | |
| 5,802,304 | A | | 9/1998 | Stone | |
| 5,803,715 | A | | 9/1998 | Kitchener | |
| 5,806,079 | A | | 9/1998 | Rivette et al. | |
| 5,815,830 | A | | 9/1998 | Anthony | |
| 5,819,034 | A | | 10/1998 | Joseph et al. | |
| 5,826,031 | A | * | 10/1998 | Nielsen ......................... | 709/233 |
| 5,826,265 | A | | 10/1998 | Van Huben et al. | |
| 5,835,777 | A | | 11/1998 | Staelin | |
| 5,838,906 | A | | 11/1998 | Doyle et al. | |
| 5,842,018 | A | | 11/1998 | Atkinson et al. | |
| 5,845,077 | A | | 12/1998 | Fawcett | |
| 5,845,090 | A | | 12/1998 | Collins, III et al. | |
| 5,845,122 | A | | 12/1998 | Nielsen et al. | |
| 5,854,630 | A | | 12/1998 | Nielsen | |
| 5,859,973 | A | | 1/1999 | Carpenter et al. | |
| 5,862,372 | A | | 1/1999 | Morris et al. | |
| 5,862,379 | A | | 1/1999 | Rubin et al. | |
| 5,864,819 | A | | 1/1999 | De Armas et al. | |
| 5,870,735 | A | | 2/1999 | Agrawal et al. | |
| 5,873,088 | A | | 2/1999 | Hayashi et al. | |
| 5,875,815 | A | | 3/1999 | Ungerecht et al. | |
| 5,905,492 | A | | 5/1999 | Straub et al. | |
| 5,907,621 | A | | 5/1999 | Bachman et al. | |
| 5,907,704 | A | | 5/1999 | Gudmundson et al. | |
| 5,910,895 | A | | 6/1999 | Proskauer et al. | |
| 5,911,776 | A | | 6/1999 | Guck | |
| 5,915,112 | A | | 6/1999 | Boutcher | |

| | | | |
|---|---|---|---|
| 5,919,247 | A * | 7/1999 | Van Hoff et al. .............. 709/217 |
| 5,922,072 | A | 7/1999 | Hutchinson et al. |
| 5,926,796 | A | 7/1999 | Walker et al. |
| 5,928,363 | A | 7/1999 | Ruvolo |
| 5,929,858 | A | 7/1999 | Shibata et al. |
| RE36,281 | E | 8/1999 | Zuercher et al. |
| 5,940,075 | A | 8/1999 | Mutschler, III et al. |
| 5,947,711 | A | 9/1999 | Myers et al. |
| 5,950,010 | A | 9/1999 | Hesse et al. |
| 5,950,221 | A | 9/1999 | Draves et al. |
| 5,953,731 | A | 9/1999 | Glaser |
| 5,956,481 | A | 9/1999 | Walsh et al. |
| 5,960,199 | A | 9/1999 | Brodsky et al. |
| 5,960,411 | A | 9/1999 | Hartman et al. |
| 5,963,964 | A | 10/1999 | Nielsen |
| 5,973,696 | A | 10/1999 | Agranat et al. |
| 5,974,454 | A | 10/1999 | Apfel et al. |
| 5,982,370 | A | 11/1999 | Kamper |
| 5,983,348 | A | 11/1999 | Ji |
| 5,987,480 | A | 11/1999 | Donohue et al. |
| 5,991,710 | A | 11/1999 | Papineni et al. |
| 5,991,731 | A | 11/1999 | Colon et al. |
| 5,991,877 | A | 11/1999 | Luckenbaugh |
| 5,995,103 | A | 11/1999 | Ashe |
| 5,999,740 | A | 12/1999 | Rowley |
| 6,005,570 | A | 12/1999 | Gayraud et al. |
| 6,006,227 | A | 12/1999 | Freeman et al. |
| 6,006,241 | A | 12/1999 | Purnaveja et al. |
| 6,012,066 | A | 1/2000 | Discount et al. |
| 6,014,135 | A | 1/2000 | Fernandes |
| 6,016,520 | A | 1/2000 | Facq et al. |
| 6,018,743 | A | 1/2000 | Xu |
| 6,021,403 | A | 2/2000 | Horvitz et al. |
| 6,026,379 | A | 2/2000 | Haller et al. |
| 6,026,416 | A | 2/2000 | Kanerva et al. |
| 6,031,989 | A | 2/2000 | Cordell et al. |
| 6,035,297 | A | 3/2000 | Van Huben et al. |
| 6,035,309 | A | 3/2000 | Dauerer et al. |
| 6,035,336 | A | 3/2000 | Lu et al. |
| 6,044,205 | A | 3/2000 | Reed et al. |
| 6,052,531 | A | 4/2000 | Waldin et al. |
| 6,052,710 | A | 4/2000 | Saliba et al. |
| 6,054,987 | A | 4/2000 | Richardson |
| 6,057,837 | A | 5/2000 | Hatakeda et al. |
| 6,058,413 | A | 5/2000 | Flores et al. |
| 6,065,043 | A | 5/2000 | Domenikos et al. |
| 6,069,626 | A | 5/2000 | Cline et al. |
| 6,070,184 | A | 5/2000 | Blount et al. |
| 6,072,870 | A | 6/2000 | Nguyen et al. |
| 6,078,326 | A | 6/2000 | Kilmer et al. |
| 6,078,327 | A | 6/2000 | Liman et al. |
| 6,078,924 | A | 6/2000 | Ainsbury et al. |
| 6,081,610 | A | 6/2000 | Dwork et al. |
| 6,084,585 | A | 7/2000 | Kraft et al. |
| 6,088,679 | A | 7/2000 | Barkley |
| 6,088,708 | A | 7/2000 | Burch et al. |
| 6,091,417 | A | 7/2000 | Lefkowitz |
| 6,094,657 | A | 7/2000 | Hailpern et al. |
| 6,096,096 | A | 8/2000 | Murphy et al. |
| 6,097,382 | A | 8/2000 | Rosen et al. |
| 6,098,081 | A | 8/2000 | Heidorn et al. |
| 6,105,012 | A | 8/2000 | Chang et al. |
| 6,106,570 | A | 8/2000 | Mizuhara |
| 6,108,637 | A | 8/2000 | Blumenau |
| 6,108,783 | A | 8/2000 | Kraweyzk et al. |
| 6,115,646 | A | 9/2000 | Fiszman et al. |
| 6,121,965 | A | 9/2000 | Kenney et al. |
| 6,122,647 | A | 9/2000 | Horowitz et al. |
| 6,144,969 | A | 11/2000 | Inokuchi et al. |
| 6,151,624 | A | 11/2000 | Teare et al. |
| 6,154,128 | A | 11/2000 | Wookey et al. |
| 6,163,772 | A | 12/2000 | Kramer et al. |
| 6,167,521 | A | 12/2000 | Smith et al. |
| 6,167,523 | A | 12/2000 | Strong |
| 6,178,551 | B1 | 1/2001 | Sana et al. |
| 6,182,094 | B1 | 1/2001 | Humpleman et al. |
| 6,182,095 | B1 | 1/2001 | Leymaster et al. |
| 6,188,401 | B1 | 2/2001 | Peyer |
| 6,191,797 | B1 | 2/2001 | Politis |

| | | | |
|---|---|---|---|
| 6,192,367 | B1 | 2/2001 | Hawley et al. |
| 6,195,661 | B1 | 2/2001 | Filepp et al. |
| 6,199,204 | B1 | 3/2001 | Donohue |
| 6,209,128 | B1 | 3/2001 | Gerard et al. |
| 6,216,152 | B1 | 4/2001 | Wong et al. |
| 6,219,423 | B1 | 4/2001 | Davis |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,243,088 | B1 | 6/2001 | McCormack et al. |
| 6,247,016 | B1 | 6/2001 | Rastogi et al. |
| 6,253,366 | B1 | 6/2001 | Mutschler, III |
| 6,253,374 | B1 | 6/2001 | Drsevie et al. |
| 6,263,313 | B1 | 7/2001 | Milsted et al. |
| 6,266,810 | B1 | 7/2001 | Tanaka et al. |
| 6,268,852 | B1 | 7/2001 | Lindhorst et al. |
| 6,272,506 | B1 | 8/2001 | Bell |
| 6,275,227 | B1 | 8/2001 | DeStefano |
| 6,275,599 | B1 | 8/2001 | Adler et al. |
| 6,279,042 | B1 | 8/2001 | Ouchi |
| 6,281,896 | B1 | 8/2001 | Alimpich et al. |
| 6,282,709 | B1 * | 8/2001 | Reha et al. .................... 717/175 |
| 6,282,711 | B1 | 8/2001 | Halpern et al. |
| 6,286,033 | B1 | 9/2001 | Kishinsky et al. |
| 6,286,130 | B1 | 9/2001 | Poulsen et al. |
| 6,292,897 | B1 | 9/2001 | Gennaro et al. |
| 6,292,941 | B1 | 9/2001 | Jollands |
| 6,297,819 | B1 | 10/2001 | Furst |
| 6,300,948 | B1 | 10/2001 | Geller et al. |
| 6,307,955 | B1 | 10/2001 | Zank et al. |
| 6,308,179 | B1 | 10/2001 | Petersen et al. |
| 6,308,273 | B1 | 10/2001 | Goertzel et al. |
| 6,311,221 | B1 | 10/2001 | Raz et al. |
| 6,311,271 | B1 | 10/2001 | Gennaro et al. |
| 6,314,415 | B1 | 11/2001 | Mukherjee |
| 6,321,259 | B1 | 11/2001 | Ouellette et al. |
| 6,321,334 | B1 | 11/2001 | Jerger et al. |
| 6,327,628 | B1 | 12/2001 | Anuff et al. |
| 6,331,864 | B1 | 12/2001 | Coco et al. |
| 6,336,214 | B1 | 1/2002 | Sundaresan |
| 6,336,797 | B1 | 1/2002 | Kazakis et al. |
| 6,342,907 | B1 | 1/2002 | Petty et al. |
| 6,343,149 | B1 | 1/2002 | Motoiwa |
| 6,343,302 | B1 | 1/2002 | Graham |
| 6,343,377 | B1 * | 1/2002 | Gessner et al. ............... 717/171 |
| 6,344,862 | B1 | 2/2002 | Williams et al. |
| 6,345,256 | B1 | 2/2002 | Milsted et al. |
| 6,345,278 | B1 | 2/2002 | Hitchcock et al. |
| 6,345,361 | B1 | 2/2002 | Jerger et al. |
| 6,347,323 | B1 | 2/2002 | Garber et al. |
| 6,349,408 | B1 | 2/2002 | Smith |
| 6,351,574 | B1 | 2/2002 | Yair et al. |
| 6,353,851 | B1 | 3/2002 | Anupam et al. |
| 6,353,926 | B1 | 3/2002 | Parthesarathy et al. |
| 6,356,906 | B1 | 3/2002 | Lippert et al. |
| 6,357,038 | B1 | 3/2002 | Scouten |
| 6,366,907 | B1 | 4/2002 | Fanning et al. |
| 6,366,912 | B1 | 4/2002 | Wallent et al. |
| 6,367,013 | B1 | 4/2002 | Bisbee et al. |
| 6,369,840 | B1 | 4/2002 | Barnett et al. |
| 6,369,841 | B1 | 4/2002 | Salomon et al. |
| 6,374,402 | B1 | 4/2002 | Schmeidler et al. |
| 6,381,742 | B2 | 4/2002 | Forbes et al. |
| 6,381,743 | B1 | 4/2002 | Mutschier, III |
| 6,385,767 | B1 | 5/2002 | Ziebell |
| 6,389,434 | B1 | 5/2002 | Rivette et al. |
| 6,393,456 | B1 | 5/2002 | Ambler et al. |
| 6,393,469 | B1 | 5/2002 | Dozier et al. |
| 6,396,488 | B1 | 5/2002 | Simmons et al. |
| 6,397,264 | B1 | 5/2002 | Stasnick et al. |
| 6,401,077 | B1 | 6/2002 | Godden et al. |
| 6,405,221 | B1 | 6/2002 | Levine et al. |
| 6,405,238 | B1 | 6/2002 | Votipka |
| 6,408,311 | B1 | 6/2002 | Baisley et al. |
| 6,414,700 | B1 | 7/2002 | Kurtenbach et al. |
| 6,421,070 | B1 | 7/2002 | Ramos et al. |
| 6,421,656 | B1 | 7/2002 | Cheng et al. |
| 6,421,777 | B1 | 7/2002 | Pierre-Louis |
| 6,425,125 | B1 | 7/2002 | Fries et al. |

6,427,142 B1 7/2002 Zachary et al.
6,429,885 B1 8/2002 Saib et al.
6,434,563 B1 8/2002 Pasquali et al.
6,434,564 B2 8/2002 Ebert
6,434,743 B1 8/2002 Click et al.
6,442,563 B1 8/2002 Bacon et al.
6,442,755 B1 8/2002 Lemmons et al.
6,446,110 B1 9/2002 Lection et al.
6,449,617 B1 9/2002 Quinn et al.
6,457,009 B1 9/2002 Bollay
6,460,058 B2 10/2002 Koppolu et al.
6,463,419 B1 10/2002 Kluss
6,470,349 B1 10/2002 Heninger et al.
6,473,800 B1 10/2002 Jerger et al.
6,476,828 B1 11/2002 Burkett et al.
6,476,833 B1 11/2002 Moshfeghi
6,477,544 B1 11/2002 Bolosky et al.
6,480,860 B1 11/2002 Monday
6,487,566 B1 11/2002 Sundaresan
6,490,601 B1 12/2002 Markus et al.
6,493,006 B1 12/2002 Gourdol et al.
6,493,007 B1 12/2002 Pang
6,493,702 B1 12/2002 Adar et al.
6,501,864 B1 12/2002 Eguchi et al.
6,502,101 B1 12/2002 Verprauskus et al.
6,502,103 B1 12/2002 Frey et al.
6,505,200 B1 1/2003 Ims et al.
6,505,230 B1 1/2003 Mohan et al.
6,505,300 B2 1/2003 Chan et al.
6,505,344 B1 1/2003 Blais et al.
6,507,856 B1 1/2003 Chen et al.
6,513,154 B1 1/2003 Porterfield
6,516,322 B1 2/2003 Meredith
6,519,617 B1 2/2003 Wanderski et al.
6,523,027 B1 2/2003 Underwood
6,529,909 B1 3/2003 Bowman-Amuah
6,535,229 B1 3/2003 Kraft
6,535,883 B1 3/2003 Lee et al.
6,539,464 B1 3/2003 Getov
RE38,070 E 4/2003 Spies et al.
6,546,546 B1 4/2003 Van Doorn
6,546,554 B1 * 4/2003 Schmidt et al. ............... 717/176
6,549,221 B1 4/2003 Brown et al.
6,549,878 B1 4/2003 Lowry et al.
6,549,922 B1 4/2003 Srivastava et al.
6,553,402 B1 4/2003 Makarios et al.
6,560,616 B1 5/2003 Garber
6,560,620 B1 5/2003 Ching
6,560,640 B2 5/2003 Smethers
6,563,514 B1 5/2003 Samar
6,571,253 B1 5/2003 Thompson et al.
6,578,144 B1 6/2003 Gennaro et al.
6,581,061 B2 6/2003 Graham
6,584,469 B1 6/2003 Chiang et al.
6,584,548 B1 6/2003 Bourne et al.
6,585,778 B1 7/2003 Hind et al.
6,589,290 B1 7/2003 Maxwell et al.
6,594,686 B1 7/2003 Edwards et al.
6,598,219 B1 7/2003 Lau
6,603,489 B1 8/2003 Edlund et al.
6,604,099 B1 8/2003 Chung et al.
6,604,238 B1 8/2003 Lim et al.
6,606,606 B2 8/2003 Starr
6,609,200 B2 8/2003 Anderson et al.
6,611,812 B2 8/2003 Hurtado et al.
6,611,822 B1 8/2003 Beams et al.
6,611,840 B1 8/2003 Baer et al.
6,611,843 B1 8/2003 Jacobs
6,613,098 B1 9/2003 Sorge et al.
6,615,276 B1 9/2003 Mastrianni et al.
6,625,622 B1 9/2003 Henrickson et al.
6,629,109 B1 9/2003 Koshisaka
6,631,357 B1 10/2003 Perkowski
6,631,379 B2 10/2003 Cox
6,631,497 B1 10/2003 Jamshidi et al.
6,631,519 B1 10/2003 Nicholson et al.
6,632,251 B1 10/2003 Rutten et al.
6,633,315 B1 10/2003 Sobeski et al.
6,635,089 B1 10/2003 Burkett et al.
6,636,845 B2 10/2003 Chau et al.
6,640,249 B1 10/2003 Bowman-Amuah
6,643,633 B2 11/2003 Chau et al.
6,643,652 B2 11/2003 Helgeson et al.
6,643,684 B1 11/2003 Malkin et al.
6,651,217 B1 11/2003 Kennedy et al.
6,654,737 B1 11/2003 Nunez
6,654,932 B1 11/2003 Bahrs et al.
6,658,417 B1 12/2003 Stakutis et al.
6,658,622 B1 12/2003 Aiken et al.
6,658,652 B1 12/2003 Alexander et al.
6,661,920 B1 12/2003 Skinner
6,668,369 B1 12/2003 Krebs et al.
6,671,805 B1 12/2003 Brown et al.
6,675,202 B1 1/2004 Perttunen
6,678,717 B1 1/2004 Schneider
6,681,370 B2 1/2004 Gounares et al.
6,691,230 B1 2/2004 Bardon
6,691,281 B1 2/2004 Sorge et al.
6,697,944 B1 2/2004 Jones et al.
6,701,434 B1 3/2004 Rohatgi
6,701,486 B1 3/2004 Weber et al.
6,704,906 B1 3/2004 Yankovich et al.
6,708,172 B1 3/2004 Wong et al.
6,711,679 B1 3/2004 Guski et al.
6,720,985 B1 4/2004 Lapstun et al.
6,725,426 B1 4/2004 Pavlov
6,728,755 B1 4/2004 de Ment
6,732,102 B1 5/2004 Khandekar et al.
6,735,721 B1 5/2004 Morrow et al.
6,745,367 B1 6/2004 Bates et al.
6,748,385 B1 6/2004 Rodkin
6,748,569 B1 6/2004 Brooke et al.
6,751,777 B2 6/2004 Bates et al.
6,754,874 B1 6/2004 Richman
6,757,826 B1 6/2004 Paltenghe
6,757,868 B1 6/2004 Glaser et al.
6,760,723 B2 7/2004 Oshinsky et al.
6,763,343 B1 7/2004 Brooke et al.
6,766,526 B1 7/2004 Ellis
6,772,139 B1 8/2004 Smith, III
6,772,165 B2 8/2004 O'Carroll
6,774,926 B1 8/2004 Ellis et al.
6,779,154 B1 8/2004 Nussbaum et al.
6,781,609 B1 8/2004 Barker et al.
6,782,144 B2 8/2004 Bellavita et al.
6,799,299 B1 9/2004 Li et al.
6,801,929 B1 10/2004 Donoho et al.
6,816,849 B1 11/2004 Halt, Jr.
6,823,478 B1 11/2004 Prologo et al.
6,828,992 B1 12/2004 Freeman et al.
6,829,745 B2 12/2004 Yassin et al.
6,845,380 B2 1/2005 Su et al.
6,845,499 B2 1/2005 Srivastava et al.
6,847,387 B2 1/2005 Roth
6,848,078 B1 1/2005 Birsan et al.
6,850,895 B2 2/2005 Brodersen et al.
6,862,689 B2 3/2005 Bergsten et al.
6,871,220 B1 3/2005 Rajan et al.
6,871,345 B1 * 3/2005 Crow et al. ................... 717/175
6,874,084 B1 3/2005 Dobner et al.
6,874,130 B1 3/2005 Baweja et al.
6,874,143 B1 3/2005 Murray
6,876,996 B2 4/2005 Czajkowski et al.
6,883,168 B1 4/2005 James et al.
6,885,748 B1 4/2005 Wang
6,889,359 B1 5/2005 Conner et al.
6,901,403 B1 5/2005 Bata et al.
6,915,454 B1 7/2005 Moore et al.
6,925,609 B1 8/2005 Lucke
6,931,532 B1 8/2005 Davis et al.
6,941,129 B2 9/2005 Marce et al.
6,941,510 B1 9/2005 Ozzie et al.
6,941,511 B1 9/2005 Hind et al.
6,941,521 B2 9/2005 Lin et al.
6,948,129 B1 9/2005 Loghmani
6,948,133 B2 9/2005 Haley
6,948,135 B1 9/2005 Ruthfield et al.
6,950,980 B1 9/2005 Malcolm

| | | | |
|---|---|---|---|
| 6,950,987 | B1 | 9/2005 | Hargraves et al. |
| 6,957,395 | B1 | 10/2005 | Jobs et al. |
| 6,961,897 | B1 | 11/2005 | Peel, Jr. et al. |
| 6,963,875 | B2 | 11/2005 | Moore et al. |
| 6,968,503 | B1 | 11/2005 | Chang et al. |
| 6,968,505 | B2 | 11/2005 | Stoll et al. |
| 6,993,714 | B2 | 1/2006 | Kaler et al. |
| 6,993,722 | B1 | 1/2006 | Greer et al. |
| 6,996,776 | B1 | 2/2006 | Makely et al. |
| 6,996,781 | B1 | 2/2006 | Myers et al. |
| 7,000,179 | B2 | 2/2006 | Yankovich et al. |
| 7,002,560 | B2 | 2/2006 | Graham |
| 7,003,548 | B1 | 2/2006 | Barck et al. |
| 7,003,722 | B2 | 2/2006 | Rothchiller et al. |
| 7,010,580 | B1 | 3/2006 | Fu et al. |
| 7,013,340 | B1 | 3/2006 | Burd et al. |
| 7,020,869 | B2 | 3/2006 | Abriari et al. |
| 7,024,417 | B1 | 4/2006 | Russakovsky et al. |
| 7,032,170 | B2 | 4/2006 | Poulose |
| 7,036,072 | B1 | 4/2006 | Sulistio et al. |
| 7,039,875 | B2 | 5/2006 | Khalfay et al. |
| 7,043,687 | B2 | 5/2006 | Knauss et al. |
| 7,051,273 | B1 | 5/2006 | Holt et al. |
| 7,058,645 | B2 | 6/2006 | Seto et al. |
| 7,058,663 | B2 | 6/2006 | Johnston et al. |
| 7,062,764 | B2 | 6/2006 | Cohen et al. |
| 7,065,493 | B1 | 6/2006 | Homsi |
| 7,076,728 | B2 | 7/2006 | Davis et al. |
| 7,080,083 | B2 | 7/2006 | Kim et al. |
| 7,080,325 | B2 | 7/2006 | Treibach-Heck et al. |
| 7,081,882 | B2 | 7/2006 | Sowden et al. |
| 7,086,009 | B2 | 8/2006 | Resnick et al. |
| 7,086,042 | B2 | 8/2006 | Abe et al. |
| 7,088,374 | B2 | 8/2006 | David et al. |
| 7,092,992 | B1 | 8/2006 | Yu |
| 7,100,147 | B2 | 8/2006 | Miller et al. |
| 7,103,611 | B2 | 9/2006 | Murthy et al. |
| 7,106,888 | B1 | 9/2006 | Silverbrook et al. |
| 7,107,282 | B1 | 9/2006 | Yalmanchi |
| 7,107,521 | B2 | 9/2006 | Santos |
| 7,107,522 | B1 | 9/2006 | Morgan et al. |
| 7,107,539 | B2 | 9/2006 | Abbott et al. |
| 7,120,863 | B1 | 10/2006 | Wang |
| 7,124,167 | B1 | 10/2006 | Bellotti et al. |
| 7,124,251 | B2 | 10/2006 | Clark et al. |
| 7,130,885 | B2 | 10/2006 | Chandra et al. |
| 7,143,341 | B1 | 11/2006 | Kohli |
| 7,146,564 | B2 | 12/2006 | Kim et al. |
| 7,152,027 | B2 | 12/2006 | Andrade et al. |
| 7,152,205 | B2 | 12/2006 | Day et al. |
| 7,159,011 | B1 | 1/2007 | Knight et al. |
| 7,168,035 | B1 | 1/2007 | Bell et al. |
| 7,178,166 | B1 | 2/2007 | Taylor et al. |
| 7,190,376 | B1 | 3/2007 | Tonisson |
| 7,191,394 | B1 | 3/2007 | Ardeleanu et al. |
| 7,197,515 | B2 | 3/2007 | Rivers-Moore et al. |
| 7,200,665 | B2 | 4/2007 | Eshghi et al. |
| 7,200,816 | B2 | 4/2007 | Falk et al. |
| 7,213,200 | B2 | 5/2007 | Abe et al. |
| 7,228,541 | B2 | 6/2007 | Gupton et al. |
| 7,234,105 | B2 | 6/2007 | Bezrukov et al. |
| 7,236,982 | B2 | 6/2007 | Zlatanov et al. |
| 7,237,114 | B1 | 6/2007 | Rosenberg |
| 7,249,328 | B1 | 7/2007 | Davis |
| 7,251,777 | B1 | 7/2007 | Valtchev et al. |
| 7,269,664 | B2 | 9/2007 | Hutsch et al. |
| 7,269,788 | B2 | 9/2007 | Gharavy |
| 7,272,789 | B2 | 9/2007 | O'Brien |
| 7,272,815 | B1 | 9/2007 | Eldridge |
| 7,275,216 | B2 | 9/2007 | Paoli et al. |
| 7,281,018 | B1 | 10/2007 | Begun et al. |
| 7,281,206 | B2 | 10/2007 | Schnelle et al. |
| 7,281,245 | B2 | 10/2007 | Reynar et al. |
| 7,284,208 | B2 | 10/2007 | Matthews |
| 7,287,218 | B1 | 10/2007 | Knotz et al. |
| 7,293,268 | B2 | 11/2007 | Masuda et al. |
| 7,296,017 | B2 | 11/2007 | Larcheveque et al. |
| 7,308,646 | B1 | 12/2007 | Cohen et al. |
| 7,313,757 | B2 | 12/2007 | Bradley et al. |
| 7,313,758 | B2 | 12/2007 | Kozlov |
| 7,316,003 | B1 | 1/2008 | Dulepet et al. |
| 7,318,237 | B2 | 1/2008 | Moriconi et al. |
| 7,334,187 | B1 | 2/2008 | Stanciu et al. |
| 7,337,391 | B2 | 2/2008 | Clarke et al. |
| 7,337,392 | B2 | 2/2008 | Lue |
| 7,346,610 | B2 | 3/2008 | Ruthfield et al. |
| 7,346,840 | B1 | 3/2008 | Ravishankar et al. |
| 7,346,848 | B1 | 3/2008 | Ruthfield et al. |
| 7,350,141 | B2 | 3/2008 | Kotler et al. |
| 7,370,066 | B1 | 5/2008 | Sikchi et al. |
| 7,373,595 | B2 | 5/2008 | Jones et al. |
| 7,376,673 | B1 | 5/2008 | Chalecki et al. |
| 7,406,660 | B1 | 7/2008 | Sikchi et al. |
| 7,412,649 | B2 | 8/2008 | Emek et al. |
| 7,424,671 | B2 | 9/2008 | Elza et al. |
| 7,428,699 | B1 | 9/2008 | Kane et al. |
| 7,430,711 | B2 | 9/2008 | Rivers-Moore et al. |
| 7,441,200 | B2 | 10/2008 | Savage |
| 7,451,392 | B1 | 11/2008 | Chalecki et al. |
| 7,490,109 | B1 | 2/2009 | Sikchi et al. |
| 7,490,167 | B2 | 2/2009 | Pena et al. |
| 7,496,632 | B2 | 2/2009 | Chapman et al. |
| 7,496,837 | B1 | 2/2009 | Larcheveque et al. |
| 7,512,896 | B2 | 3/2009 | Rockey et al. |
| 7,516,399 | B2 | 4/2009 | Hsu et al. |
| 7,533,268 | B1 | 5/2009 | Catorcini |
| 7,543,228 | B2 | 6/2009 | Kelkar |
| 7,549,115 | B2 | 6/2009 | Kotler |
| 7,562,215 | B2 | 7/2009 | Cummins |
| 7,568,101 | B1 | 7/2009 | Catorcini |
| 7,581,177 | B1 | 8/2009 | Mollicone et al. |
| 7,584,417 | B2 | 9/2009 | Friend |
| 7,610,562 | B2 | 10/2009 | Rockey et al. |
| 7,613,996 | B2 | 11/2009 | Dallett et al. |
| 7,624,356 | B1 | 11/2009 | Rockey et al. |
| 7,653,687 | B2 | 1/2010 | Resiman |
| 7,669,116 | B2 | 2/2010 | Lopata et al. |
| 7,673,227 | B2 | 3/2010 | Kotler |
| 7,673,228 | B2 | 3/2010 | Kelkar |
| 7,676,843 | B1 | 3/2010 | Stott |
| 7,689,929 | B2 | 3/2010 | Ruthfield |
| 7,692,636 | B2 | 4/2010 | Kim |
| 7,712,022 | B2 | 5/2010 | Smuga |
| 7,712,048 | B2 | 5/2010 | Rockey et al. |
| 7,721,190 | B2 | 5/2010 | Sikchi |
| 7,725,834 | B2 | 5/2010 | Bell |
| 7,739,602 | B2 | 6/2010 | Feng et al. |
| 7,743,063 | B2 | 6/2010 | James et al. |
| 7,774,620 | B1 | 8/2010 | Stott |
| 7,779,027 | B2 | 8/2010 | James |
| 7,809,698 | B1 | 10/2010 | Salz et al. |
| 7,818,677 | B2 | 10/2010 | Ruthfield |
| 7,865,477 | B2 | 1/2011 | Larcheveque |
| 7,900,134 | B2 | 3/2011 | Ardeleanu |
| 7,904,801 | B2 | 3/2011 | Catorcini et al. |
| 7,913,159 | B2 | 3/2011 | Larcheveque |
| 7,925,621 | B2 | 4/2011 | Sikchi |
| 7,937,651 | B2 | 5/2011 | Kelkar |
| 2001/0003828 | A1 | 6/2001 | Peterson et al. |
| 2001/0007109 | A1 | 7/2001 | Lange |
| 2001/0016880 | A1 | 8/2001 | Cai et al. |
| 2001/0022592 | A1 | 9/2001 | Alimpich et al. |
| 2001/0024195 | A1 | 9/2001 | Hayakawa |
| 2001/0027472 | A1 | 10/2001 | Guan |
| 2001/0037345 | A1 | 11/2001 | Kiernan et al. |
| 2001/0044850 | A1 | 11/2001 | Raz et al. |
| 2001/0051907 | A1 | 12/2001 | Kumar et al. |
| 2001/0051928 | A1 | 12/2001 | Brody |
| 2001/0052121 | A1 | 12/2001 | Masuda et al. |
| 2001/0054004 | A1 | 12/2001 | Powers |
| 2001/0056411 | A1 | 12/2001 | Lindskog et al. |
| 2001/0056429 | A1 | 12/2001 | Moore et al. |
| 2001/0056460 | A1 | 12/2001 | Sahota et al. |
| 2002/0010700 | A1 | 1/2002 | Wotring |
| 2002/0010743 | A1 | 1/2002 | Ryan et al. |
| 2002/0010746 | A1 | 1/2002 | Jilk et al. |
| 2002/0010855 | A1 | 1/2002 | Reshef et al. |
| 2002/0013788 | A1 | 1/2002 | Pennell et al. |

| | | | |
|---|---|---|---|
| 2002/0019812 | A1 | 2/2002 | Board et al. |
| 2002/0019941 | A1 | 2/2002 | Chan et al. |
| 2002/0023111 | A1 | 2/2002 | Arora et al. |
| 2002/0023113 | A1 | 2/2002 | Hsing et al. |
| 2002/0026441 | A1 | 2/2002 | Kutay et al. |
| 2002/0026461 | A1 | 2/2002 | Kutay et al. |
| 2002/0026462 | A1 | 2/2002 | Shotton et al. |
| 2002/0032590 | A1 | 3/2002 | Anand et al. |
| 2002/0032692 | A1 | 3/2002 | Suzuki et al. |
| 2002/0032706 | A1 | 3/2002 | Perla et al. |
| 2002/0032768 | A1 | 3/2002 | Voskuil |
| 2002/0035579 | A1 | 3/2002 | Wang et al. |
| 2002/0035581 | A1 | 3/2002 | Reynar et al. |
| 2002/0035617 | A1 | 3/2002 | Lynch et al. |
| 2002/0040469 | A1 | 4/2002 | Pramberger |
| 2002/0049790 | A1 | 4/2002 | Ricker et al. |
| 2002/0052769 | A1 | 5/2002 | Navani et al. |
| 2002/0053021 | A1 | 5/2002 | Rice et al. |
| 2002/0054115 | A1 | 5/2002 | Mack et al. |
| 2002/0054126 | A1 | 5/2002 | Gamon |
| 2002/0054128 | A1 | 5/2002 | Lau et al. |
| 2002/0057297 | A1 | 5/2002 | Grimes et al. |
| 2002/0065798 | A1 | 5/2002 | Bostleman et al. |
| 2002/0065847 | A1 | 5/2002 | Furukawa et al. |
| 2002/0070973 | A1 | 6/2002 | Croley |
| 2002/0072951 | A1 | 6/2002 | Lee et al. |
| 2002/0078074 | A1 | 6/2002 | Cho et al. |
| 2002/0078103 | A1 | 6/2002 | Gorman et al. |
| 2002/0083145 | A1 | 6/2002 | Perinpanathan |
| 2002/0083148 | A1 | 6/2002 | Shaw et al. |
| 2002/0083318 | A1 | 6/2002 | Larose |
| 2002/0091738 | A1 | 7/2002 | Rohrabaugh et al. |
| 2002/0099952 | A1 | 7/2002 | Lambert et al. |
| 2002/0100027 | A1 | 7/2002 | Binding et al. |
| 2002/0107885 | A1 | 8/2002 | Brooks et al. |
| 2002/0111699 | A1 | 8/2002 | Melli et al. |
| 2002/0111932 | A1 | 8/2002 | Roberge et al. |
| 2002/0112224 | A1 | 8/2002 | Cox |
| 2002/0124172 | A1 | 9/2002 | Manahan |
| 2002/0129056 | A1 | 9/2002 | Conant |
| 2002/0133484 | A1 | 9/2002 | Chau et al. |
| 2002/0147726 | A1 | 10/2002 | Yehia et al. |
| 2002/0147748 | A1 | 10/2002 | Huang |
| 2002/0152222 | A1 | 10/2002 | Holbrook |
| 2002/0152244 | A1 | 10/2002 | Dean et al. |
| 2002/0156772 | A1 | 10/2002 | Chau et al. |
| 2002/0156846 | A1 | 10/2002 | Rawat et al. |
| 2002/0156905 | A1 | 10/2002 | Weissman |
| 2002/0156929 | A1 | 10/2002 | Hekmatpour |
| 2002/0169752 | A1 | 11/2002 | Kusama et al. |
| 2002/0169789 | A1 | 11/2002 | Kutay et al. |
| 2002/0174147 | A1 | 11/2002 | Wang et al. |
| 2002/0174417 | A1 | 11/2002 | Sijacic et al. |
| 2002/0178187 | A1 | 11/2002 | Rasmussen et al. |
| 2002/0178380 | A1 | 11/2002 | Wolf et al. |
| 2002/0184188 | A1 | 12/2002 | Mandyam et al. |
| 2002/0184213 | A1 | 12/2002 | Lau et al. |
| 2002/0184219 | A1 | 12/2002 | Preisig et al. |
| 2002/0184401 | A1 | 12/2002 | Kadel, Jr. et al. |
| 2002/0184485 | A1 | 12/2002 | Dray et al. |
| 2002/0184491 | A1 | 12/2002 | Morgan et al. |
| 2002/0188597 | A1 | 12/2002 | Kern et al. |
| 2002/0188613 | A1 | 12/2002 | Chakraborty et al. |
| 2002/0194219 | A1 | 12/2002 | Bradley et al. |
| 2002/0196281 | A1 | 12/2002 | Audleman et al. |
| 2002/0196288 | A1 | 12/2002 | Emrani |
| 2002/0198891 | A1 | 12/2002 | Li et al. |
| 2002/0198935 | A1 | 12/2002 | Crandall, Sr. et al. |
| 2003/0004951 | A1 | 1/2003 | Chokshi |
| 2003/0007000 | A1 | 1/2003 | Carlson et al. |
| 2003/0014397 | A1 | 1/2003 | Chau et al. |
| 2003/0014406 | A1 | 1/2003 | Faieta et al. |
| 2003/0018668 | A1 | 1/2003 | Britton et al. |
| 2003/0020746 | A1 | 1/2003 | Chen et al. |
| 2003/0023641 | A1 | 1/2003 | Gorman et al. |
| 2003/0025693 | A1 | 2/2003 | Haley |
| 2003/0025732 | A1 | 2/2003 | Prichard |
| 2003/0026507 | A1 | 2/2003 | Zlotnick |
| 2003/0028550 | A1 | 2/2003 | Lee et al. |
| 2003/0028762 | A1 | 2/2003 | Trilli et al. |
| 2003/0029911 | A1 | 2/2003 | Kitayama |
| 2003/0033037 | A1 | 2/2003 | Yuen et al. |
| 2003/0033179 | A1 | 2/2003 | Katz et al. |
| 2003/0033606 | A1 | 2/2003 | Puente et al. |
| 2003/0037021 | A1 | 2/2003 | Krothappalli et al. |
| 2003/0037303 | A1 | 2/2003 | Bodlaender et al. |
| 2003/0038788 | A1 | 2/2003 | Demartines et al. |
| 2003/0038846 | A1 | 2/2003 | Hori et al. |
| 2003/0043986 | A1 | 3/2003 | Creamer et al. |
| 2003/0046665 | A1 | 3/2003 | Ilin |
| 2003/0048301 | A1 | 3/2003 | Menninger |
| 2003/0051243 | A1 | 3/2003 | Lemmons et al. |
| 2003/0055811 | A1 | 3/2003 | Stork et al. |
| 2003/0055828 | A1 | 3/2003 | Koch et al. |
| 2003/0056198 | A1 | 3/2003 | Al-Azzawe et al. |
| 2003/0058286 | A1 | 3/2003 | Dano |
| 2003/0061386 | A1 | 3/2003 | Brown et al. |
| 2003/0061567 | A1 | 3/2003 | Brown et al. |
| 2003/0069881 | A1 | 4/2003 | Huttunen |
| 2003/0074279 | A1 | 4/2003 | Viswanath et al. |
| 2003/0084424 | A1 | 5/2003 | Reddy et al. |
| 2003/0093755 | A1 | 5/2003 | O'Carroll |
| 2003/0110443 | A1 | 6/2003 | Yankovich et al. |
| 2003/0120578 | A1 | 6/2003 | Newman |
| 2003/0120651 | A1 | 6/2003 | Bernstein et al. |
| 2003/0120659 | A1 | 6/2003 | Sridhar |
| 2003/0120671 | A1 | 6/2003 | Kim et al. |
| 2003/0120686 | A1 | 6/2003 | Kim et al. |
| 2003/0126555 | A1 | 7/2003 | Aggarwal et al. |
| 2003/0128196 | A1 | 7/2003 | Lapstun et al. |
| 2003/0135553 | A1 | 7/2003 | Pendakur |
| 2003/0135825 | A1 | 7/2003 | Gertner et al. |
| 2003/0140132 | A1 | 7/2003 | Champagne et al. |
| 2003/0140160 | A1 | 7/2003 | Raz et al. |
| 2003/0142072 | A1 | 7/2003 | Lapstun et al. |
| 2003/0149737 | A1 | 8/2003 | Lambert et al. |
| 2003/0149934 | A1 | 8/2003 | Worden |
| 2003/0154464 | A1 | 8/2003 | Ullmann et al. |
| 2003/0158897 | A1 | 8/2003 | Ben-Natan et al. |
| 2003/0163285 | A1 | 8/2003 | Nakamura et al. |
| 2003/0167277 | A1 | 9/2003 | Hejlsberg et al. |
| 2003/0172113 | A1 | 9/2003 | Cameron et al. |
| 2003/0182268 | A1 | 9/2003 | Lal |
| 2003/0182327 | A1 | 9/2003 | Ramanujam et al. |
| 2003/0187756 | A1 | 10/2003 | Klivington et al. |
| 2003/0187930 | A1 | 10/2003 | Ghaffar et al. |
| 2003/0188260 | A1 | 10/2003 | Jensen et al. |
| 2003/0189593 | A1 | 10/2003 | Yarvin |
| 2003/0192008 | A1 | 10/2003 | Lee |
| 2003/0200506 | A1 | 10/2003 | Abe et al. |
| 2003/0204481 | A1 | 10/2003 | Lau |
| 2003/0204511 | A1 | 10/2003 | Brundage et al. |
| 2003/0204814 | A1 | 10/2003 | Elo et al. |
| 2003/0205615 | A1 | 11/2003 | Marappan |
| 2003/0210428 | A1 | 11/2003 | Bevlin et al. |
| 2003/0212664 | A1 | 11/2003 | Breining et al. |
| 2003/0212902 | A1 | 11/2003 | van der Made |
| 2003/0212988 | A1 | 11/2003 | Tsai et al. |
| 2003/0217053 | A1 | 11/2003 | Bachman et al. |
| 2003/0218620 | A1 | 11/2003 | Lai et al. |
| 2003/0220930 | A1 | 11/2003 | Milleker et al. |
| 2003/0225469 | A1 | 12/2003 | DeRemer et al. |
| 2003/0225768 | A1 | 12/2003 | Chaudhuri et al. |
| 2003/0225829 | A1 | 12/2003 | Pena et al. |
| 2003/0226111 | A1 | 12/2003 | Wirts et al. |
| 2003/0226132 | A1 | 12/2003 | Tondreau et al. |
| 2003/0229716 | A1 | 12/2003 | Holland |
| 2003/0233374 | A1 | 12/2003 | Spinola et al. |
| 2003/0233644 | A1 | 12/2003 | Cohen et al. |
| 2003/0236859 | A1 | 12/2003 | Vaschillo et al. |
| 2003/0236903 | A1 | 12/2003 | Piotrowski |
| 2003/0237046 | A1 | 12/2003 | Parker et al. |
| 2003/0237047 | A1 | 12/2003 | Borson |
| 2004/0002939 | A1 | 1/2004 | Arora et al. |
| 2004/0002950 | A1 | 1/2004 | Brennan et al. |
| 2004/0003031 | A1 | 1/2004 | Brown et al. |
| 2004/0003341 | A1 | 1/2004 | alSafadi et al. |
| 2004/0003353 | A1 | 1/2004 | Rivera et al. |

2004/0003389 A1 1/2004 Reynar et al.
2004/0006744 A1 1/2004 Jones et al.
2004/0010752 A1 1/2004 Chan et al.
2004/0010753 A1 1/2004 Salter
2004/0015778 A1 1/2004 Britton et al.
2004/0015783 A1 1/2004 Lennon et al.
2004/0024720 A1 2/2004 Fairweather
2004/0024842 A1 2/2004 Witt
2004/0030991 A1 2/2004 Hepworth et al.
2004/0031052 A1 2/2004 Wannamaker et al.
2004/0039881 A1 2/2004 Shoebridge et al.
2004/0039990 A1 2/2004 Bakar et al.
2004/0039993 A1 2/2004 Kougiouris et al.
2004/0044961 A1 3/2004 Pesenson
2004/0044965 A1 3/2004 Toyama et al.
2004/0046787 A1 3/2004 Henry et al.
2004/0046789 A1 3/2004 Inanoria
2004/0054966 A1 3/2004 Busch et al.
2004/0059754 A1 3/2004 Barghout et al.
2004/0073565 A1 4/2004 Kaufman et al.
2004/0073868 A1 4/2004 Easter et al.
2004/0073924 A1 4/2004 Pendakur
2004/0078756 A1 4/2004 Napper et al.
2004/0083426 A1 4/2004 Sahu
2004/0088647 A1 5/2004 Miller et al.
2004/0088652 A1 5/2004 Abe et al.
2004/0093296 A1 5/2004 Phelan et al.
2004/0093596 A1 5/2004 Koyano
2004/0107367 A1 6/2004 Kisters
2004/0117439 A1 6/2004 Levett et al.
2004/0117769 A1 6/2004 Lauzon et al.
2004/0123277 A1 6/2004 Schrader et al.
2004/0128296 A1 7/2004 Krishnamurthy et al.
2004/0139400 A1 7/2004 Allam et al.
2004/0146199 A1 7/2004 Berkner et al.
2004/0148178 A1 7/2004 Brain
2004/0148514 A1 7/2004 Fee et al.
2004/0148571 A1 7/2004 Lue
2004/0162741 A1 8/2004 Flaxer et al.
2004/0163041 A1 8/2004 Engel
2004/0163046 A1 8/2004 Chu et al.
2004/0172442 A1 9/2004 Ripley
2004/0181543 A1 9/2004 Wu et al.
2004/0181711 A1 9/2004 Johnson et al.
2004/0186762 A1 9/2004 Beaven et al.
2004/0189708 A1 9/2004 Larcheveque et al.
2004/0189716 A1 9/2004 Paoli et al.
2004/0194035 A1 9/2004 Chakraborty
2004/0196266 A1 10/2004 Matsuura et al.
2004/0199572 A1 10/2004 Hunt et al.
2004/0205473 A1 10/2004 Fisher et al.
2004/0205525 A1 10/2004 Murren et al.
2004/0205534 A1 10/2004 Koelle
2004/0205571 A1 10/2004 Adler et al.
2004/0205592 A1 10/2004 Huang
2004/0205605 A1 10/2004 Adler et al.
2004/0205644 A1 10/2004 Shaughnessy et al.
2004/0205653 A1 10/2004 Hadfield et al.
2004/0205671 A1 10/2004 Sukehiro et al.
2004/0210599 A1 10/2004 Friedman et al.
2004/0210645 A1 10/2004 Kouznetsov et al.
2004/0216084 A1 10/2004 Brown et al.
2004/0221238 A1 11/2004 Cifra et al.
2004/0221245 A1 11/2004 Chickles et al.
2004/0225749 A1 11/2004 Pavlik et al.
2004/0230676 A1 11/2004 Spivack et al.
2004/0237030 A1 11/2004 Malkin
2004/0237120 A1 11/2004 Lewin et al.
2004/0260593 A1 12/2004 Abraham-Fuchs et al.
2004/0261019 A1 12/2004 Imamura et al.
2004/0261032 A1 12/2004 Olander et al.
2004/0268229 A1 12/2004 Paoli et al.
2004/0268259 A1 12/2004 Rockey et al.
2004/0268260 A1 12/2004 Rockey et al.
2005/0004893 A1 1/2005 Sangroniz
2005/0005248 A1 1/2005 Rockey et al.
2005/0015279 A1 1/2005 Rucker
2005/0015732 A1 1/2005 Vedula et al.
2005/0022115 A1 1/2005 Baumgartner et al.
2005/0027676 A1 2/2005 Eichstaedt
2005/0027757 A1 2/2005 Kiessig et al.
2005/0028073 A1 2/2005 Henry et al.
2005/0033626 A1 2/2005 Kruse et al.
2005/0033657 A1 2/2005 Herrington et al.
2005/0033728 A1 2/2005 James
2005/0038711 A1 2/2005 Marlelo
2005/0050066 A1 3/2005 Hughes
2005/0055627 A1 3/2005 Lloyd et al.
2005/0060324 A1 3/2005 Johnson et al.
2005/0060647 A1 3/2005 Doan et al.
2005/0060721 A1 3/2005 Choudhary et al.
2005/0065933 A1 3/2005 Goering
2005/0065936 A1 3/2005 Goering
2005/0066287 A1 3/2005 Tattrie et al.
2005/0071752 A1 3/2005 Marlatt
2005/0076022 A1 4/2005 Wu et al.
2005/0076049 A1 4/2005 Qubti et al.
2005/0080801 A1 4/2005 Kothandaraman et al.
2005/0091285 A1 4/2005 Krishnan et al.
2005/0091305 A1 4/2005 Lange et al.
2005/0097536 A1 5/2005 Bernstein et al.
2005/0102370 A1 5/2005 Lin et al.
2005/0102612 A1 5/2005 Allan et al.
2005/0108104 A1 5/2005 Woo
2005/0108262 A1 5/2005 Fawcett, Jr. et al.
2005/0108624 A1 5/2005 Carrier
2005/0108633 A1 5/2005 Sahota et al.
2005/0114757 A1 5/2005 Sahota et al.
2005/0114764 A1 5/2005 Gudenkauf et al.
2005/0119910 A1 6/2005 Schneider
2005/0132043 A1 6/2005 Wang et al.
2005/0132196 A1 6/2005 Dietl
2005/0138031 A1 6/2005 Wefers
2005/0138086 A1 6/2005 Pecht-Seibert
2005/0138539 A1 6/2005 Bravery et al.
2005/0149375 A1 7/2005 Wefers
2005/0149726 A1 7/2005 Joshi et al.
2005/0159136 A1 7/2005 Rouse et al.
2005/0160398 A1 7/2005 Bjornson et al.
2005/0165615 A1 7/2005 Minar
2005/0171746 A1 8/2005 Thalhammer-Reyero
2005/0182645 A1 8/2005 Ehlis et al.
2005/0183006 A1 8/2005 Rivers-Moore et al.
2005/0198086 A1 9/2005 Moore et al.
2005/0198125 A1 9/2005 Macleod Beck et al.
2005/0198247 A1 9/2005 Perry et al.
2005/0210263 A1 9/2005 Levas et al.
2005/0216439 A1 9/2005 Kawakita
2005/0216452 A1 9/2005 Teague
2005/0216837 A1 9/2005 Washburn
2005/0223063 A1 10/2005 Chang et al.
2005/0223320 A1 10/2005 Brintzenhofe et al.
2005/0228887 A1 10/2005 Wang
2005/0234890 A1 10/2005 Enzler et al.
2005/0240620 A1 10/2005 Danner et al.
2005/0240876 A1 10/2005 Myers et al.
2005/0246304 A1 11/2005 Knight et al.
2005/0256933 A1 11/2005 Millington et al.
2005/0257148 A1 11/2005 Goodman et al.
2005/0262112 A1 11/2005 Moore
2005/0268100 A1 12/2005 Gasparini et al.
2005/0268217 A1 12/2005 Garrison
2005/0268222 A1 12/2005 Cheng
2005/0289147 A1 12/2005 Khan et al.
2005/0289468 A1 12/2005 Kahn et al.
2006/0004703 A1 1/2006 Spivack et al.
2006/0004910 A1 1/2006 Burd et al.
2006/0010386 A1 1/2006 Khan
2006/0020586 A1 1/2006 Prompt et al.
2006/0020883 A1 1/2006 Kothari et al.
2006/0026500 A1 2/2006 Qa 'Im-maqami'
2006/0026534 A1 2/2006 Ruthfield et al.
2006/0031757 A9 2/2006 Vincent, III
2006/0036995 A1 2/2006 Chickles et al.
2006/0041593 A1 2/2006 Borthakur et al.
2006/0041838 A1 2/2006 Khan
2006/0053293 A1 3/2006 Zager et al.
2006/0059107 A1 3/2006 Elmore et al.

| | | | |
|---|---|---|---|
| 2006/0059434 | A1 | 3/2006 | Boss et al. |
| 2006/0069605 | A1 | 3/2006 | Hatoun |
| 2006/0069985 | A1 | 3/2006 | Friedman et al. |
| 2006/0074981 | A1 | 4/2006 | Mauceri |
| 2006/0075245 | A1 | 4/2006 | Meier |
| 2006/0080657 | A1 | 4/2006 | Goodman |
| 2006/0085409 | A1 | 4/2006 | Rys et al. |
| 2006/0095507 | A1 | 5/2006 | Watson |
| 2006/0101037 | A1 | 5/2006 | Brill et al. |
| 2006/0101051 | A1 | 5/2006 | Carr et al. |
| 2006/0107206 | A1 | 5/2006 | Koskimies |
| 2006/0129583 | A1 | 6/2006 | Catorcini et al. |
| 2006/0129917 | A1 | 6/2006 | Volk et al. |
| 2006/0129978 | A1 | 6/2006 | Abriani et al. |
| 2006/0136422 | A1 | 6/2006 | Matveief et al. |
| 2006/0143220 | A1 | 6/2006 | Spencer, Jr. |
| 2006/0155857 | A1 | 7/2006 | Feenan et al. |
| 2006/0161559 | A1 | 7/2006 | Bordawekar et al. |
| 2006/0161837 | A1 | 7/2006 | Kelkar et al. |
| 2006/0161845 | A1 | 7/2006 | Kahn et al. |
| 2006/0173865 | A1 | 8/2006 | Fong |
| 2006/0173985 | A1 | 8/2006 | Moore |
| 2006/0184393 | A1 | 8/2006 | Ewin et al. |
| 2006/0191662 | A1 | 8/2006 | Deibl et al. |
| 2006/0195413 | A1 | 8/2006 | Davis et al. |
| 2006/0200443 | A1 | 9/2006 | Kahn et al. |
| 2006/0200740 | A1 | 9/2006 | Kahn et al. |
| 2006/0200754 | A1 | 9/2006 | Kablesh et al. |
| 2006/0203081 | A1 | 9/2006 | Pulitzer |
| 2006/0206803 | A1 | 9/2006 | Smith |
| 2006/0218403 | A1 | 9/2006 | Sauve et al. |
| 2006/0230363 | A1 | 10/2006 | Rapp |
| 2006/0242663 | A1 | 10/2006 | Gogerty |
| 2006/0248468 | A1 | 11/2006 | Constantine et al. |
| 2006/0253459 | A1 | 11/2006 | Kahn et al. |
| 2006/0253489 | A1 | 11/2006 | Kahn et al. |
| 2006/0265518 | A1 | 11/2006 | Owens et al. |
| 2006/0271839 | A1 | 11/2006 | Gottlieb et al. |
| 2006/0288011 | A1 | 12/2006 | Gandhi et al. |
| 2006/0288329 | A1 | 12/2006 | Gandhi |
| 2007/0005611 | A1 | 1/2007 | Takasugi et al. |
| 2007/0011156 | A1 | 1/2007 | Maron |
| 2007/0011665 | A1 | 1/2007 | Gandhi et al. |
| 2007/0036433 | A1 | 2/2007 | Teutsch |
| 2007/0050446 | A1 | 3/2007 | Moore |
| 2007/0050719 | A1 | 3/2007 | Lui et al. |
| 2007/0061467 | A1 | 3/2007 | Essey |
| 2007/0061706 | A1 | 3/2007 | Cupala |
| 2007/0074106 | A1 | 3/2007 | Ardeleanu |
| 2007/0088554 | A1 | 4/2007 | Harb et al. |
| 2007/0094589 | A1 | 4/2007 | Paoli |
| 2007/0100836 | A1 | 5/2007 | Eichstaedt et al. |
| 2007/0100877 | A1 | 5/2007 | Paoli |
| 2007/0100967 | A1 | 5/2007 | Smith et al. |
| 2007/0101280 | A1 | 5/2007 | Paoli |
| 2007/0101313 | A1 | 5/2007 | Bodin et al. |
| 2007/0118538 | A1 | 5/2007 | Ahern et al. |
| 2007/0118803 | A1 | 5/2007 | Walker et al. |
| 2007/0130500 | A1 | 6/2007 | Rivers-Moore et al. |
| 2007/0130504 | A1 | 6/2007 | Betancourt et al. |
| 2007/0186157 | A1 | 8/2007 | Walker et al. |
| 2007/0208606 | A1 | 9/2007 | MacKay et al. |
| 2007/0208759 | A1 | 9/2007 | von Koch |
| 2007/0208769 | A1 | 9/2007 | Boehm et al. |
| 2007/0245251 | A1 | 10/2007 | Kim |
| 2007/0276768 | A1 | 11/2007 | Pallante |
| 2008/0021916 | A1 | 1/2008 | Schnelle et al. |
| 2008/0027896 | A1 | 1/2008 | Anjur |
| 2008/0028340 | A1 | 1/2008 | Davis |
| 2008/0040635 | A1 | 2/2008 | Larcheveque |
| 2008/0052287 | A1 | 2/2008 | Stanciu |
| 2008/0126402 | A1 | 5/2008 | Sitchi et al. |
| 2008/0134162 | A1 | 6/2008 | James |
| 2008/0162498 | A1 | 7/2008 | Omoigui |
| 2008/0189335 | A1 | 8/2008 | Sikchi |
| 2008/0195483 | A1 | 8/2008 | Moora |
| 2008/0222514 | A1 | 9/2008 | Rivers-Moore |
| 2009/0013266 | A1 | 1/2009 | Gandhi |
| 2009/0019063 | A1 | 1/2009 | Gandhi |
| 2009/0044103 | A1 | 2/2009 | Chalecki et al. |
| 2009/0070411 | A1 | 3/2009 | Chang et al. |
| 2009/0119580 | A1 | 5/2009 | Rohrabaugh et al. |
| 2009/0138389 | A1 | 5/2009 | Barthel |
| 2009/0177961 | A1 | 7/2009 | Fortini |
| 2010/0125778 | A1 | 5/2010 | Kelkar et al. |
| 2010/0229110 | A1 | 9/2010 | Rockey et al. |

FOREIGN PATENT DOCUMENTS

| | | | | |
|---|---|---|---|---|
| EP | 0841615 | | | 5/1998 |
| EP | 0841615 | | | 11/1999 |
| EP | 0961197 | | | 12/1999 |
| EP | 1076290 | | | 2/2001 |
| EP | 1221661 | | | 7/2002 |
| EP | 1997023 | | | 12/2008 |
| JP | 63085960 | | | 4/1988 |
| JP | 401173140 | | | 7/1989 |
| JP | 401173140 | A | | 7/1989 |
| JP | 3191429 | | | 8/1991 |
| JP | 4225466 | | | 8/1992 |
| JP | 05314152 | | | 11/1993 |
| JP | 5314152 | | | 11/1993 |
| JP | 406014105 | | | 1/1994 |
| JP | 6139241 | | | 5/1994 |
| JP | 6180697 | | | 6/1994 |
| JP | 6180698 | | | 6/1994 |
| JP | 08263246 | | | 10/1996 |
| JP | 08263247 | | | 10/1996 |
| JP | 09016801 | | | 1/1997 |
| JP | 09134273 | | | 5/1997 |
| JP | 09190327 | | | 7/1997 |
| JP | 09251370 | | | 9/1997 |
| JP | 09292967 | | | 11/1997 |
| JP | 10011255 | | | 1/1998 |
| JP | 10097559 | | | 4/1998 |
| JP | 10171662 | A | * | 6/1998 |
| JP | 10-2207805 | | | 8/1998 |
| JP | 10207805 | | | 8/1998 |
| JP | 10232754 | | | 9/1998 |
| JP | 10240434 | | | 9/1998 |
| JP | 10260765 | | | 9/1998 |
| JP | 3191429 | | | 1/2000 |
| JP | 2000132436 | | | 5/2000 |
| JP | 2002183652 | | | 6/2002 |
| JP | 2003173288 | | | 6/2003 |
| JP | 200329635 | | | 10/2003 |
| JP | 2008547117 | | | 12/2008 |
| RU | 2413987 | | | 3/2011 |
| WO | WO 99/24945 | | | 5/1999 |
| WO | WO-9924945 | | | 5/1999 |
| WO | WO 99/56207 | | | 11/1999 |
| WO | WO-9956207 | | | 11/1999 |
| WO | WO-0126018 | | | 4/2001 |
| WO | WO 01/44934 | | | 6/2001 |
| WO | WO-0144934 | | | 6/2001 |
| WO | WO-2005089336 | | | 9/2005 |
| WO | WO0157720 | | | 9/2006 |

OTHER PUBLICATIONS

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML Integrated Development Environments, Altova Inc., 2002, pp. 1-18.

Ben-Natan, U.S. Appl. No. 60/203,081, filed May 9, 2000, entitled "Internet platform for creating and supporting communities".

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Bruce Hallberge et al "Using Microsoft Excel 97" (Public release 1997, by Que Corp) pp. 145-145 and 196-199.

Han et al., WebSplitter. A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
Leblond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579; Redmond WA 98052-6399.
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives" .
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM*, FSMP Portland Oregon, (2000),101-111.
Watt, Andrew "MIcrosoft Office Infopath 2003 Kick Start", (*Published by Sams*) Print ISBN-10:0-672-32623-X, (Mar. 24, 2004),1-57.
Hu, et al., "A Programmable Editor for Developing Structured Documents based on Bidirectional Transformations", ACM,(Aug. 2004),178-179.
Cover, XML Forms Architecture, retrieved at << http://xml.coverpages.org/xfa.html>> on Aug. 17, 2006, Coverpages, Jun. 16, 1999.
Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.com/TERM/O/OLE.html>>, Jupitermedia Corporation, 2006, pp. 07.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
"Notice of Allowance", U.S. Appl. No. 11/203,937, Supplemental,(Sep. 15, 2009),2 pages.
"Final Office Action", U.S. Appl. No. 10/942,528, (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Non-Final Office Action", U.S. Appl. No. 11/044,106, (Sep. 24, 2009),17 pages.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.
"Advisory Action", U.S. Appl. No. 10/942,528, (Oct. 26, 2009),3 pages.
"Non-Final Office Action", U.S. Appl. No. 11/557,931, (Oct. 20, 2009),27 pages.
"Non-Final Office Action", U.S. Appl. No. 10/976,451, (Oct. 29, 2009),14 pages.
Webopedia, "Definition of OLE", Retrieved from: <http://www.webopedia.com/TERM/O/OLE.html>, (May 16, 1998),3 pages.
Webopedia, "Definition of OpenDoc", Retrieved from: <http://www.webopedia.com/TERM/O/OpenDoc.html>, (Sep. 18, 1997),3 pages.
Webopedia, "Definition of Network", Retrieved from: <http://www.webopedia.com/TERM/n/network.html>, (Sep. 1, 1996),2 pages.
"Final Office Action", U.S. Appl. No. 10/976,451, (Jul. 2, 2009),13 pages.
Reagan, Moore W., et al., "Collection-based persistent digital archives", U.S. Appl. No. 60/191,662, filed Mar. 23, 2000, 133.
"Non-Final Office Action", U.S. Appl. No. 11/227,550, (Aug. 3, 2009),10 pages.
"Notice of Allowance", U.S. Appl. No. 11/203,937, (Aug. 3, 2009),7 pages.
"Foreign Office Action", Application Serial No. 200610051554.X, (Jul. 10, 2009),11 pages.
"Non-Final Office Action", U.S. Appl. No. 11/234,767, (Aug. 12, 2009),24 Pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Final Office Action", U.S. Appl. No. 11/170,521, (Sep. 8, 2009),12 pages.
"Final Office Action", U.S. Appl. No. 10/402,640, (Aug. 28, 2009),17 pages.
"Notice of Allowance", U.S. Appl. No. 10/955,665, (Nov. 3, 2009), 8 pages.
"Final Office Action", U.S. Appl. No. 10/916,692, (Nov. 16, 2009), 10 pages.
"Final Office Action", U.S. Appl. No. 11/072,087, (Nov. 16, 2009), 9 pages.
"Non-Final Office Action", U.S. Appl. No. 11/036,910, (Nov. 13, 2009), 9 pages.
"Notice of Allowance", U.S. Appl. No. 11/095,254, (Nov. 18, 2009), 8 pages.
"Foreign Notice of Allowance", Mexican Application No. PA/a/2005/012067, (Nov. 13, 2009), 1 page.
"Foreign Office Action", Mexican Patent Application No. PA/a/2006/002493, (Sep. 14, 2009), 5 pages.
"Notice of Allowance", U.S. Appl. No. 11/056,500, (Dec. 2, 2009),17 pages.
"Final Office Action", U.S. Appl. No. 11/227,550, (Jan. 19, 2010),12 pages.
"Final Office Action", U.S. Appl. No. 11/234,767, (Jan. 26, 2010),23 pages.
"Final Office Action", U.S. Appl. No. 11/295,178, (Dec. 24, 2009),38 pages.
"Foreign Office Action", Application Serial No. 200610051544.X, (Dec. 4, 2009),9 pages.
"Non-Final Office Action", U.S. Appl. No. 10/402,640, (Dec. 30, 2009),16 pages.
"Non-Final Office Action", U.S. Appl. No. 11/170,521, (Dec. 17, 2009),11 pages.
"Non-Final Office Action", U.S. Appl. No. 12/021,894, (Dec. 31, 2009),10 pages.
"Notice of Allowance", U.S. Appl. No. 10/990,152, (Dec. 21, 2009),6 pages.
"Notice of Allowance", U.S. Appl. No. 11/872,703, (Jan. 27, 2010),19 pages.

"Supplemental Notice of Allowance", U.S. Appl. No. 10/955,665, (Dec. 30, 2009),2 pages.
"Supplemental Notice of Allowance", U.S. Appl. No. 10/955,665, (Feb. 4, 2010),2 pages.
"Supplemental Notice of Allowance", U.S. Appl. No. 10/955,665, (Nov. 27, 2009),2 pages.
Honkala, Mikko et al., "Multimodal Interaction with XForms", *ICWE '06*, (2006),pp. 201-208.
"Architecture for a Dynamic Information Area Control", IBM Technical Disclosure Bulletin, IBM Corp, NY, US vol. 37, No. 10, Jan. 10, 1994,,pp. 245-246.
"Copying the Search Form to Custom Pages in Windows SharePoint Services-based Web Sites", Retrieved from <www.sharepointcustomization.com/resources/tipstricks/04wss-searchbox-tip.htm> (Feb. 11, 2009), Microsoft Corp,(2003),1 page.
"Excel Developer Tip: Determining the Data Type of a Cell", Retrieved from <http://jwalk.com/ss/excel/tips/tip62.htm>, (May 13, 1998),1 page.
"Final Office Action", U.S. Appl. No. 11/557,931, (Feb. 26, 2010),8 pages.
"Netscape Communicator 4.61 for OS/2 Warp", Netscape Communication Corporation, Software 1999, The Whole software release & Netscape—Version 4.61 {en}—010615, Netscape Screenshot,(Oct. 2, 2002),1 page.
"Non-Final Office Action", U.S. Appl. No. 11/227,550, (Mar. 10, 2010),12 pages.
"Notice of Allowance", U.S. Appl. No. 11/044,106, (Mar. 15, 2010),7 pages.
"Notice of Allowance", U.S. Appl. No. 11/072,087, (Feb. 23, 2010),4 pages.
"Notice of Allowance", U.S. Appl. No. 11/093,588, (Mar. 10, 2010),10 pages.
"OMG XML Metadata Interchange (XMI) Specification", Retrieved from: <http://www.omg.org/cgi-bin/doc?formal/02-01-01.pdf> on Dec. 2, 2009, Version 1.2,(Jan. 2002),268 pages.
"SmartUpdate Developer's Guide", Retrieved from http://developer.netscapte.com:80/docs/manuals/communicator/jarman/index.htm on Dec. 8, 2000, Netscape Communications Corp,(Mar. 11, 1999),83 pages.
"Stack Algorithm for Extracting Subtree from Serialized Tree", *IBM Technical Disclosure Bulletin*, TDB-ACC-NO; NN94033, (Mar. 1, 1994),2 pages.
"Store and Organize Related Project Files in a Binder", Getting results with Microsoft Office,(1990),pp. 109-112.
"Streamlining Content Creation", Ixia Soft Jun. 6, 2002,pp. 1-16.
"Supplemental Notice of Allowance", U.S. Appl. No. 10/955,665, (Mar. 5, 2010),2 pages.
"Validation with MSXML and XML Schema", *Windows Developer Magazine*, (Jan. 1, 2002),5 pages.
"Whitehill Composer Software product", Retrieved from www.xml.com/pub/p/221 on Apr. 8, 2004, Whitehill Technologies, Inc.,(Apr. 8, 2004),2 pages.
"XML Forms Architecture (XFA)", Retrieved from http://xml.coverpages.org/xfa.html on Aug. 17, 2006, Cover Pages Technology Reports,,(Jun. 16, 1999),p. 1.
Alschuler, Liora "A Tour of XMetal", Retrieved from: <http://www.xml.com/pub/a/SeyboldReport/ip031102.html> on Feb. 5, 2003, XML.com, Online! XPOO2230081,(Jul. 14, 1999),3 pages.
Altova, "XML Spy 4.0 Manual", *1998-2001 Altova Inc. & Altova GmbH*, (Sep. 10, 2001),pp. 1-90, 343-362.
Altova, et al., "XML Spy, XML Integrated Development Environments", Altova Inc.,(2002),pp. 1-18.
Au, Irene et al., "Netscape Communicators Collapsible Toolbars", CHI 98, Human Factors in Computing Systems, Conference Proceedings, LA, CA,(Apr. 18-23, 1998),pp. 81-86.
Barker, et al., "Creating In-Line Objects Within an Integrated Editing Environment", IBM Technical Disclosure Bulletin, vol. 27, No. 5,(Oct. 1984),p. 2962.
Battle, Steven A., et al., "Flexible Information Presentation with XML", *The Institution of Electrical Engineers*, (1998),6 pages.
Ben-Natan, Ron et al., "Internet Platform for Creating and Supporting Communities", U.S. Appl. No. 60/203,081, filed May 9, 2000,31 pages.
Berg, A "Naming and Binding: Monikers", *Inside OLE, Chapter 9, Harmony Books*, (1995),pp. 431-490.
Brogden, William "Arbortext Adept 8 Editor Review", Retrieved from: <www.xml.com/pub/a/1999/09/adept/AdeptRvw.htm> on Feb. 5, 2003, O'Reilly XML.COM, Online!,(Sep. 22, 1999),4 pages.
Chen, Ya B., et al., "Designing Valid XML Views", *S. Spaccapietra, S.T. March, and Y. Kambayashi (Eds.)*: *ER 2002, LNCS 2503*, Copyright: Springer-Verlag Berlin Heidelberg 2002,pp. 463-477.
Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/0011,(Nov. 4-9, 2002),pp. 446-452.
Chien, et al., "Efficient Management of Multiversion Documents by Object Referencing", Proceedings of the 27th VLDB Conference,(2001),pp. 291-300.
Chien, Shu-Yao et al., "Efficient Schemes for Managing Multiversion XML Documents", *The VLDB Journal 2002*, (Dec. 19, 2002),pp. 332-353.
Chien, Shu-Yao et al., "Storing and Querying Multiversion XML Documents using Durable Node Numbers", IEEE,(2002),pp. 232-241.
Chien, Shu-Yoa et al., "XML Document Versioning", SIGMOD Record, vol. 30, No. 3,,(Sep. 2001),pp. 46-53.
Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001),12 pages.
Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Apr. 1999),pp. 1-14.
Clapp, D "The NeXT Application Kit Part 1: Non-Responsive Classes", *The NeXT Bible Chapter 16*, (1990),pp. 275-293.
Clark, James "XSL Transformation (XSLT), Version 1.0", Retrieved from: <www.w3.org/TR/1999/REC-xsIt19991116> on Oct. 26, 2009, WC3,(Nov. 16, 1999),57 pages.
Clark, James et al., "XML Path Language (XPath)", Retrieved from: <www.w3.org/TR/1999/RCE-xpath-19991116> on Oct. 26, 2009, Version 1.0,(Nov. 16, 1999),37 pages.
Clark, Peter "From Small Beginnings", *Knowledge Management*, (Nov. 2001),pp. 28-30.
Cover, Robin "XML Forms Architecture (XFA)", *Cover Pages*. Retrieved from "http://xml.coverpages.org/xfa.html" on Aug. 17, 2006, (Apr. 19, 2000),4 pages.
Davidow, Ari "XML Editors: Allegations of Functionality in Search of Reality", Retrieved from: <http://www.ivritype.com/xml/> on Feb. 9, 2009, SP002230082,(Oct. 12, 1999),16 pages.
Dayton, Linnea et al., "Photo Shop 5/5.5 WOW! Book", 2000, *Peachpit Press*,pp. 8-17.
Dilascia, Paul et al., "Sweeper", *Microsoft interactive developer*, vol. 1., No. 1, (1996),pp. 16-52.
Dorward, Sean et al., "Unix Variants", *Unix Review*, vol. 10, No. 4, (Apr. 1992),pp. 29-31.
Dyck, Timothy "XML Spy Tops as XML Editor", *eWeek*, vol. 19, No. 47,, (Nov. 25, 2002),3 pages.
Halberg, et al., "Using Microsoft Excel 97", Que Corporation,,(1997),pp. 1-9, 18-25, 85-89, 98-101, 106-113, 124-127, 144-147, 190-201, 209-210, 213-227, 581-590, 632-633, 650-655, 712-714.
Han, Richard et al., "Websplitter: A Unified XML Framework for Multi-Device Collaborative Web Browsing", *ACM Conference on Computer Supported Cooperative Work*, (2000),10 pages.
Hardy, Matthew R., et al., "Mapping and Displaying Structural Transformations between XML and PDF", *Proceedings of the 2002 ACM symposium on Document engineering*, (Nov. 8-9, 2002),pp. 95-102.
Haukeland, Jan-Henrick "Tsbiff-tildeslash biff—Version 1.2.1", http://web.archive.org/web/19990912001527/http://www.tildeslash.com/tsbiff/., (Jun. 1999),2 pages.
Herzner, Wolfgang et al., "CDAM-Compound Document Access and Management. An Object-Oriented Approach", *ACM SIGOIS Bulle-*

*tin*, vol. 12, Issue 1, MultiMedia Systems Interaction and Applications, Chapter 3,,(Jul. 1991),18 pages.
Hwang, Kai et al., "Micro-Firewalls for Dynamic Network Security with Distributed Intrusion Detection", *IEEE International Symposium on Network Computing and Applications 2001*, (2001),pp. 68-79.
Kaiya, Haruniko et al., "Specifying Runtime Environments and Functionalities of Downloadable Components under the Sandbox Model", *International Symposium on Principles of Software Evolution 2000*, (2000),pp. 138-142.
Kanemoto, Hirotaka et al., "An Efficiently Updatable Index Scheme for Structured Documents", *DEXA'98*, (1998),pp. 991-996.
Kim, Sang-Kyun et al., "Immediate and Partial Validation Mechanism for the Conflict Resolution of Update Operations in XML Databases", *WAIM 2002, LNCS 2419, 2002, Springer-Verlag Berlin Heidelberg*, (2002),pp. 387-396.
Kobayashi, M. et al., "An Update on BTRON-specification OS Development", *Proceedings of the 8thTRON Project Symposium*, 1991, 0-8186-2475-2/91,(1991),pp. 132-140.
Komatsu, Naohisa et al., "A Proposal on Digital Watermark in Document Image Communication and It's Application to Realizing a Signature", *Electronics and Communication in Japan, Part I: Communications*, vol. 73, No. 5, (May 1990),pp. 22-33.
Kutay, Ali et al., "Methods and Systems for Accessing, Organizing, Presenting and Viewing Data", U.S. Appl. No. 60/209,713, Kutay et al., filed Jun. 5, 2000,345 pages.
Leblond, et al., "PC Magazine Guide to Quattro Pro for Windows", Ziff-Davis Press,(1993),pp. 9-11, 42-61.
Mansfield, Ron "Excel 97 for Busy People", Osborne/McGraw-Hill,,(Jan. 27, 1997),pp. 48-50.
McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002),3 pages.
Musgrave, S "Networking Technology—Impact and Opportunities", *Survey and Statistical Computing 1996, Proceedings of the Second ASC International Conference*, London, UK,, (Sep. 1996),pp. 369-378.
Noore, Afzel "A Secure Conditional Access System using Digital Signature and Encryption", *International Conference on Consumer Electronics*, (Jun. 2003),pp. 220-221.
Pike, Rob et al., "Plan 9 From Bell Labs", AT&T Bell Laboratories, UKUUG, Summer 1990,10 pages.
Pike, Rob et al., "The Use of Name Spaces in Plan 9", *Operating Systems Review*, vol. 27, No. 2, (Apr. 1993),pp. 72-76.
Prevelakis, Vassilis et al., "Sandboxing Applications", *FREENIX Track: 2001 USENIX Annual Technical Conference*, (2001),pp. 119-126.
Rado, Dave "How to create a template that makes it easy for users to 'fill in the blanks' without doing any programming,", Retrieved from http://word.mvps.org/FAQs/Customization/FillinTheBlanks.htm, (Apr. 2004),pp. 1-2.
Raggett, "HTML Tables", Retrieved from: <http:www.//is-edu.homuns.edu.vn/WebLib/books/Web/Tel/html3-tables.html> on Aug. 6, 2006, W3C Internet Draft,(Jul. 7, 1995),pp. 1-12.
Rapaport, Lowell "Get More From SharePoint", *Transform Magazine*, vol. 11, No. 3, (Mar. 2002),2 pages.
Rogge, Boris et al., "Validating MPEG-21 Encapsulated Functional Metadata", *IEEE 2002*, ISBN 0-7803-7304-9/02,(2002),pp. 209-212.
Schmid, Mathew et al., "Protecting Data from Malicious Software", *18th Annual Security Applications Conference*, (2002),pp. 199-208.
Staneck, W "Internal and External Media", *Electronic Publishing Unleashed*, Chapter 22,(1995),pp. 510-542.
Sun, Qibin et al., "A Robust and Secure Media Signature Scheme for JPEG Images", *Proceeding of 2002 IEEE Workshop on Multimedia Signal Processing*, (Dec. 2002),pp. 296-299.
Sutanthavibul, Supoj et al., "XFIG Version 3.2 Patchlevel 2 (Jul. 2, 1998) Users Manual (Edition 1.0)", Retrieved from: <www.ice.mtu.edu/online_docs/sfig332/> on Jan. 28, 2003, Internet Document XP002229137,(Jul. 2, 1998),60 pages.
Tomimori, Hiroyuki et al., "An Efficient and Flexible Access Control Framework for Java Programs in Mobile Terminals", Proceeding of 22nd Int'l Conference on Distributed Computing Systems Workshops,(2002),pp. 777-782.
Trupin, J "The Visual Programmer", Microsoft Systems Journal,(Apr. 1996),pp. 103-105.
Usdin, Tommie et al., "XML: Not a Silver Bullet, But a Great Pipe Wrench", *Standard View* vol. 6, No. 3, (Sep. 2, 1998),pp. 125-132.
Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001),pp. 105-114.
Williams, Sara et al., "The Component Object Model: A Technical Overview", Microsoft Corp,(Oct. 1994),pp. 1-14.
Wong, Raymond K., et al., "Managing and Querying Multi-Version XML Data with Update Logging", *DocEng '02*, (Nov. 8-9, 2002),8 pages.
Zdonik, S "Object Management System Concepts", ACM,(1984),pp. 13-19.
"Final Office Action", U.S. Appl. No. 11/107,347, (Mar. 22, 2010), 11 pages.
"Non-Final Office Action", U.S. Appl. No. 10/916,692, (Apr. 5, 2010), 6 pages.
"Non-Final Office Action", U.S. Appl. No. 10/976,451, (Apr. 9, 2010), 11 pages.
"Supplemental Notice of Allowance", U.S. Appl. No. 11/072,087, (Apr. 19, 2010), 2 pages.
"Supplemental Notice of Allowance", U.S. Appl. No. 10/990,152, (Apr. 19, 2010), 2 pages.
"Non-Final Office Action", U.S. Appl. No. 10/402,640, (Apr. 30, 2010), 4 pages.
"Final Office Action", U.S. Appl. No. 11/036,910, (May 26, 2010),9 pages.
"Foreign Office Action", Australian Patent Application No. 2006200285, (May 20, 2010),2 pages.
"Foreign Office Action", Russian Application No. 2006103267, (Apr. 20, 2010),10 pages.
"Foreign Office Action", Russian Application No. 2006105526, (Apr. 15, 2010), 10 pages.
"Non-Final Office Action", U.S. Appl. No. 11/295,178, (May 26, 2010),45 pages.
"Non-Final Office Action", U.S. Appl. No. 11/567,140, (May 18, 2010),8 pages.
"Notice of Allowance", U.S. Appl. No. 10/402,640, (Jun. 15, 2010),6 pages.
"Notice of Allowance", U.S. Appl. No. 10/916,692, (Jun. 14, 2010),6 pages.
"Notice of Allowance", U.S. Appl. No. 11/557,931, (May 5, 2010),7 pages.
"Notice of Allowance", U.S. Appl. No. 11/872,703, (May 14, 2010),18 pages.
"Supplemental Notice of Allowance", U.S. Appl. No. 11/044,106, (May 13, 2010),6 pages.
"Supplemental Notice of Allowance", U.S. Appl. No. 11/044,106, (May 29, 2010),5 pages.
"European Search Resort", EP Application No. 06111546.5, (Nov. 9, 2006), 5 pages.
"Final Office Action", U.S. Appl. No. 10/402,640, (Sep. 10, 2007), 16 pages.
"Final Office Action", U.S. Appl. No. 10/955,087, (May 16, 2008), 13 pages.
"Final Office Action", U.S. Appl. No. 10/955,666, (Oct. 31, 2008), 24 pages.
"Final Office Action", U.S. Appl. No. 10/955,666, (Aug. 30, 2007), 19 pages.
"Final Office Action", U.S. Appl. No. 10/976,451, (Jul. 27, 2010), 12 pages.
"Final Office Action", U.S. Appl. No. 10/977,198, (Sep. 3, 2008), 13 pages.
"Final Office Action", U.S. Appl. No. 10/977,198, (Oct. 11, 2007), 10 pages.
"Final Office Action", U.S. Appl. No. 10/988,718, (Jan. 30, 2008), 15 pages.

"Final Office Action", U.S. Appl. No. 10/988,718, (Dec. 22, 2008), 17 pages.
"Final Office Action", U.S. Appl. No. 10/988,732, (Nov. 13, 2009), 33 pages.
"Final Office Action", U.S. Appl. No. 10/988,732, (Dec. 10, 2008), 29 pages.
"Final Office Action", U.S. Appl. No. 11/012,472, (Mar. 23, 2010), 10 pages.
"Final Office Action", U.S. Appl. No. 11/170,521, (Jun. 29, 2010), 13 pages.
"Final Office Action", U.S. Appl. No. 11/227,550, (Aug. 19, 2010), 12 pages.
"Final Office Action", U.S. Appl. No. 11/295,178, (Jul. 30, 2010), 43 pages.
"Final Office Action", U.S. Appl. No. 11/567,140, (Aug. 19, 2010), 10 pages.
"Foreign Office Action", Chinese Application No. 200610051554.X, (Jun. 25, 2010), 10 pages.
"Foreign Office Action", EP Application No. 01935325.9, (Jul. 20, 2010), 6 pages.
"Foreign Office Action", European Patent Application No. 01939368.5, (Feb. 25, 2010), 3 pages.
"Issue Notification", U.S. Appl. No. 10/955,087, (Mar. 18, 2009), 1 page.
"Issue Notification", U.S. Appl. No. 10/988,718, (Aug. 12, 2009), 1 page.
"Issue Notification", U.S. Appl. No. 11/095,254, (Feb. 10, 2010), 1 page.
"Issue Notification", U.S. Appl. No. 11/276,585, (Jan. 21, 2009), 1 page.
"Netscape Window", Netscape Screenshot, (Oct. 2, 2002), 1 page.
"Non Final Office Action", U.S. Appl. No. 10/402,640, (Oct. 6, 2006), 15 pages.
"Non Final Office Action", U.S. Appl. No. 10/402,640, (Feb. 12, 2008), 16 pages.
"Non Final Office Action", U.S. Appl. No. 10/402,640, (Apr. 25, 2007), 16 pages.
"Non Final Office Action", U.S. Appl. No. 10/402,640, (Sep. 8, 2008), 16 pages.
"Non Final Office Action", U.S. Appl. No. 10/955,087, (Nov. 19, 2007), 22 pages.
"Non Final Office Action", U.S. Appl. No. 10/955,666, (Dec. 26, 2006), 20 pages.
"Non Final Office Action", U.S. Appl. No. 10/955,666, (Feb. 4, 2008), 20 pages.
"Non Final Office Action", U.S. Appl. No. 10/977,198, (Jan. 10, 2008), 10 pages.
"Non Final Office Action", U.S. Appl. No. 10/977,198, (Mar. 9, 2007), 9 pages.
"Non Final Office Action", U.S. Appl. No. 10/988,718, (Jan. 25, 2007), 13 pages.
"Non Final Office Action", U.S. Appl. No. 10/988,718, (Jul. 21, 2008), 18 pages.
"Non Final Office Action", U.S. Appl. No. 10/988,718, (Jul. 26, 2007), 21 pages.
"Non-Final Office Action", U.S. Appl. No. 10/854,961, (Nov. 15, 2006), 21 pages.
"Non-Final Office Action", U.S. Appl. No. 10/955,665, (Sep. 11, 2008), 16 pages.
"Non-Final Office Action", U.S. Appl. No. 10/988,732, (Apr. 1, 2008), 27 pages.
"Non-Final Office Action", U.S. Appl. No. 10/988,732, (May 26, 2010), 36 pages.
"Non-Final Office Action", U.S. Appl. No. 10/988,732, (Jun. 11, 2009), 30 pages.
"Non-Final Office Action", U.S. Appl. No. 11/012,472, (Oct. 6, 2009), 8 pages.
"Non-Final Office Action", U.S. Appl. No. 11/012,472, (Jul. 1, 2010), 9 pages.
"Non-Final Office Action", U.S. Appl. No. 11/036,910, (Aug. 19, 2010), 8 pages.
"Non-Final Office Action", U.S. Appl. No. 11/107,347, (Jul. 9, 2010), 16 pages.
"Notice of Allowance", U.S. Appl. No. 10/854,961, (Jun. 14, 2007), 12 pages.
"Notice of Allowance", U.S. Appl. No. 10/955,087, (Dec. 11, 2008), 10 pages.
"Restriction Requirement", U.S. Appl. No. 10/402,640, (Aug. 29, 2006), 5 pages.
"Restriction Requirement", U.S. Appl. No. 11/012,472, (Jun. 9, 2009), 7 pages.
Burch, Barbara "Notes R5 Technical Overview", Retrieved from: <http://www.ibm.com/developerworks/lotus/library/1s-Notes_R5_Technical_Overview> on Aug. 13, 2010, (Apr. 1, 1999), 14 pages.
"Final Office Action", U.S. Appl. No. 09/599,086, (Mar. 6, 2008),47 pages.
"Final Office Action", U.S. Appl. No. 09/599,086, (May 10, 2007),41 pages.
"Final Office Action", U.S. Appl. No. 09/599,086, (May 25, 2004),23 pages.
"Final Office Action", U.S. Appl. No. 09/599,086, (Jul. 5, 2006),34 pages.
"Final Office Action", U.S. Appl. No. 09/599,086, (Aug. 8, 2005),27 pages.
"Final Office Action", U.S. Appl. No. 10/723,863, (Sep. 19, 2007),34 Pages.
"Final Office Action", U.S. Appl. No. 10/897,647, (Mar. 6, 2008),25 pages.
"Final Office Action", U.S. Appl. No. 10/897,647, (Jul. 14, 2009),36 pages.
"Foreign Decision of Grant", Russian Application No. 2006103267, (Aug. 13, 2010),18 pages.
"Foreign Office Action", Canadian Application No. 2408313, (Oct. 26, 2010),5 pages.
"Foreign Office Action", Canadian Application No. 2412611, (Oct. 26, 2010),2 pages.
"Foreign Office Action", European Patent Application No. 01939034.3, (Nov. 5, 2007),4 pages.
"Foreign Office Action", Japanese Application No. 2002-530701, (Aug. 10, 2010),11 pages.
"Foreign Office Action", Russian Application No. 2006105526, (Aug. 24, 2010),4 pages.
"Lotus Notes Release 5, Step by Step", *Lotus Development Corporation*, (1999),224 pages.
"Manual of Patent Office Practice", *Computer-Implemented Inventions, Chapter 16.09.02, Data Structures*, (Oct. 2010),3 pages.
"Non Final Office Action", U.S. Appl. No. 09/599,086, (Jan. 30, 2006),33 pages.
"Non Final Office Action", U.S. Appl. No. 09/599,086, (Oct. 28, 2003),21 pages.
"Non Final Office Action", U.S. Appl. No. 09/599,086, (Oct. 31, 2007),48 pages.
"Non Final Office Action", U.S. Appl. No. 09/599,086, (Nov. 13, 2006),33 pages.
"Non Final Office Action", U.S. Appl. No. 09/599,086, (Nov. 14, 2008),55 pages.
"Non Final Office Action", U.S. Appl. No. 09/599,086, (Mar. 3, 2005),25 pages.
"Non Final Office Action", U.S. Appl. No. 10/897,647, (Nov. 14, 2008),28 pages.
"Non Final Office Action", U.S. Appl. No. 10/897,647, (Sep. 6, 2007),21 pages.
"Non-Final Office Action", U.S. Appl. No. 09/599,299, (Aug. 12, 2004),12 pages.
"Non-Final Office Action", U.S. Appl. No. 10/723,863, (Nov. 6, 2007),7 Pages.
"Non-Final Office Action", U.S. Appl. No. 10/976,451, (Nov. 10, 2010),9 pages.
"Non-Final Office Action", U.S. Appl. No. 12/061,613, (Sep. 28, 2010),9 pages.
"Notice of Allowance", U.S. Appl. No. 09/599,086, (Aug. 17, 2009),59 pages.
"Notice of Allowance", U.S. Appl. No. 09/599,299, (Nov. 30, 2004),7 pages.

"Notice of Allowance", U.S. Appl. No. 10/723,863, (Jun. 30, 2008),9 Pages.
"Notice of Allowance", U.S. Appl. No. 10/897,647, (Jan. 19, 2010),13 pages.
"Notice of Allowance", U.S. Appl. No. 12/021,894, (Oct. 29, 2010),9 pages.
"PCT Search Report", PCT Application No. PCT/US01/15581, (Jan. 29, 2003),3 pages.
Dubinko, et al., "XForms 1.0", Retrieved from: http://www.w3.org/TR/2001/WD-xforms-20011207 (One big file, diff-marked HTML, Zip archive) on May 22, 2007, Section 1-12.3.3 & Appendices A-G,(Dec. 7, 2001),64 pages.
Ducharme, Bob et al., "InfoPath and XForms", Retrieved from: http://jonudell.net/udell/2003-02-26-infopath-and-xforms.html (Mar. 4, 2010), (Feb. 26, 2003),2 pages.
Esposito, Dino "Cutting Edge No. 8", *Microsoft Internet Developer*, (Jan. 18, 2000),13 pages.
Howlett, Scott et al., "A New Function for SQL Server 2000", *MSDN Magazine*, No. 1, (Mar. 2000),9 pages.
Sato, T. et al., "XFIG Version 3.2 Patchlevel 2 Users Manual Edition 1.0", Available at http://tinf2.vub.ac.be/~dvermeir/manuals/xfig/lib/X11/xfig/html/index.html, (Jul. 2, 1998),37 pages.
Kay, Mechael "XSL Transfornmations (XSLT) Version 2.0", http://www.w3.org/TR/2005/WD-xslt20-20050404, (Apr. 4, 2005),1-374.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, Inc.: "Copying the Search Form to Services-based Web Sites" INternet Article, (online) Jul. 26, 2004.*the whole document*.
Excel Developer Tip (hereinafter "Excel"), "Determining the Data Type of a Cell", May 13, 1998, p. 1 (available at http://jwalk.com/ss//excel/tips/tip62.htm).
Macromedia, Inc.: "Dreamweaver Technote, Changes in copying and pasting in Dreamweaver 4" Internet Articel (online). *the whole document*, (Mar. 12, 2001).
Rado, Dave: "How to create a template that makes it easy for users to "fill in the blanks", without doing any programming" Microsoft Word MVP FAQ Site, (online) Apr. 30, 2004, the whole document.
Borland, Russo "Running Microsoft Word 97", 314-315, 338, 361-362, 390, and 714-719, (1997).
"Microsoft Word 2000", Screenshots,(1999),1-5.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 by Example", Retrieved from the Internet at http://www.perfectxml.com/InfoPath.asp on Jan. 21, 2007,(Apr. 20, 2003).
Raman, T. V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).
"Microsoft Visual Basic 5.0 Programmer's Guide", *Microsoft Press*, (1997),pp. 42-43, 54-58.
Nelson, Joe "Client-side Form Validation Using JavaScript", *Developer Advisory*, (Sep. 21, 2001).
Brabrand, et al., "Power Forms Declarative Client-side Form Field Validation", (2002),1-20.
Anat, Eyal et al., "Integrating and Customizing Hererogeneous E-Commerce Applications", The VLDB Journal—The International Journal on Very Large Data Bases, vol. 10, Issue 1,(Aug. 2001),16-38.
Adams, Susie et al., "BizTalk Unleashed", Sams publishing, 2002, first printing Mar. 2001,1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
"Microsoft Word 2000 Screenshots", (2000),11-17.
XmlSpy, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12, (2007).
"Microsoft Word 2000 Screenshots", Word,(2000),1-17.
U.S. Appl. No. 60/191,662, filed Jan. 1, 2000, Kutay et al.
U.S. Appl. No. 60/203,081, filed Jan. 1, 2000, Ben-Natan et al.
U.S. Appl. No. 60/209,713, filed Jan. 1, 2000, Kutay et al.
"Validating MPEG-21 Encapsulated Functional Metadata" IEEE 2002 pp. 209-212.
"Netscape Communicator's Collapsible Toolbars" CHI'98 Human Factors in Computing Systems Conference Proceedings Los Angeles CA Apr. 18-23, 1998 pp. 81-86.
"Architecture for a Dynamic Information Area Control" IBM Technical Disclosure Bulletin IBM Corp. New York US vol. 37 No. 10 Jan. 10, 1994. pp. 245-246.
"A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
"Mapping and Displaying Structural Transformations between XML and PDF" DocEng '02 Nov. 8-9, 2002 Copyright 2002 ACM 1-58113-597-7/02/0011 pp. 95-102.
"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.
"Photo Shop 5/5.5 WOW! Book" 2000 Peachpit Press pp. 8-17.
"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.
"An Efficient and Flexible Access Control Framework for Java Programs in Mobile Terminals"; 22nd International Conference on Distributed Computing Systems Workshops; 2002; pp. 777-782.
"A Proposal on Digital Watermark in Document Image Communication and Its Application to Realizing a Signature" Electronics and Communications in Japan Part I: Communications vol. 73 No. 5 May 1990 pp. 22-33.
"A robust and secure media signature scheme for JPEG images" Proceedings of 2002 IEEE Workshop on Multimedia Signal Processing Dec. 2002 pp. 296-299.
"New Tool Kit to Link Groove with Microsoft Sharepoint" eWeek Enterprise News & Reviews Ziff Davis Media INc. Jul. 29, 2002 1 page.
"Naming and Binding: Monikers" Inside Ole 1995 Chapter 9 pp. 431-490.
"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

"XKvalidator: A Constraint Validator for XML" CIKM '-2 Nov. 4-9, 2002 Copyright 2002 ACM 1-58113-492-4/02/0011 pp. 446-452.
"Designing Valid XML Views" ER 2002 LNCS 2503 2002 Springer-Verlag Berlin Heidelberg 2002 pp. 463-477.
"XML Document Versioning" SIGMOD Record vol. 30 No. 3 Sep. 2001 pp. 46-53.
"Generic Validation of Structural Content with Parametric Modules" ICFP '01 Sep. 3-5, 2001 Copyright 2001 ACM 1-58113-415-0/01/0009 pp. 98-109.
"Managing Complex Documents Over the WWW: A Case Study for XML" IEEE Transactions on Knowledge and Data Engineering vol. 11 No. 4 Jul./Aug. 1999. pp. 629-938.
"XSL Transformation (XSLT) Verison 1.0" Nov. 16, 1999 W3C (MIT INRIA Kejo) pp. 1-156.
"From small beginnings" Knowledge Management Nov. 2001 pp. 28-30.
"XML Editors: Allegations of Functionality in search of reality" Internet 'Online! 1999 XP002230082 retrieved from the Internet <URL:http://www.ivritype.com/xml/>.
Description of Whitehill Composer software product producted by Whitehill Technologies Inc. available at <http://www.xml.com/pub/p/221> accessed on Apr. 8, 2004 two pages.
"XML Spy Tops as XML Editor" http://www.eweek.com/article2/0395972404100.asp Nov. 25, 2002 4 pages.
"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.
"Tsbiff-tildeslash biff—version 1.2.1" Internet Document [Online] Jun. 1999 URL: http://web.archive.org/web/19990912001527/http://www.tildeslash.com/tsbiff/.
"Micro-Firewalls for Dynamic Network Security with Distributed Intrusion Detection"; IEEE INternational Symposium on Network Computing and Applications; 2001; pp. 68-79.
"Specifying Runtime Environments and Functionalities of Downloadable Components Under the Sandbox Mode"; International Symposium on Principles of Software Evolution; 2000; pp. 138-142.
"An Efficiently Updatable Index Scheme for Structured Documents" 1998 IEEE pp. 991-996.
"Immediate and Partial Validation Mechanism for the Conflict Resolution of Update Operations in XML Databases" WAIM 2002 LNCS 2419 2002 pp. 387-396 Springer-Veriag Berlin Heidelberg 2002.
"An Update on BTRON-specification OS Development" IEEE 1991 pp. 132-140.
"Networking technology—impact and opportunities" Survey and Statistical Computing 1996. Proceedings of the Second ASC International Conference. Sep. 1996. pp. 369-378. London UK.
"Validation with MSXML and XML Schema" Windows Developer Magazine Jan. 2002 pp. 35-38.
"Netscape Communicator 4.61 for OS/2 Warp" Software 1999 The whole software release & "Netscape—Version 4.6 [en]-010615" Netscape Screenhot Oct. 2, 2002.
"A secure conditional access system using digital signature and encryption" 2003 Digest of Technical Papers. International Conference on Consumer Electronics Jun. 2003 pp. 220-221.
OMG XML Metadata Interchange (XMI) Specification Version 1.2 Jan. 2002.
"Delphi 5 Developer's Guide" Sams Publishing 1999 Chapter 31 Section: Data Streaming 6 pages.
"Unix Variants" Unix Review vol. 10 No. 4 Apr. 1992 pp. 29-31.
"Plan 9 from Bell Labs" UKUUG Summer 1990 10 pages.
"The Use of Name Spaces in Plan 9" Operating Systems Review vol. 27 No. 2 Apr. 1993 pp. 72-76.
"Sandboxing Applications"; Proceedings of the FREENIX Track; 2001; pp. 119-126.
"Get more from SharePoint" Transform Magazine vol. 11 No. 3. Mar. 2002 pp. 1315.
"Protection Data from Malicious Software"; 18th Annual Computer Security Applications Conference; 2002; pp. 199-208.
"Internal and External Media" Electronic Publishing Unleashed 1995 Chapter 22 pp. 510-542.
"XFIG Version 3.2 Patchlevel 2 (Jul. 2, 1998) Users Manual (Edition 1.0)" Internet Document [Online] XP002229137 Retrieved from the Internet: <URL:http://www.ice.mtu.edu/online_docs/xfig332/> [retrieved on Jan. 28, 2003].
"The Visual Programmer" Microsoft Systems Journal Apr. 1996 pp. 103-105.
"The Open Software Description Format" Online Aug. 13, 1997 retrieved from the Internet on Nov. 7, 2003: <http://www.w3.org/TR/NOTE-OSD> 11 pages.
"XML Path Language (XPath) Version 1.0" Nov. 16, 1999W3C (MIT INRIA Kejo) pp. 1-49.
"The Component Object Model" A Technical Overview Oct. 1994 Microsoft Corp. pp. 1-14.
"Managing and Querying Multi-Version XML Data with Update Logging" DocEng '02 Nov. 8-9, 2002 Copyright 2002 ACM 1-58113-594-7/02/0011 pp. 74-81.
"Object Management System Concepts" ACM 1984 pp. 13-19.
"CDAM—Compound Document Access and Management. An Object-Oriented Approach" Multimedia Systems Interaction and Applications 1992 Chapter 3 pp. 17-36.
"The NeXT Application Kit Part I: Non-Responsive Classes" The NeXT Bible 1990 Chapter 16 pp. 275-293.
"Sweeper" Microsoft Interactive Developer vol. 1 No. 1 1996 27 pages.
"Creating In-Line Objects Within an Itegrated Editing Environment" IBM Technical Disclosure Bulletin Vol. 27 No. 5 Oct. 1984 p. 2962.
"XML: Not a Silver Bullet But a Great Pipe Wrench" Standardview vol. 6. No. 3 Sep. 1998 pp. 125-132.
"Flexible Information Presentation with XML" 1998 The Institution of Electrical Engineers 6 pages.
"Netscape window" Netscape Screenshot Oct. 2, 2002.
"Storing and Querying Multiversion XML Documents using Durable Node Numbers" IEEE 2002 pp. 232-241.
Efficient Management of Multiversion Documents by Object Referencing Proceedings of the 27th VLDB Conference 2001 pp. 291-300.
"Efficient schemes for managing mulitversion XML documents" VLDB Journal (2002) pp. 332-352.
"Store and Organize Related Project Files in a Binder" Getting Results with Microsoft Office 1990 pp. 109-112.
Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.
Acklen, et al., "Using Corel Wordperfect 9", Que Corporation,,(1998),pp. 251-284, 424-434, 583-585.
"Non Final Office Action", U.S. Appl. No. 10/942,528, (Mar. 6, 2009),31 pages.
"Non Final Office Action", U.S. Appl. No. 11/170,521, (Jan. 21, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Notice of Allowance", U.S. Appl. No. 10/988,718, (Apr. 9, 2009),17 pages.
"Final Office Action", U.S. Appl. No. 11/107,347, (Apr. 2, 2009),15 pages.
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, (Apr. 2, 2009),19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.

"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Sever BH Series Operating System Guide", Hewlett-Packard,(Jul. 2002).
"Non Final Office Action", U.S. Appl. No. 09/599,809, (May 13, 2009),25 pages.
"Non Final Office Action", U.S. Appl. No. 11/295,178, (May 27, 2009),111 pages.
"Non Final Office Action", U.S. Appl. No. 10/990,152, (May 28, 2009),19 pages.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.
"Foreign Office Action", Application Serial No. 2002-503702, Final Notice of Rejection,(Jun. 5, 2009),212 pages.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative-Looking but 'Attentive' New Function", NIKKEI PC 21, vol. 4, No. 8,(Aug. 1, 1999),pp. 115-116.
Yasuji, Fukuhara "Clarisworks, Introduction to Business Document Construction, No. 4, Estimate", NIKKEI MAC, No. 14,(May 17, 1994),pp. 197-204.
Pacheco, Xavier et al., "Delphi 5 Developers Guide", Sams Publishing. Chapter 31, Section: Data Streaming,(1999),4.
Altova, "Altova Tools for XPath 1.0/2.0", Retrieved from http://www.altova.comdev_portal_xpath.html, Altova,1-12, (2007).
"About Microsoft Word", Microsoft Word 2000, published 1983-1999, and Microsoft Excel 2000 (see Screen Shot "About Microsoft Excel") Published 1988-1999,(Oct. 21, 2005), 3 pages.
"Advisory Action", U.S. Appl. No. 10/632,437, (Aug. 23, 2006), 3 pages.
"Advisory Action", U.S. Appl. No. 10/898,657, (Mar. 25, 2008), 3 pages.
"Advisory Action", U.S. Appl. No. 11/276,584, (Apr. 17, 2009), 3 pages.
"Applicants' Statement Regarding a Non-Public Use", (May 31, 2006), 1 page.
"Attensa Outlook—Getting Started", www.attensa.com, (2005), pp. 1-33.
"Blogdigger—Add Feed Form", *Internet Resource*, Retrieved from <http://web.archive.org/web/20050618015745/http://www.blogdigger.com/add.jsp> on Nov. 13, 2008 1 of> on Nov. 13, 2008, 1 page.
"Bradbury Software FeedDemon 1.0", (May 26, 2004), 3 pages.
"Copying the Search Form to Services-based Web Sites",*Cybook, Inc., the whole document*, (Jul. 26, 2004), 1 page.
"Dreamweaver Technote: Changes in copying and pasting in Dreamweaver 4", http://store1.adobe.com/cfusion/knowledgebase/index.cfm?id=tn_15152, (Mar. 2001), 2 pages.
"EP Search Report", Application No. 07751586.4, (Aug. 13, 2009), 9 pages.
"EP Search Report", Application Serial No. 07750552.7, EESR,(Sep. 30, 2009), 6 pages.
"Feed Splicing, Part 1", Retrieved from: <http://blogs.feedburner.com/feedburner/archives/2004/07/feed_splicing_part_i.php> on Jul. 14, 2004, 5 pages.
"Feed Splicing, Part 2", Retrieved from <http://blogs.feedburner.com/feedburner/archives/2004/08feed_splicing_part_ii.php> on Dec. 8, 2008, (Aug. 16, 2004), 5 pages.
"FeedBurner" Retrieved from <http://www.feedburner.com> on Dec. 8, 2008, (Feb. 25, 2004), 1 Page.
"Final Office Action", U.S. Appl. No. 09/599,299, (Apr. 20, 2004), 23 pages.
"Final Office Action", U.S. Appl. No. 09/599,812, (Aug. 12, 2003), 38 pages.
"Final Office Action", U.S. Appl. No. 10/178,291, (Dec. 19, 2005), 21 pages.
"Final Office Action", U.S. Appl. No. 10/632,437, (Jan. 25, 2008), 25 pages.
"Final Office Action", U.S. Appl. No. 10/632,437, (Jun. 1, 2006), 21 pages.
"Final Office Action", U.S. Appl. No. 10/723,188, (Jan. 9, 2009), 20 pages.
"Final Office Action", U.S. Appl. No. 10/781,586, (Aug. 9, 2007), 20 pages.
"Final Office Action", U.S. Appl. No. 10/846,428, (Mar. 3, 2008), 23 pages.
"Final Office Action", U.S. Appl. No. 10/876,418, (May 22, 2008), 14 pages.
"Final Office Action", U.S. Appl. No. 10/898,656, (Nov. 15, 2007), 16 pages.
"Final Office Action", U.S. Appl. No. 10/898,657, (Jan. 3, 2008), 21 pages.
"Final Office Action", U.S. Appl. No. 11/095,254, (Dec. 22, 2008), 9 pages.
"Final Office Action", U.S. Appl. No. 11/158,398, (Oct. 15, 2010), 11 pages.
"Final Office Action", U.S. Appl. No. 11/158,398, (Feb. 25, 2009), 12 pages.
"Final Office Action", U.S. Appl. No. 11/158,398, (Mar. 22, 2010), 11 pages.
"Final Office Action", U.S. Appl. No. 11/158,911, (Oct. 15, 2010), 13 pages.
"Final Office Action", U.S. Appl. No. 11/158,911, (Oct. 28, 2009), 10 pages.
"Final Office Action", U.S. Appl. No. 11/158,936, (Jun. 26, 2009), 16 pages.
"Final Office Action", U.S. Appl. No. 11/158,936, (Jul. 19, 2010), 14 pages.
"Final Office Action", U.S. Appl. No. 11/276,536, (Apr. 23, 2010), 20 pages.
"Final Office Action", U.S. Appl. No. 11/276,584, (Oct. 29, 2009), 12 pages.
"First Office Action", Chinese Application No. 200780007512.9, (Jan. 15, 2010), 7 pages.
"First Office Action", Chinese Application No. 200780008302.1, (Jan. 8, 2010), 15 pages.
"flaggeditems.png", *Print screen from Internet Search*, Retreived from <http://web.archive.org/web/20050623095655/http://ranchero.com/images/nnw2/flaggeditems.png> on Nov. 13, 2008, 1 page.
"Foreign Decision of Grant", Russian Application No. 2006105526, (Nov. 8, 2010), 16 pages.
"Foreign Office Action", Application Serial No. 07750552.7, (Nov. 17, 2009), 6 pages.
"Foreign Office Action", Application Serial No. 200680018421.0, (Jan. 9, 2009), 10 pages.
"Foreign Office Action", Australian Application No. 2006262540, (Oct. 8, 2010), 1 page.
"Foreign Office Action", Chinese Application No. 200680018421.0, (Jun. 24, 2010), 11 pages.
"Foreign Office Action", Chinese Application No. 200680018421.0, (Sep. 3, 2010), 9 pages.
"Foreign Office Action", Chinese Application No. 200680021415.0, (Jun. 8, 2010), 10 pages.
"Foreign Office Action", Japanese Application 2002-504575, (Dec. 14, 2010), 4 pages.
"Google Reader: beta feed reader", Retrieved from <http://www.consumingexperience.com/2005/10/google-reader-beta-feed-reader.html,(Oct. 7, 2005), 8 pages.

"Google Reader: Reviewer's Guide", Available at: <http://www.google.com/press/guides/reader_overview.pdf>, (Oct. 16, 2005), pp. 1-5.
"Introduction to RSS", Retrieved from: <http://www.webreference.com/authoring/languages/xml/rss/intro.> on Jan. 28, 2008, (Mar. 27, 2000), 3 Pages.
"JP Notice of Publication", Application Serial No. 2008-558275, (Aug. 6, 2009), 2 pages.
"JP Notice of Publication", Application Serial No. 2008-558294, (Aug. 13, 2009), 2 pages.
"Kalsey_Blogfeed", *Internet Article*, Retrieved from <http://web.archive.org/web/20050515005125/http://www.kalsey.com/tools/blogfeed/> on Nov. 13, 2008, pp. 1-3.
"mainWindow2.png", *Print Screen from Internet Article*, Retrieved from <http://web.archive.org/web/20050623095300/http://ranchero.com/images/nnw2/mainWindow2.png> on Nov. 13, 2008, 1 page.
"Microsoft Computer Dictionary 5th Edition", *Entry for "Stack," Microsoft Press*, ISBN 0-7356-1495-4, (May 1, 2002), p. 495.
"NetNewsWire_helpbook_faq", *Internet Search FAQ sheet*, Retrieved from<http://web.archive.org/web/20050623234918/http://ranchero.com/netnewswire/helpBook/faq.html> on Nov. 13, 2008, pp. 1-3.
"Non Final Office Action", U.S. Appl. No. 10/178,291, (Nov. 26, 2004), 21 pages.
"Non Final Office Action", U.S. Appl. No. 10/178,291, (Apr. 29, 2004), 14 pages.
"Non Final Office Action", U.S. Appl. No. 10/178,291, (Jun. 27, 2005), 22 pages.
"Non Final Office Action", U.S. Appl. No. 10/395,505, (Sep. 11, 2006), 8 pages.
"Non Final Office Action", U.S. Appl. No. 10/632,437, (Dec. 16, 2005), 22 pages.
"Non Final Office Action", U.S. Appl. No. 10/632,437, (Jul. 26, 2007), 19 pages.
"Non Final Office Action", U.S. Appl. No. 10/632,437, (Sep. 10, 2008), 28 pages.
"Non Final Office Action", U.S. Appl. No. 10/770,240, (May 1, 2008), 30 pages.
"Non Final Office Action", U.S. Appl. No. 10/770,240, (Aug. 24, 2004), 25 pages.
"Non Final Office Action", U.S. Appl. No. 10/898,656, (Apr. 18, 2008), 17 pages.
"Non Final Office Action", U.S. Appl. No. 10/898,656, (Jul. 13, 2007), 13 pages.
"Non Final Office Action", U.S. Appl. No. 10/898,657, (Jul. 18, 2007), 18 pages.
"Non Final Office Action", U.S. Appl. No. 10/898,657, (Sep. 8, 2008), 24 pages.
"Non Final Office Action", U.S. Appl. No. 11/158,911, (Jun. 30, 2009), 9 pages.
"Non Final Office Action", U.S. Appl. No. 11/276,536, (Jan. 9, 2009), 33 pages.
"Non Final Office Action", U.S. Appl. No. 11/276,536, (May 28, 2009), 18 pages.
"Non Final Office Action", U.S. Appl. No. 11/276,584, (Jun. 25, 2009), 11 pages.
"Non-Final Office Action", U.S. Appl. No. 09/599,299, (Oct. 28, 2003), 32 pages.
"Non-Final Office Action", U.S. Appl. No. 09/599,812, (Feb. 27, 2003), 20 pages.
"Non-Final Office Action", U.S. Appl. No. 09/599,812, (Feb. 5, 2004), 35 pages.
"Non-Final Office Action", U.S. Appl. No. 10/610,504, (Mar. 9, 2006), 12 Pages.
"Non-Final Office Action", U.S. Appl. No. 10/723,863, (Feb. 8, 2007), 30 Pages.
"Non-Final Office Action", U.S. Appl. No. 10/723,863, (Aug. 23, 2006), 16 Pages.
"Non-Final Office Action", U.S. Appl. No. 10/846,428, (Oct. 15, 2008), 23 pages.
"Non-Final Office Action", U.S. Appl. No. 10/846,428, (Jul. 19, 2007), 19 pages.
"Non-Final Office Action", U.S. Appl. No. 10/871,586, (Jan. 9, 2008), 22 pages.
"Non-Final Office Action", U.S. Appl. No. 10/876,418, (Sep. 13, 2007), 14 pages.
"Non-Final Office Action", U.S. Appl. No. 10/939,588, (Feb. 18, 2009), 29 pages.
"Non-Final Office Action", U.S. Appl. No. 11/095,254, (Apr. 17, 2008), 8 pages.
"Non-Final Office Action", U.S. Appl. No. 11/158,398, (Sep. 8, 2009), 9 pages.
"Non-Final Office Action", U.S. Appl. No. 11/158,398, (May 13, 2010), 10 pages.
"Non-Final Office Action", U.S. Appl. No. 11/158,911, (Jun. 10, 2010), 11 pages.
"Non-Final Office Action", U.S. Appl. No. 11/158,936, (Jan. 12, 2010), 12 pages.
"Non-Final Office Action", U.S. Appl. No. 11/234,767, (Nov. 26, 2010), 28 pages.
"Non-Final Office Action", U.S. Appl. No. 11/276,536, (Oct. 7, 2009), 15 pages.
"Non-Final Office Action", U.S. Appl. No. 11/276,536, (Sep. 15, 2010), 13 pages.
"Non-Final Office Action", U.S. Appl. No. 11/276,584, (Dec. 28, 2009), 12 pages.
"Non-Final Office Action", U.S. Appl. No. 11/276,584, (Jul. 26, 2010), 14 pages.
"Non-Final Office Action", U.S. Appl. No. 12/028,651, (Jan. 3, 2011), 16 pages.
"Non-Final Office Action", U.S. Appl. No. 12/234,449, (Oct. 27, 2010), 8 pages.
"Non-Final Office Action", U.S. Appl. No. 12/234,449, (Jun. 1, 2010), 8 pages.
"Non-Final Office Action", U.S. Appl. No. 11/234,767, (Aug. 12, 2009), 24 pages.
"Notice of Allowance", U.S. Appl. No. 09/599,812, (Aug. 3, 2004), 12 pages.
"Notice of Allowance", U.S. Appl. No. 10/178,291, (Feb. 6, 2006), 7 pages.
"Notice of Allowance", U.S. Appl. No. 10/395,505, (Oct. 4, 2006), 8 pages.
"Notice of Allowance", U.S. Appl. No. 10/610,504, (Sep. 6, 2006), 4 Pages.
"Notice of Allowance", U.S. Appl. No. 10/632,437, (May 21, 2009), 15 pages.
"Notice of Allowance", U.S. Appl. No. 10/781,586, (May 9, 2008), 6 pages.
"Notice of Allowance", U.S. Appl. No. 10/846,428, (Apr. 29, 2009), 10 pages.
"Notice of Allowance", U.S. Appl. No. 10/876,418, (Dec. 31, 2008), 8 pages.
"Notice of Allowance", U.S. Appl. No. 10/898,656, (Jan. 2, 2009), 9 pages.
"Notice of Allowance", U.S. Appl. No. 10/898,657, (Jun. 11, 2009), 20 pages.
"Notice of Allowance", U.S. Appl. No. 11/036,910, (Dec. 7, 2010), 7 pages.
"Notice of Allowance", U.S. Appl. No. 11/107,347, (Dec. 13, 2010), 11 pages.
"OLE Open Doc and Network", Retrieved from http://www.pcwebopedia.com on May 9, 2006, Webopedia entries,(May 16, 1998), 7 pages.
"PCT Search Report and Written Opinion", Application No. PCT/US06/23336, (Oct. 29, 2007), 8 pages.

"Persistence.png", *Print Screen from Internet Article*, Retrieved from <http://web.archive.org/web/20050623095937/http://ranchero.com/images/nnw2/persistence.png> on Nov. 13, 2008, 1 page.

"Protecting Commercial Secure Web Servers from Key-Finding Threats" *nCipher, Inc.*, Available at <www.ncipher.com/uploads/resources/pcws.pdf>,(1999), 12 pages.

"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008, pp. 1-3.

"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008, pp. 1-4.

"Ranchero Software_NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008, pp. 1-3.

"Ranchero Software_Smart Lists", *Internet Article*, Retrieved from <http://web.archive.org/web/20050602084724/http://ranchero.com/netnewswire/features/smartLists.php> on Nov. 13, 2008, pp. 1-2.

"Ranchero Software_Subscription Sharing", *Internet Article*, Retrieved from <http://web.archive.org/web/20050811083741/http://ranchero.com/netnewswire/features/sharing.php> on Nov. 13, 2008, pp. 1-3.

"Ranchero Software Search Engine Subscriptions", *On-line Article*, Retrieved from <http://web.archive.org/web/20050714082710/http://ranchero.com/netnewswire/features/searchEngineSubscriptions.php> on Nov. 13, 2008, pp. 1-2.

"Ranchero Software: NetNewsWire", *Internet Article*, Retrieved from <http://web.archive.org/web/20051003204517/ranchero.com/netnewswire/> on Nov. 13, 2008,(2005), 5 pages.

"Ranchero Software: What's New in NetNewsWire 2.0", *Web article*, retrieved from <http://web.archive.org/web/20050618014501/http://ranchero.com/netnewswire/whatsnew/netnewswire20.php> on Nov. 13, 2008, pp. 1-3.

"Ranchero Software_Flagged Items", *Internet Article*, Retrieved from <http://web.archive.org/web/20050612083011/http://ranchero.com/netnewswire/features/flaggedItems.php> on Nov. 13, 2008, 1 page.

"Ranchero Software_Features Chart", *Internet Article*, Retrieved from <http://web.archive.org/web/20050609010027/http://ranchero.com/netnewswire/featureschart20.php> on Nov. 13, 2008, pp. 1-3.

"Resizing Controls Dynamically", Microsoft Visual Basic 5.0 Programmer's Guide 1997,(1997), pp. 578-579.

"Restriction Requirement", U.S. Appl. No. 10/770,240, (Jan. 26, 2009), 7 pages.

"Restriction Requirement", U.S. Appl. No. 11/095,254, (Nov. 1, 2007), 8 pages.

"RSS 2.0 Specification", (Jul. 15, 2003), 1-8.

"RSS Submissions", *Internet Article*, Retrieved from <http://web.archive.org/web/20050619014308/http://www.rss-specifications.com/rss-submission.htm> on Nov. 13, 2008, pp. 1-3.

"Search Engine Subscriptions", *Internet Article*, Retrieved from <http://web.archive.org/web/20051217013212/http://ranchero.com/netnewswire/helpBook/searchEngineSubs.html> on Nov. 13, 2008, 1 page.

"SearchFeed.png", *Print Screen in article*, Retrieved from <http://web.archive.org/web/20050623095831/http://ranchero.com/images/nnw2/searchFeed.png> on Nov. 13, 2008, 1 page.

"Searching.png", *Print Screen from article*, Retrieved from <http://web.archive.org/web/20050623095422/http://ranchero.com/images/nnw2/searching.png> on Nov. 13, 2008, 1 page.

"smartList.png", *Print Screen from Internet Article*, Retrieved from <http://web.archive.org/web/20050623095628/http://ranchero.com/images/nnw2/smartList.png> on Nov. 13, 2008, 1 page.

"Subscribing and unsubscribing", *Internet Article*, Retrieved from <http://web.archive.org/web/20060915152527/http://ranchero.com/netnewswire/helpBook/subUnsub.html> on Nov. 13, 2008, pp. 1-2.

"Supplemental Notice of Allowance", U.S. Appl. No. 10/781,586, (Jul. 18, 2008), 3 pages.

"Supplemental Notice of Allowance", U.S. Appl. No. 10/781,586, (Jun. 4, 2008), 2 pages.

"Supplemental Notice of Allowance", U.S. Appl. No. 11/036,910, (Jan. 5, 2011), 2 pages.

"Supplemental Notice of Allowance", U.S. Appl. No. 12/021,894, (Jan. 12, 2011), 6 pages.

"Syncing", *Internet Article*, Retrieved from <http://web.archive.org/web/20051217023557/http://ranchero.com/netnewswire/helpBook/syncing.html> on Nov. 13, 2008, 1 page.

"syncing.png", *Print Screen from article*, retrieved from <http://web.archive.org/web/20050623095327/http://ranchero.com/images/nnw2/syncing.png> on Nov. 13, 2008, 2 pages.

"Syndic8.com—Documents1", *Internet Article*, Retrieved from <http://web.archive.org/web/20050513214756/http://www.syndic8.com/documents/howto/> on Nov. 13, 2008, pp. 1-3.

"Syndic8.com—Documents2", *Internet Article*, Retrieved from <http://web.archive.org/web/20050622035505/http://www.syndic8.com/documents/howto/> on Nov. 13, 2008, pp. 1-3.

"Syndic8.com—HowToUse", *Internet Article*, Retrieved from <http://web.archive.org/web/20050619233841/http://www.syndic8.com/howto.php> on Nov. 13, 2008, pp. 1-4.

"The Feed Thickens", Retrieved from: <http://blog.flickr.net/en/2004/07/14/the-feed-thickens/>, (Jul. 14, 2004), 2 pages.

"US Provisional Application", U.S. Appl. No. 60/191,662, filed Mar. 23, 2000, 133 pages.

"Yahoo! Publisher's Guide to RSS : Submit your RSS Feed", *Internet Article*, Retrieved from <http://web.archive.org/web/20051216153612/http://uk.promotions.yahoo.com/publisher/submit.html> on Nov. 13, 2008, pp. 1-3.

"Yahoo! Search Services and Tools", *Internet Search Screen*, Retrieved from <http://web.archive.org/web/20051001065344/http://search.yahoo.com/mrss/submit> on Nov. 13, 2008, 1 page.

Anonymous, "The Evolution of RSS", (Online); XP002546010; Internet; Retrieved from the Internet: URL:http://web.archive.org/web/20041011055544/http://www.webreference.com/authoring//languages/xml/rss/1/7.html *the whole document*,(Oct. 11, 2004), 1 page.

Asche, Ruediger R., "Multithreading for Rookies", *Microsoft Developer Network Technology Group, Retrieved Apr. 17, 2002 from http://msdn.microsoft.com/library/en-us/dndllpro/html/msdn*_threads.asp?frame=true, (Sep. 24, 1993), 13 pages.

Attardi, G et al., "The LOA Customizable Media Aggregator", *Automated Production of Cross Media Content for Multi-Channel Distribution*, 2005. Axmedis 2005. First International Conference on Florence, Italy 30-02 Nov. 2005, Piscataway, NJ, USA, IEEE, November 30, 2005. XP010892440 ISBN: 978-0-7695-2348-4, pp. 1-8.

Ayers, Danny et al., "Beginning RSS and Atom Programming", Wiley Publishing, Inc.,(2005), pp. 1-54.

Benzinger, Brian "Google Reader Reviewed" Retrieved from: <http://www.solutionwatch.com/250/google-reader-reviewed> on Jun. 17, 2009, (Oct. 7, 2005), 5 pages.

Blair, Eric "Review: NetNewsWire 2.0", Retrieved from: <http://www.atpm.com/11.06/netnewswire.shtml> on Nov. 11, 2008, (Jun. 2, 2005), 12 pages.

Chen, Ya Bing et al., "Designing Valid XML Views", *Proceedings of the 21st International Conference on Conceptual Modeling, Lecture Notes in Computer Science*; vol. 2503, Available at http://citeseerx.ist.psu.edu/viewdoc/download;jsessionid=35490F03A4996C3741777B50D90D8EDF?doi = 10.1.1.66.1006&rep=rep1&type=pdf>,(2002), pp. 1-16.

Chen, Yi et al., "XK Validator: A Constraint Validator for XML", *CIKM 02*, ACM1-58113-492-04-02-011, (Nov. 4-9, 2002), pp. 446-452.

Chien, Shu-Yoa et al., "Efficient Schemes for Managing Multiversion XML Documents", VLDB Journal,(2002), pp. 332-353.

Dubinko, Micah et al., "XForms 1.0 W3C Working Draft", Retrieved from: <http://www.w3.org/TR/2001/WD-xforms-20011207/index-all.html> on Nov. 19, 2009, W3C,(Dec. 7, 2001), 88 pages.

Ducharme, "InfoPath and XForms", *InfoWorld*, Available at <http://www.weblog.infoworld.com/udell2003/02/26.html>,(Feb. 26, 2003), pp. 1-3.

Gill, Kathy E., "Blogging, RSS and the Information Landscape: A Look at Online News", *In Proceedings of WWW 2005*, (2005), 7 pages.
Hammersley, Ben "Content Syndication with RSS", *Chapter 10: Directories, Web Aggregators, and Desktop Readers*, O'Reilly books,(Mar. 2003), pp. 132-148.
Hammersly, Ben "Developing Feeds with RSS and Atom", *O'Reilly books*, O'Reilly Media, Inc.,(Apr. 2005), 10 pages.
Hardy, Matthew R., et al., "Mapping and Displaying Structural Transformations between XML and PDF", Proceedings of the 2002 ACM Symposium on Document Engineering 2002, ACM Press,(2002), pp. 95-102.
Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentials area.pdf>,(Jul. 18, 2004), pp. 1-26.
Huier, Zhang et al., "Design and Implementation of RSS-based Science and Technology Information Syndication System", *Library of Chinese Academy of Sciences*, (2005), pp. 1-15.
Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn__virtmm.asp?frame=true, (Jan. 20, 1993), 9 pages.
Verisign Inc., "Licensing VeriSign Certificates: Securing Multiple Web Server and Domain Configurations", *White Paper*, Available at <www.msctrustgate.com/pdf/licensing.pdf>,(Nov. 2, 2001), 15 pages.
"Advisory Action", U.S. Appl. No. 10/185,048, (Jun. 20, 2006), 3 Pages.
"Advisory Action", U.S. Appl. No. 10/185,048, (Sep. 16, 2005), 3 Pages.
"Advisory Action", U.S. Appl. No. 10/916,692, (Dec. 10, 2008), 3 Pages.
"EP Search Report", EP Application No. 00306806, (Jul. 16, 2003), 3 pages.
"EP Search Report", EP Application No. 05112241.4, (Mar. 18, 2010),10 pages.
"EP Search Report", EP Application No. 97307138, (Mar. 21, 2003), 3 pages.
"Final Office Action", U.S. Appl. No. 10/185,048, (Mar. 13, 2006), 14 Pages.
"Final Office Action", U.S. Appl. No. 10/185,048, (Jun. 3, 2005),14 Pages.
"Final Office Action", U.S. Appl. No. 10/916,692, (Oct. 2, 2008),10 Pages.
"Final Office Action", U.S. Appl. No. 10/988,732, (Nov. 12, 2010), 37 pages.
"Mott Porous Metal. The Most Reliable Means of Restricting Gas Flow", Mott Corporation Webpage, retrieved from <<http://www.mottcorp.com/industry/oem/oem_flowres.htm>>, 4 pages.
"Non Final Office Action", U.S. Appl. No. 09/599,806, (Mar. 12, 2003), 7 pages.
"Non Final Office Action", U.S. Appl. No. 09/599,806, (Aug. 17, 2004), 5 pages.
"Non-Final Office Action", U.S. Appl. No. 10/185,048, (Dec. 8, 2004),14 Pages.
"Non-Final Office Action", U.S. Appl. No. 10/781,586, (Oct. 20, 2006), 21 pages.
"Non-Final Office Action", U.S. Appl. No. 10/916,692, (Apr. 1, 2008), 9 Pages.
"Notice of Allowance", U.S. Appl. No. 09/599,806, (Jan. 21, 2005), 9 pages.
"Notice of Allowance", U.S. Appl. No. 11/012,472, (Nov. 24, 2010), 6 pages.
"PCT Search Report", PCT Application No. PCT/IB98/01392, (Apr. 9, 1999), 3 pages.
"PCT Search Report", PCT Application No. PCT/IB99/02003, (Nov. 28, 2000), 3 pages.
"PCT Search Report", PCT Application No. PCT/US99/09620, (Sep. 22, 1999), 3 pages.
"Restriction Requirement", U.S. Appl. No. 09/599,806, (Mar. 3, 2003), 5 pages.
"Restriction Requirement", U.S. Appl. No. 10/781,586, (Jun. 26, 2006),5 pages.
Baldwin, J F., et al., "A Mass Assignment Based ID3 Algorithm for Decision Tree introduction", *International Journal of Intelligent Systems, vol. 12, No. 7*, (1997), PP. 523-548.
Cloete, I et al., "CID3: An Extension of ID3 for Attributes with Ordered Domains", *South African Computer Journal, vol. 4*, (1991), PP. 10-16.
Iwantani, Kaori et al., "Perfect Manual of Clarisworks 4.0 for Macintosh", 1st Edition, Japan, (Jul. 22, 1997), 33 pages.
Mehta, Manish et al., "SLIQ: A Fast Scalable Classifier for Data Mining", available at http://www.dbis.informatik.hu-berlin.de/dbisold/lehre/WS0405/KDD/paper/MAR96.pdf>>, (Mar. 1996), 15 Pages.
Sebastiani, F "A Tutorial on Automated Text Categorisation", In Analia Amandi andRicardo Zunico, editors, Proceedings of ASAI-99, 1st Argentinean Symposium on Artificial Intellligence, Buenos Aires, AR, (1999), pp. 7-35.
Zaki, Mohammed J., et al., "Parallel Classification for Data Mining on Shared-Memory Multiprocessors", ACM, (Mar. 1999), PP. 1-8.
"Final Office Action", U.S. Appl. No. 11/234,767, (Mar. 10, 2011), 28 pages.
"Foreign Office Action", EP Application No. 05112241.4, (Dec. 23, 2010), 6 pages.
"Non Final Office Action", U.S. Appl. No. 11/567,140, (Feb. 18, 2011), 8 pages.
"Non-Final Office Action", U.S. Appl. No. 11/927,296, (Mar. 4, 2011),19 pages.
"Notice of Allowance", U.S. Appl. No. 11/931,730, (Feb. 2, 2011), 7 pages.
"Supplemental Notice of Allowance", U.S. Appl. No. 11/931,730, (Mar. 2, 2011),2 pages.
"Supplemental Notice of Allowance", U.S. Appl. No. 12/021,894, (Feb. 8, 2011),6 pages.
"Final Office Action", U.S. Appl. No. 10/976,451, (Apr. 6, 2011),10 pages.
"Final Office Action", U.S. Appl. No. 12/061,613, (Apr. 28, 2011),11 pages.
"Foreign Office Action", Japanese Application No. 2006-071589, (Mar. 29, 2011),9 pages.
"Notice of Allowance", U.S. Appl. No. 11/295,178, (Mar. 22, 2011),20 pages.
"Supplemental Notice of Allowance", U.S. Appl. No. 11/931,730, (Apr. 22, 2011),2 pages.
"Supplemental Notice of Allowance", U.S. Appl. No. 11/931,730, (May 6, 2011),2 pages.
Prosise, Jeff "Programming Microsoft Net", retrieved from: <http://academic.safaribooksonline.com/print?xmlid=0-7356-1376-1/DAVO3T>on Mar. 3, 2011, Microsoft Press,(May 15, 2002),24 pages.
Reilly, Douglas J., "Programming Microsoft Web Forms", retrieved from: <http://academic.safaribooksonline.com/print?xmlid=0735621799/systemdotwebdotuidotweb>on Mar. 3, 2011, Microsoft Press,(Nov. 2, 2005),52 pages.

* cited by examiner

Extension Tag

```
<edf:extension
urn = "urn:HelloNetDocs.netdocs.com"
name = "HelloNetDocs"
version = "1.0.0.0"
lastUpdate = "2000-01-15  8:43:52"
description = "Hello NetDocs"

>
        (...)
</edf:extension>
```

Fig. 4

EDF Schema

```
<?xml...>
<! --info about the extensions and linked extensions -- >
<edf:extension ...>

        <edf:edfLink ... />

<! --UI extensions -- >
        <edf:toolbars> ... </edf:toolbars>
        <edf:accelerators> ... </edf:accelerators>
        <edf:menuItems> ... </edf:menuItems>
        <edf:commandGroups> ... </edf:commandGroups>
        <edf:themes> ... </edf:themes>

<! -- Objects, Components and Behavior Extensions -- >
        <edf:Services> ... </edf:Services>

<! -- LocalStore Extensions -- >
        <edf:contentClasses> ... </edf:contentClasses>
        <edf:subscriptions> ... </edf:subscriptions>


</edf:extension>
```

Package Manifest

```
<?xml version "1.0" ?>
<Package  Size= "..." >
        <Files>
                <Group Name = "required".
                        <File Name="bar.dll" />
                        <File Name="foo.dll"  Hash="..."/>
                                <Dependencies>
                                        <File Name="bar.dll" />
                                </Dependencies>
                                <COMClass  ClassID="..."  />
                        </File>
                        <File Name="myextension.edf"  Hash="..."/>
                        <File Name="errorhandling.gif"  Hash="..."/>
                </Group>
                <Group Name = "offline">
                        <File Name="bar.xml"  Hash="..."/>
                        <File Name="abc.gif"  Hash="..."/>
                        <File Name="xyz.gif"  Hash="..."/>
                        <File Name="foo.htm"  Hash="..."/>

                </Group>
                <Group Name = "ondemand">
                        <File Name="foo2.htm"   Hash="..."/>
                </Group>
        </Files>
</Package>
```

Fig. 6

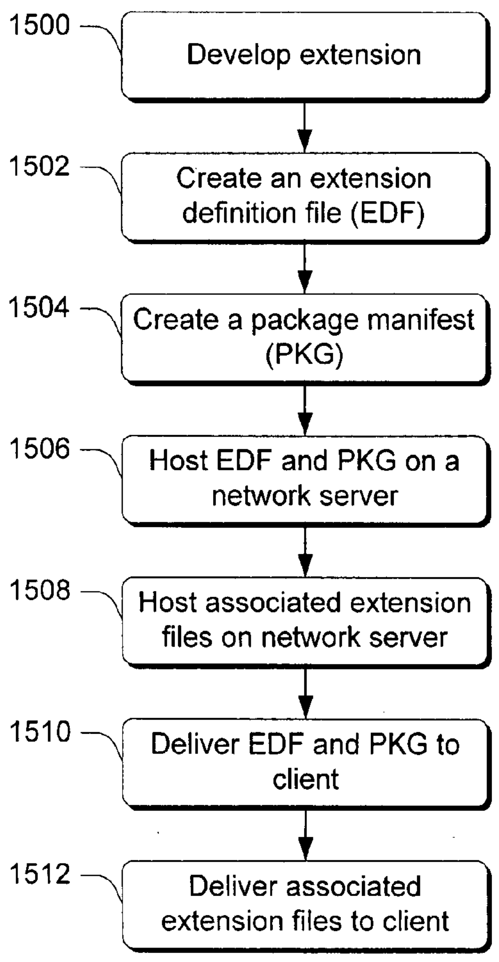

Fig. 15

```
<cat:extensionCatalog  xmlns:cat="urn:schemas-microsoft-
com:netdocs_edfcatalog.v1"
        lastUpdate="2000-01-15  8:43:52"
        description = "Catalog of extensions from hosted
service"
>
<cat:extension  extensionURN="urn:planner.netdocs.com"
        name="Planner"
        packageURN ="urn:planner.netdocs.com.ENv1"
        url="http://netdocs/extensions/planner/v1/EN/sc.cab"
        language="English"
        version="1"
        defaultLanguage="yes"
/>
<cat:extension  extensionURN="urn:planner.netdocs.com"
        name="Planner"
        packageURN ="urn:planner.netdocs.com.FRv1"
        url="http://netdocs/extensions/planner/v1/FR/sc.cab"
        language="French"
        defaultversion="yes"
        version="1"
/>
<cat:extension  extensionURN="urn:planner.netdocs.com"
        name="Planner"
        packageURN ="urn:planner.netdocs.com.ENv1.1"
        url="http://netdocs/extensions/planner//v1.1/EN/sc.cab"
        language="English"
        version="1.1"
        defaultLanguage="yes"
        defaultversion="yes"
/>
</cat:extensionCatalog>
```

Fig. 16

NETWORK-BASED SOFTWARE EXTENSIONS

RELATED APPLICATIONS

This application is a continuation of and claims priority to U.S. patent application Ser. No. 09/599,048, the disclosure of which is incorporated by reference herein. The following patent applications are related to the present application, are assigned to the assignee of this patent application, and are expressly incorporated by reference herein:

- U.S. patent application Ser. No. 09/599,298, entitled "Single Window Navigation Methods and Systems", filed on the same date as this patent application;
- U.S. patent application Ser. No. 09/599,806, entitled "Methods and Systems of Providing Information to Computer Users", filed on the same date as this patent application;
- U.S. patent application Ser. No. 09/599,299, entitled "Methods, Systems, Architectures and Data Structures For Delivering Software via a Network", filed on the same date as this patent application;
- U.S. patent application Ser. No. 09/599,813, entitled "Authoring Arbitrary XML Documents Using DHTML and XSLT", filed on the same date as this patent application;
- U.S. patent application Ser. No. 09/599,812, entitled "Architectures For And Methods of Providing Network-based Software Extensions", filed on the same date as this patent application;
- U.S. patent application Ser. No. 09/599,086, entitled "Task Sensitive Methods And Systems For Displaying Command Sets", filed on the same date as this patent application.

TECHNICAL FIELD

This invention relates to methods and systems for providing software via a network. More specifically, the invention pertains to Internet-based delivery of software.

BACKGROUND

Installation of traditional PC applications requires physical media, such as a disk or CD-ROM that must be physically inserted into a computer in order for software to be loaded onto a user's computer. Typically, this process requires the user to enter settings information that can be confusing to the user. Once the software is installed, it is typically fixed in terms of its location and functionality. When the software is updated, the user must typically purchase additional physical media and repeat the installation process so that they can use the updated software. In this model, the software is fixed in its association with the computer on which it was installed. If a user moves to another computer, they will not be able to use the specific software on their machine without repeating the installation process.

As computing continues to evolve into the environment of computer networks such as the Internet, it has become clear that the traditional software delivery model described above is inadequate to meet the demands of consumers who desire dynamic, flexible, and adaptable software on-demand. Network-based software delivery is becoming the subject of increasing focus by those who develop and deliver software. Unlocking the potential for network-based software delivery will require smart, innovative and streamlined solutions, especially in situations where bandwidth may be limited.

Accordingly, this invention arose out of concerns associated with providing new software delivery models that are particularly well-suited for network-based software delivery, e.g. delivery via the Internet.

SUMMARY

Methods and systems for network-based software delivery are described. In one embodiment, an application program or software platform resides on a client. The program or platform is configured so that it is extensible based on software extensions that are deliverable over a network such as the Internet. Various extensions can be developed by third party developers for incorporation into the program or platform.

In one described embodiment, extension files that comprise a software extension are hosted on a network server such as an Internet server. These include descriptor files that describe aspects of the software extension. These descriptor files logically describe an extension to the program or platform and designate the location of other extension files. Extensions are incorporated on a client by navigating to a particular network or Internet site through which the extensions can be accessed. The files describing the extension files are downloaded on the client. These files tell the client where, when and how the particular extension can be plugged into the program or platform, as well as where to find the appropriate extension files and how to download them. The extension files are then downloaded and incorporated into the platform.

In one embodiment, an inventive software architecture is provided for handling and consolidating particular types of descriptive files associated with various extensions. A filtering mechanism called attachment points, is used to create handlers for the different descriptive types of files that define a software extension. Each of these handlers is known as an attachment manager. Attachment managers are provided for each extensible feature type. The attachment managers interpret data from extensions files which are supplied by attachment points. In addition to predefined attachment managers, custom attachment managers can be created using data from attachment points. When an extension extends a particular feature type, the attachment points ensure that only the appropriate attachment manager is notified so that the feature type can be incorporated into the program or platform efficiently.

BRIEF DESCRIPTION OF THE DRAWINGS

FIG. 4 shows a portion of an EDF in accordance with the described embodiment.

FIG. 5 shows a portion of an EDF schema in accordance with the described embodiment.

FIG. 6 shows a portion of a PKG in accordance with the described embodiment.

FIG. 15 is a flow diagram of steps in a method in accordance with the described embodiment.

FIG. 16 shows a portion of an exemplary catalog structure in accordance with the described embodiment.

DETAILED DESCRIPTION

Overview

The methods and systems described just below provide a mechanism by which functionality can be added dynamically to an application program or software platform. Functionalities or "extensions" as they will be referred to, can be advantageously added via a network such as the Internet. Extensions, that can implement new features or add to existing features, can be added using only a network address, such as a URL, as a basis for extension installation. That is, all of the files that comprise an extension can be maintained on the network and accessed via one or more network sites.

Extensions can be described in a variety of ways. One way utilizes a hierarchical tag-based language which facilitates handling and use of the various extensions. In one particular implementation, a software platform is provided that can incorporate various functionalities. The software platform and the inventive architecture described below enable third and fourth party developers to develop extensions for the platform that can be easily and seamlessly incorporated into the platform without having any knowledge of (or relationship with) a hosting service. A third party developer is a developer who develops an extension for the platform. A fourth party developer might be a developer who develops an extension to a third party developer's extension. Thus, the incorporation of third and fourth party extensions is essentially a transparent process, as far as developers are concerned.

Figure 1:
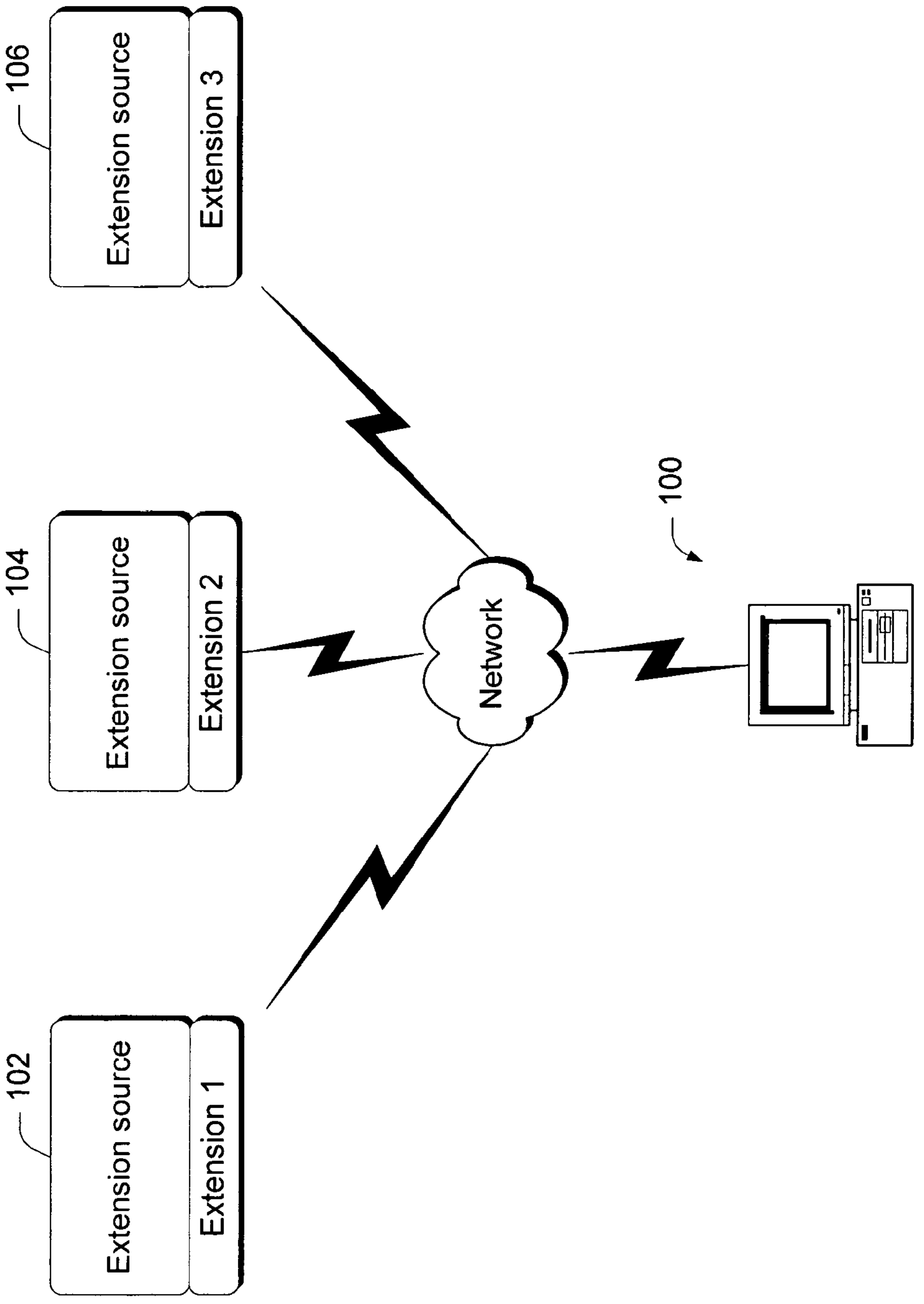
FIG. 1 is a high level view of a system that can be utilized in accordance with one described embodiment.

Consider for example, FIG. 1 which shows a user's computer 100 and several so-called extension sources 102, 104, and 106. The extension sources can comprise any entity from which a software extension can be obtained via a network. In an exemplary implementation, the network can comprise the Internet, although other networks (e.g. LANs and WANs) can certainly be utilized. Extension sources can include, without limitation, business entities such as retail stores that might maintain a network site. In one implementation, a user can execute software on their computer that provides an application program or software platform. In this document, the terms "application program" and "software platform" will be used interchangeably. Each of the different extension sources 102-106 can provide software extensions that can plug into the software platform that is executing on the user's machine. These extensions are deliverable via a network such as the Internet, and assist in providing applications that can be executed on the user's machine. In the described embodiment, the extensions are logically described in XML which is in line with emerging industry standards. Additionally, the use of XML assists in the future discoverability of extensions by promoting XML DOM properties on the Internet. It will be appreciated, however, that any suitable format can be used for describing the extensions, e.g. a binary description could be used.

Extensions can be delivered from any number of different extension sources. The inventive methods and systems provide a streamlined and organized way to handle the provided extensions. The use of XML advantageously enables efficient handling of extensions from multiple different extension sources, without unduly taxing the software components that utilize specific portions of an extension or extensions.

In one particular implementation, the software platform on the user's machine provides various different integrated functionalities that enable a user to accomplish different document-centric tasks. An exemplary system is described in the U.S. Patent Application entitled "Single Window Navigation Methods and Systems", incorporated by reference above.

Exemplary Computer Environment

The embodiment described just below can be employed in connection with various computer systems. A computer system, for purposes of this document, can be considered as any computing device that includes some type of processor, i.e. a microprocessor, and some type of operating system. Thus, a computer system can be construed to include, without limitation, traditional desktop computers, more powerful servers, various hand-held devices such as cell phones, pocket-held computer devices and the like.

Figure 2:
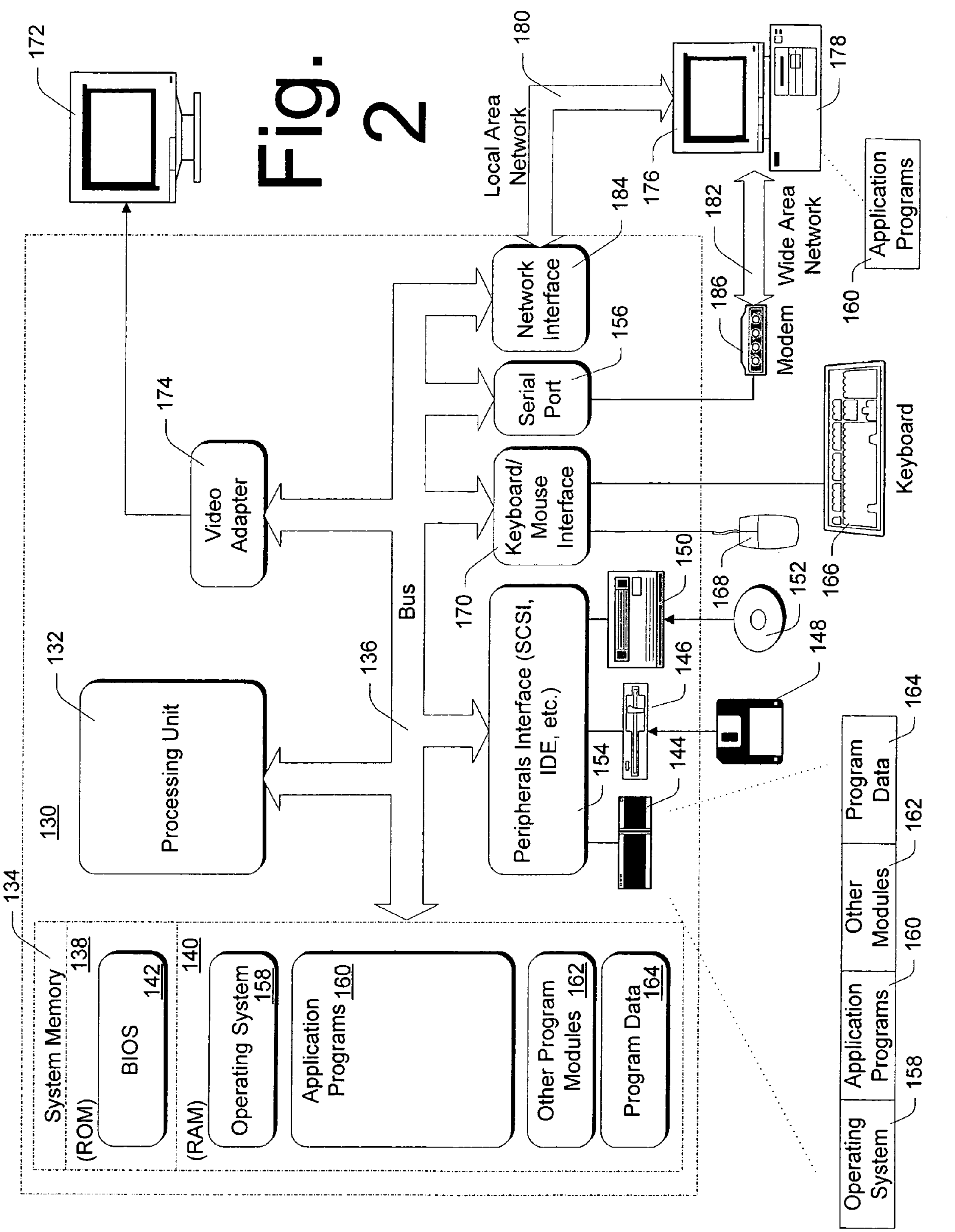
FIG. 2 is an exemplary computer system that can be utilized in accordance with the described embodiment.

FIG. 2 shows but one exemplary computer system that can be used to implement the embodiments described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Extensions

An "extension", as used in this document, will be considered to include, without limitation, software functionality and content that can be added to an application program or software platform. These additions typically provide some type of functionality that the application program may not have had before the extension was incorporated, or alter the behavior of at least one existing feature. The extension is incorporated or integrated directly into the application program in a way that changes, to some degree, the manner in which the application program behaves or operates. Extensions provide dynamically added content and can provide applications (such as an email application), plug-ins to extend existing applications (like a fax plug-in to an email application), or simply web pages, to name just a few.

In the described embodiment, extensions are described using XML, an industry-standard, text-based markup language. XML greatly facilitates the extensibility of software content. Specifically, various extensions can be authored by third parties and described in XML in a manner that enables the extensions to be readily integrated into application programs. It should be appreciated, however, the XML constitutes but one exemplary way of describing and using the extensions. Other ways can, of course, be used.

Exemplary Extension Organization

In the described embodiment, extensions are organized in three separate but related portions: an Extension Definition File (EDF), a Package Manifest (PKG), and the code, components, or "bits" that make up or define the extension. An EDF can be, but need not be associated with a URL (Universal Resource Locator) that provides a way for a client to access the EDF. By convention and choice, the PKG file is located at the same URL as the EDF. It will be appreciated that the described EDFs and PKG are each not required for the other to be used. It just so happens that, in the example that is given is this document, the two are employed together. To that end, each of these features can be separately and independently employed.

EDFs describe logical attachments to an application program or software platform, while PKGs specify the physical files and resources that are used in an extension. There can be a one to one correspondence between EDFs and PKGs.

Figure 3:
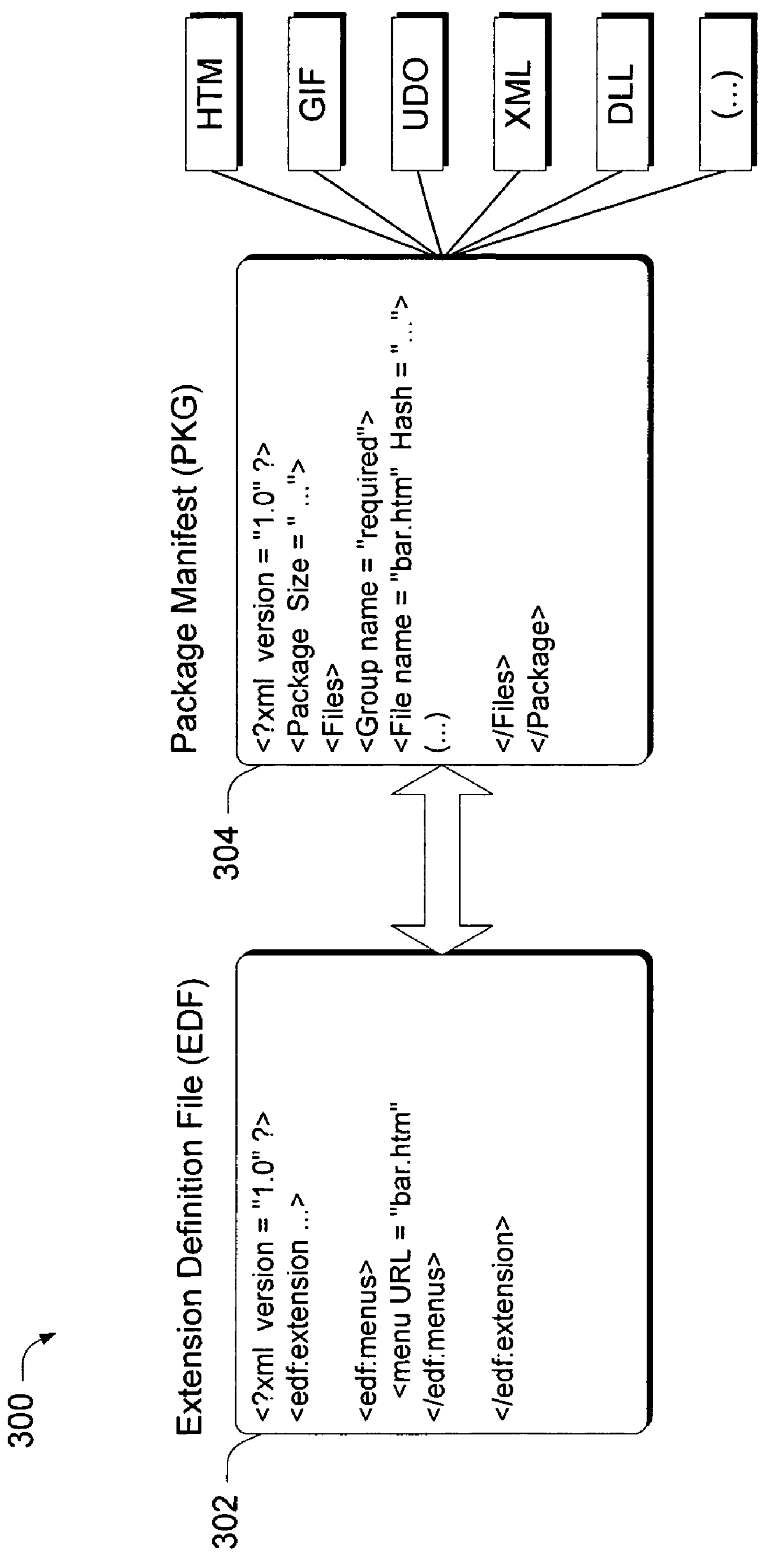
FIG. 3 is a diagram of an exemplary EDF and PKG in accordance with one described embodiment.

FIG. 3 shows an exemplary organization 300 that includes an EDF 302 and a corresponding package manifest (PKG) 304. In the illustrated example, the EDF 302 uses XML to describe the logical attachments or extensions to an application program. The corresponding PKG 304 specifies the physical files and resources that are associated with a particular extension. Exemplary file types are shown to the right of PKG 304 and include, without limitation, HTM, GIF, UDO, XML, DLL, and various other types of files.

Extension Definition File (EDF)

In the described example, an EDF is an XML file that logically describes an extension. For example, the EDF can describe HTML that makes up a user interface (UI), the objects that contain code for implementing various functions, and the like. The EDF can also contain all or part of the functionality that comprises an extension. For instance, the HTML that describes a toolbar could be incorporated directly into an EDF file, and a toolbar attachment manager could read it from the EDF file, instead of from a URL. The information contained in the EDF is processed and (together with the information contained in the PKG), the appropriate files are automatically installed on a user's computer. This is done unobtrusively without manipulating the computer's persisted settings, as might be found in the user's system registry.

An EDF, implemented in XML, contains various tags that are associated with various extensions. The various tags can correspond to:

User interface elements

Behaviors/Components/Objects

Store Elements

User-defined objects

Or anything else that represents a point of extensibility in the application or platform EDFs advantageously have an "open schema" which means that third party developers can extend the extension mechanism and include their own extensions by creating their own tags. Additionally, extensions can themselves be extended by other developers. EDFs can also have one or more predefined tags. Exemplary predefined XML tags for user interface elements can include tags for feature types such as: tool bars, accelerators, menu items, and themes. These feature types are utilized in the single navigable window application incorporated by reference above and defined in the table immediately below:

TABLE 1

| Feature Type | Definition |
|---|---|
| Tool Bars | Horizontal command containers above the document area. |
| Accelerators | Keyboard shortcuts for commands |
| Menu Items | Pop-up or drop-down menu choices that third parties can add to well-known, named menu attachments in the platform |
| Themes | A data-driven way to provide overrides for well-known resources of the platform, such as default buttons or default style sheet |

Exemplary predefined XML tags for behaviors/components/objects include tags for Services. These feature types are utilized in the single navigable window application incorporated by reference above and defined in the table immediately below:

TABLE 2

| Feature Type | Definition |
|---|---|
| Services | Services are objects that extend existing objects (such as the application, window, or document) in the application or platform's Object Model. For example, editing functions use Object Model Attachments attached to the window or document that maintain document context and editing state per-window. These can also include Object Model Attachments attached to the application (such as a spellchecker dictionary object) |

Exemplary predefined XML tags for store elements include tags for content classes and offline data sources. These feature types are utilized in the single navigable window application incorporated by reference above and defined in the table immediately below:

TABLE 3

| Feature Type | Definition |
|---|---|
| Content Classes | Allow extension writers to define new types of XML documents with new schemas. |
| Offline Data Sources | Allow for extension writers to define store replication instructions in an EDF. |

EDF Schema

In the described embodiment, the EDFs have a particular XML schema that is utilized. The schema comprises collections of XML tags that are arranged in a hierarchical organization to facilitate information dissemination to software components that need certain extensions. In the described embodiment, the outer (encompassing tag) for EDFs is an "extension" tag.

FIG. 4 shows an exemplary extension tag. "extension" tags can include one or more of the following attributes, all of which are optional:

TABLE 4

| Attribute | Definition |
|---|---|
| urn | ID for the extension. It allows extension writers to specify relative locations for content in EDFs without using relative paths or fixed URLs. It also allows hosting administrators to move around extensions on servers without breaking any links. |
| name | Name that can be used in a status bar or message display |
| version | Vendor-determined version number for the extension. |
| lastUpdate | Date/time that the EDF was last modified. |
| description | Brief description of the extension. |

Within the "extension" outer tag are one or more child tags, also referred to as "top level tags". These top level tags are each associated with a feature type that can be added by a particular extension. Exemplary feature types are discussed in connection with Tables 1-3 above. Underneath each top level tag there can be one or more child tags that are individually associated with a particular feature of the feature type that is to be added by a particular extension.

FIG. 5 shows an exemplary XML schema organization in accordance with this embodiment. For each top level tag in an EDF, there is an associated attachment manager which is a software component that receives data associated with the tag so that the data can be used to incorporate the extension into the platform or application program. Different attachment managers may interpret the data from the tag in different ways to provide different types of extensibility, so different top level tags will contain different types of data in different structures. This will become more evident in the "Architecture" section below. Note that the "edf:" XML namespace qualifier enables support of an open schema where extensions can provide their own tags and corresponding attachment managers. Tags within the edf namespace are used by built-in attachment managers in the application or software platform. Tags in other namespaces are used by third-parties to provide additional points of extensibility.

Package Manifest (PKG File)

The package manifests (PKGs) assist in organizing the downloading of software in the form of multiple files over a network such as the Internet. The PKGs are advantageously employed, in the example given in this document, with EDFs. As pointed out above, however, the techniques discussed in connection with the PKGs can be deployed independently of EDFs and in any suitable scenario where it is desirable to deliver software over a network such as the Internet. While the EDFs describe the logical attachment of extensions into an application program or platform, the package manifest's role is to assist in one or more of: organized delivery, validation and/or, updating of files associated with the various extensions that can be provided.

In designing a delivery mechanism for Web-assisted delivery of software content or files, several considerations are of interest.

Whenever possible, it is desirable to reduce the size of required downloads during update and installation operations. To address this consideration, software content is broken into multiple packages. Each package contains a group of one or more files that implement a common or well-defined functionality. By breaking the content into individual packages, the size of the required download during installation and update can be minimized. Each package is then described by a package manifest (PKG) that includes file information such as file locations and hash values that can be used for validation or security and versioning.

It is also desirable to give the end user a Web-like experience. To do this, extensions are loaded in a manner that feels to a user more like they are loading a web page, rather than traditional software packages where the user has to wait until the entire package is loaded before they can interact with it. In the described embodiment, users are given a web-like experience by streaming the extension files down to the client so that a user can begin to interact with an application program much sooner than if they had to wait for the entire software application program to load. For example, if there are user interface (UI) image files streaming down, the user can see the UI as the files stream in. Consider, for example, the single application program having the multiple different functionalities that is described in the patent application incorporated by reference above. A user might browse to an email functionality and download the files that are necessary to interact with the email functionality. Files that are associated with another different functionality would then be downloaded after the files associated with the email functionality. In this way, the user can begin to operate within a particular functionality without having to wait for all of the files associated with all of the other functionalities.

Another consideration of interest pertains to the efficiency with which the extension files or "bits" are delivered to the client. To address this consideration, the described embodiment utilizes a couple of different download approaches: a throttled download and a background download. Throttled downloading conducts download operations while taking into account the available bandwidth and type of media over which the files are being transferred. Any suitable throttled download process can be employed and will be understood by those of skill in the art. Background download is conducted while the user is working within the application program and is implemented by allocating a background thread so that the user can continue their work. One optimization that is utilized is that packages are prioritized and delivered in accordance with what a user might be working on.

Another consideration is associated with optimizing the user's computing experience. Here, the user's experience is optimized by making available the most common scenarios for the user. This is effectively directed to giving the user the functionality that they want first, and then, through the background download process, providing the code that implements functionalities that the user might use in the future. To determine which functionalities a user desires to have first, an automated scenario-based packaging process is provided that runs against file usage logs from scripted scenarios.

All of these considerations and the inventive solutions directed to addressing the considerations are discussed in detail in the sections that follow below.

Package Manifest Definition

In the described embodiment, a package manifest (PKG file) comprises a list of files that are utilized in a package. The list is advantageously compressed somewhat and digitally signed. Each package manifest can contain a list of one or more files each of which can include an associated hash, as well as download directives that control caching of the files. Once an extension is authored, a software tool can be used to generate the package manifest.

In addition, the package manifest can specify several other pieces of information:

File Group

All files in an extension can be labeled according to a number of predefined file groups. The file group of a particular file determines when the particular file gets downloaded, where it is stored on the client, and how it gets packaged. In the described embodiment, four predefined file groups are provided and are listed and described in the table immediately below:

| Group name | When downloaded | Where stored on the client | Packaging | Content |
|---|---|---|---|---|
| Required | Downloaded before any other files in the extension. | NetDocs package cache | All required files in an extension are packaged together as a CAB* file. | DLLs included so that a user will not have to wait for a prolonged period of time before clicking on a UI element |
| Offline | Offline files start getting downloaded as soon as Required are down. Providing the user stays on line long enough, these files will all get downloaded and will later be available for offline use. | NetDocs package cache | File are sent down individually. | Bulk of the UI files. |
| On demand | Only downloaded when they are requested for the first time. | NetDocs package cache | Files are sent down individually. | To avoid using up disk space on the client, advanced features can be put in this category. |
| Online only | Downloaded on demand. Content is only available when the user is online. | WinInet Cache | Files are sent down individually | Content that is not to be provided offline. Examples include help pages and other content that can |

-continued

| Group name | When downloaded | Where stored on the client | Packaging | Content |
|---|---|---|---|---|
| | | | | consume a large amount of disk space. |

*CAB stands for the CABinet technology that Internet Explorer uses to package bits for download. CAB files average from 2 to 3:1 compression, and are optimized for quick expansion. CAB files have the added security benefit that they are easily signed.

File Download Priority

Files in each group are listed according to the order in which they should be downloaded. This download order is implicit in the ordering of the files in the package manifest, an example of which is shown in FIG. 6.

Hash Value for Security/Versioning

Individual files in the package manifest can have an associated hash value. Each hash value is generated by running the file through an encryption algorithm. An exemplary encryption algorithm is Microsoft's CryptoAPI. In the illustrated example, each file can be listed with a base 64-encoded hash value, so that the file can be validated once the content arrives at the client. Specifically the package manifest is sent to the client in a secure manner (i.e. it is digitally signed). The package manifest contains the hash values for individual files. When the individual files are received by the client, each of the files can be run through the same Crypto API that was used to provide the hash values in the package manifest. If the hash values for a particular file compare favorably, then the file has not been altered and is secure.

Figure 7:
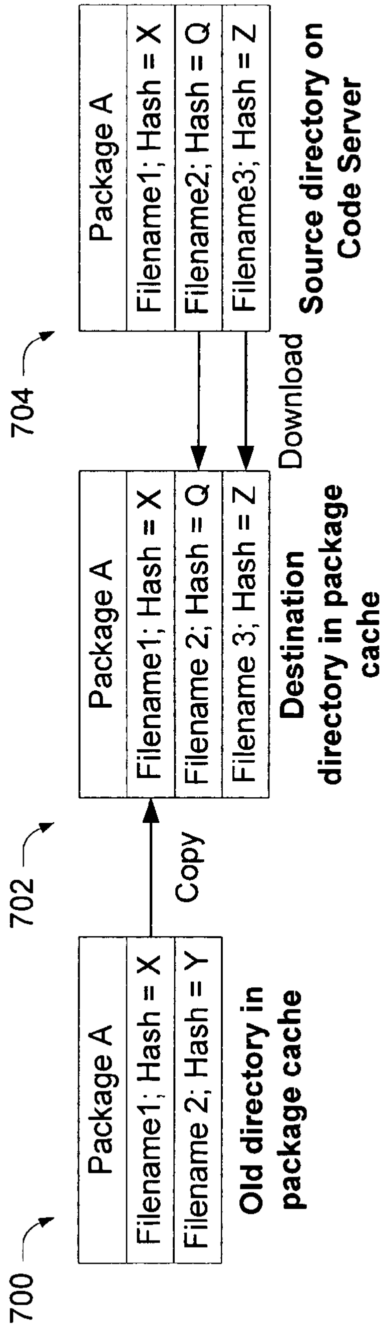
FIG. 7 is a block diagram illustrating how file hashes can be used for versioning in accordance with one embodiment.

When a file is updated, hash values can serve a useful purpose in identifying files that have not been changed between different versions of an extension. Consider FIG. 7, for example. There, an old directory 700 in a client package cache contains package A which include two files—file 1 with hash=x, and file 2 with hash=y. Assume that this package is associated with an older version of an extension. When an updated version is produced, its package manifest is delivered to the client. The updated extension version is represented on a source directory of a code or web server 704. The package manifest includes the hash values for all of the files in the new extension version. A new client destination directory 702 is defined for all of the files of the new extension. If any of the hash values for files in the new extension are the same as the hash values of the files in the old directory 700, then those files can be copied directly from the old directory 700 to the new destination directory 702. In this example, file 1's hash value is the same as the hash value for file 1 on the source directory 704, so it can be copied into the new destination directory 702. File 2's hash value, however is different from the hash value for file 2 on the source directory, so it is not copied from the old directory 700. Rather, file 2 is downloaded from the code server. A new file 3 has been added and is also downloaded from the code server. Hence, in this example, a new version of an extension resulted in a download of less than all of the files in the extension version. This is because hash values for each of the files in the old extension version were able to be compared with hash values of the files in the new extension version. Those hash values that are the same indicate files that have not changed as between versions.

Using hash values for versioning has two important advantages over traditional versioning schemes. First, the update process is automatic. That is, with an explicit version number, it is possible to forget to update the version number when shipping a new release of a file. Using hash values avoids this problem. Second, versioning does not rely on file types. Specifically, traditional versioning schemes commonly embed version information within files; however, not all files (e.g. GIF files) support embedded version information. In the present example, using hash values for versioning does not depend on whether a particular file type supports or does not support embedded version information. In addition, the version information can be stored separately from the file itself. Thus, access to actual file to determine whether it is current is not needed.

Total Storage Size of Package

The total storage size of a package is useful at download time to verify that the user has sufficient disk space.

ClassID's for the DLLs

Listing ClassIDs for each DLL is necessary to enable script writers to create classes by scripting against the OM. Additionally, this enables a determination of which package contains the code for a particular class.

DLL Load Dependencies

The reason for the dependencies section is to allow for legacy code that relies on being loaded by virtue of being in the search path of some other dll. In this case we have to make sure that the dependency dll is in the package cache directory before the dependant dll is loaded. FIG. 6 shows an exemplary package manifest 600 that is defined in a hierarchical tag-based language. Advantageously, the tag-based language comprises XML which is desirably extensible and flexible. In this example, a number of tags are provided in a hierarchical arrangement. The "package" tag contains information about the size of the package. The "files" tag is a child of the "package" tag and contains information about the file groups that are contained in that particular package. The "file" tag is a child of the "group" tag and contains information about specific files that comprise the extension, i.e. file name and hash value. A "dependency" tag is provided as a child of the "file" tag and lists any dependencies as discussed above. A "COMClass" tag is also provided as a child of the "file" tag and contains IDs as mentioned above. The ordering of the file groups in this schema implicitly defines the download order of the files.

Package Delivery

To optimize package delivery, two different delivery schemes are utilized. First, a throttled download approach is utilized using known throttling download techniques. Here, considerations such as available bandwidth and media over which the extensions are being provided are considered.

Second, a background download approach is utilized. Background downloads enable a user to continue to work within an application program while content is downloaded. Foreground downloads are used when the user has explicitly requested a file/extension by clicking, for example, on an extension link, or requested an action, for example, by clicking on the "Compose" mail button, that requires download of files which are not available locally.

Figure 8:
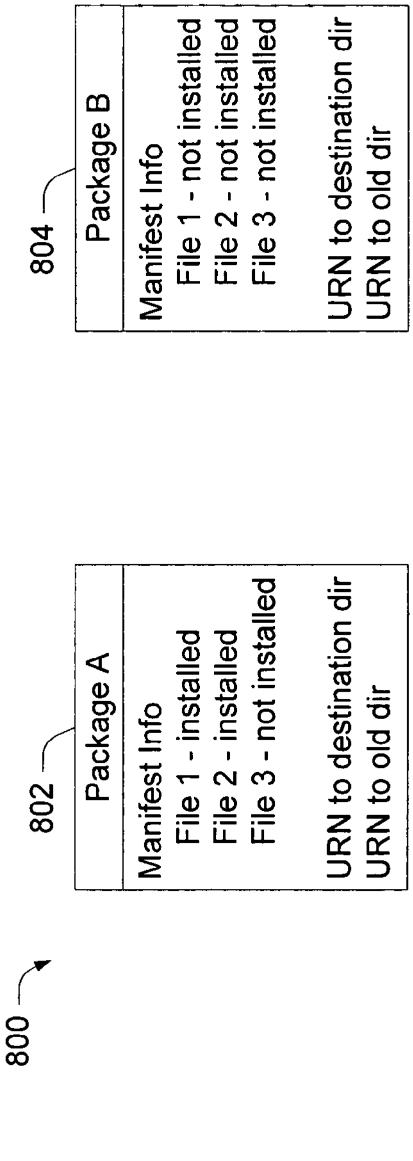
FIG. 8 is a block diagram that illustrates two exemplary package objects in accordance with one embodiment.

Along with background downloads, a queue management feature is provided. Specifically, when an extension must be installed or updated, a package manager, which is essentially a software component that manages packages, is provided with the following information:

- URL for the package manifest information on a code server
- URN for package destination directory in the package cache at the client
- (Optional) URN for the old package directory (if one exists) in the package cache From this information, the package manager creates a package object and adds the package object to a download queue. The download queue is designed for easy rearrangement of a package download order. Consider, for example, FIG. 8 which shows a portion of a download queue 800 that contains two package objects—package object 802 (corresponding to package A) and package object 804 (corresponding to package B). The package objects maintain a list of which files of a corresponding package have been downloaded or installed. In the present example, files 1 and 2 from package A have been installed while file 3 has not been installed; and files 1, 2, and 3 have not been installed from package B. The download queue can be rearranged based on what the user is doing. That is, based on the actions that a user takes, the priority of files that are to be downloaded can be changed. In this example, the package manager is designed to process the first uninstalled file in the package at the head of the download queue. If, however, the user starts to use a file in an extension that is different from the extension whose files are at the head of the download queue, the corresponding package for the file that the user has started to use can be moved to the head of the download queue. Because a file's package is specified by its URN, the file's package can be quickly identified and located in the download queue. For example, and considering FIG. 8, if one of the files in package B is requested before the package manager has started to install package A's third file, then package B will be moved to the head of the download queue.

Figure 9:
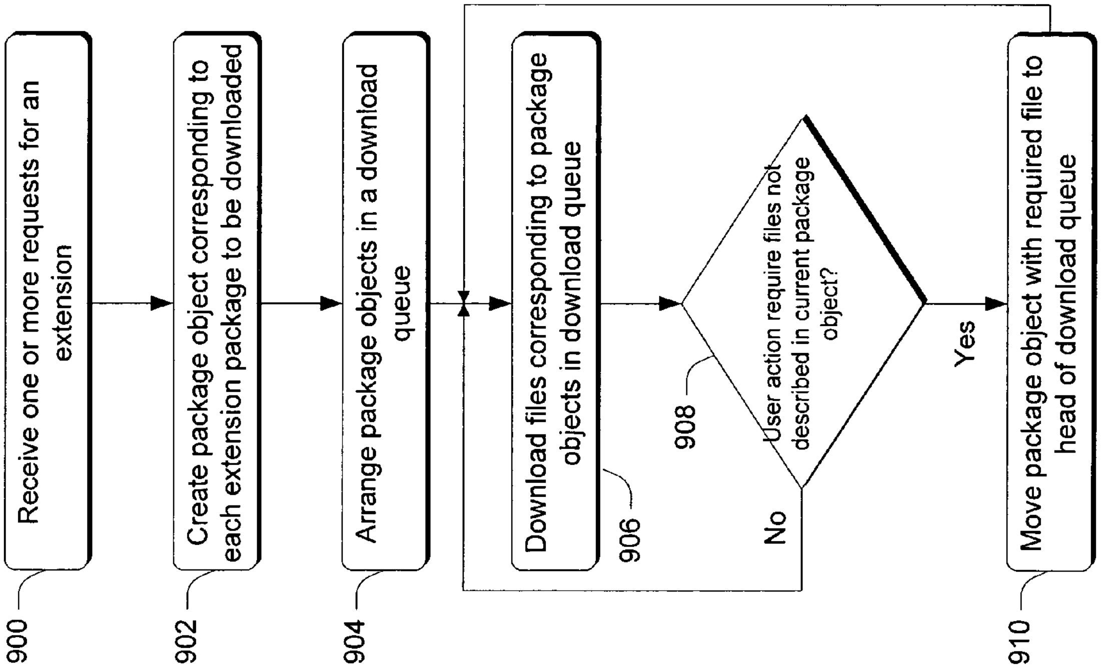
FIG. 9 is a flow diagram that describes steps in a method in accordance with one described embodiment.

FIG. 9 is a flow diagram that describes steps in a download queue management method in accordance with the described example. The method can be implemented in any suitable hardware, software, firmware or combination thereof. In the present example, the method is implemented in software.

Step 900 receives one or more requests for an extension. The requests can be generated in any suitable way. Step 902 creates a package object that corresponds to each extension package that is to be downloaded. Step 904 arranges the package objects in a download queue. Step 906 then downloads files corresponding to the package objects in the download queue. This step can be implemented by, for example, starting at the head of the download queue and downloading files until all of the files for a package object have been downloaded, and then moving to the next package object. Step 908 ascertains whether a user action requires a file that is not described in the current package object. If the user's action does not require a file not described by the current package object, then the method branches back to step 906 and continues to download files associated with the current package object. If, on the other hand, the user's action requires a files that is not described in the current package object, then step 910 moves the package object associated with the required file to the head of the download queue and begins to download files associated with this newly-repositioned package object. This step can be implemented by ascertaining which package object is associated with the required file by ascertaining the URN associated with the file. This URN specifies the file's package so that its package object can be quickly located and moved to the front of the download queue.

Package Creation

One of the innovative features of the described embodiment is its extensibility. That is, a software platform is provided in the form of an application program that can be extended by various third-party user-defined extensions. These extensions are delivered via the Web and are integrated directly into the software platform. In order to provide an organized delivery process, packages should be created in a uniform manner so that they can be predictably handled and integrated into the software platform.

In accordance with the described embodiment, each package should correspond to an end-user feature. For example, in the patent application incorporated by reference above, separate packages are provided for each of the email, contacts, document authoring, and planner functionalities. If packages that do not depend on one another share a dependency, then this shared dependency should become its own package. For example, there is no reason why the email and document authoring functionalities should depend on one another, yet both of them require the ability to publish content. By separating the publishing functionality into its own package, a certain amount of download order flexibility is preserved. Depending on what the user starts to work on, the files corresponding to the email functionality or the document authoring can be downloaded first.

Figure 10:
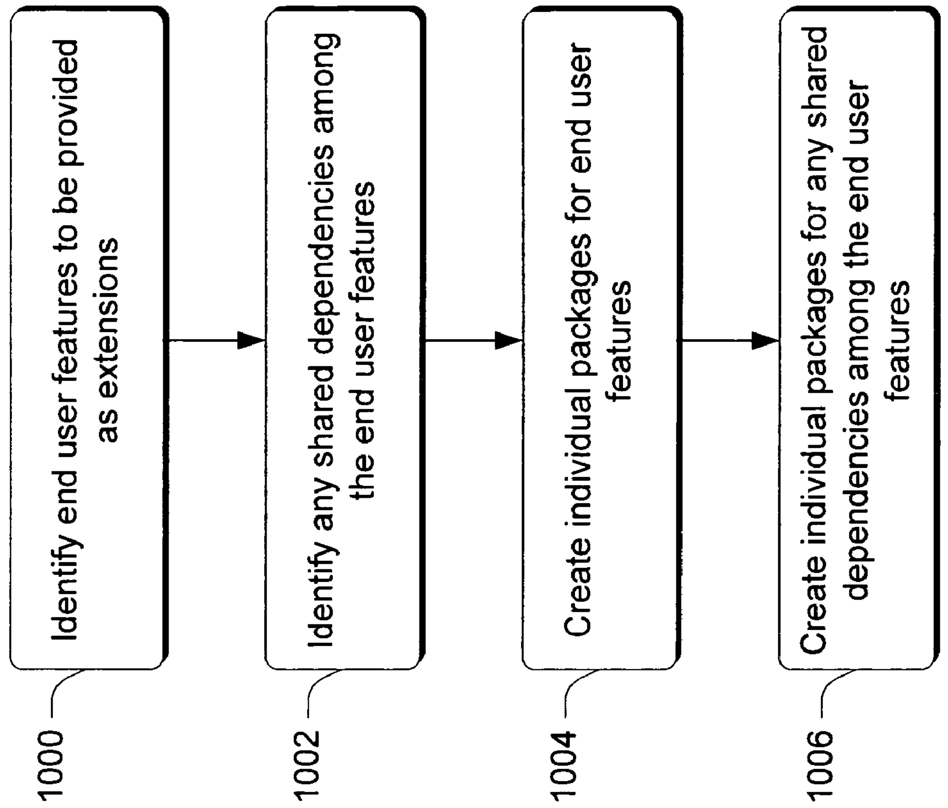
FIG. 10 is a flow diagram that describes steps in a method in accordance with one described embodiment.

FIG. 10 is a flow diagram that describes steps in a package creation method in accordance with the described example. The method can be implemented in any suitable hardware, software, firmware or combination thereof. Portions of the method might, however, be implemented manually.

Step 1000 identifies end user features that are to be provided as extensions. Step 1002 identifies any shared dependencies among the end user features. Step 1004 creates individual packages for the end user features. Step 1006 creates individual packages for any shared dependencies among the end user features.

Automated Package Manifest Creation Tool

Advantageously, and in accordance with one implementation, an automated package manifest tool is provided and takes various input parameters and automatically creates a package manifest. The tool can be available to third parties to assist them in creating a package manifest.

Figure 11:
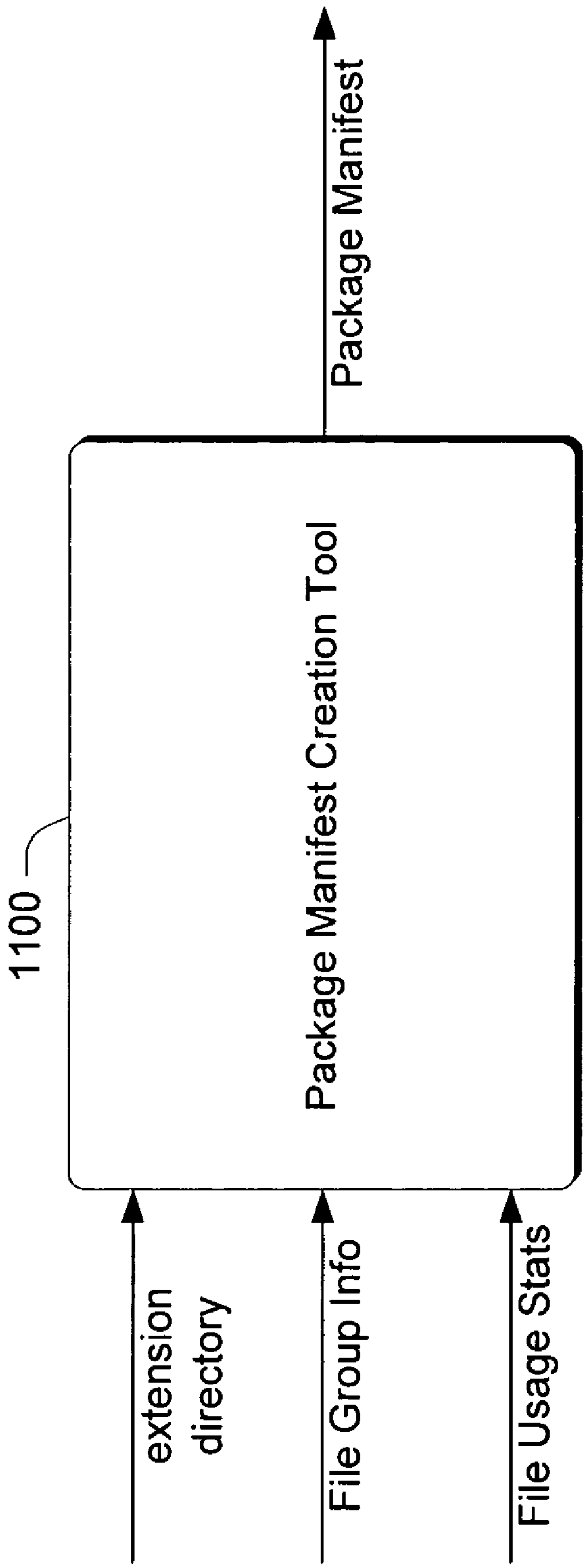
FIG. 11 is a block diagram that illustrates an exemplary package manifest creation tool in accordance with one described embodiment.

FIG. 11 shows an exemplary package manifest creation tool 1100 that is desirably implemented in software. In this specific example, the tool can take the following input parameters (some of which are optional):

- Extension directory
- File group information and DLL load dependencies (Optional)
- File usage statistics from scenario runs (Optional)

The extension directory input parameter specifies the directory containing all of the files that will be described by the package manifest. If this is the only parameter, then tool 1100 will generate a manifest in which the EDF and DLLs in the directory are listed in the "Required" set, and all other content is "Offline".

The file group information and load dependencies parameter is optional. If an extension author has an idea of the categories in which his or her files should be placed, the categories should be specified here. For example, the author of the template manifest shown below knows that he wants his error handling GIF to be included in the package's required set. His choices here will always be respected in the final manifest. Additionally, if the extension author knows of any DLL load dependencies, these should be specified here as well.

```
<?xml version="1.0"?>
<Package>
  <Files>
    <Group Name= "required">
      <File Name = "bar.dll"/>
      <File Name = "foo.dll"/>
        <Dependencies>
          <File Name= "bar.dll"/>
        </Dependencies>
      </File>
      <File Name= "myextension.edf"/>
      <File Name= "errorhandling.gif">
    </Group> . . .
  </Files>
</Package>
```

The file usage statistics from scenario runs parameter is an optional parameter. This parameter enables the file download priority to be determined based on scenario runs. A scenario is a script of tasks that the average user typically follows when using a product during a particular portion of product use. For example, one scenario might pertain to the tasks involved in sending an email message (i.e. click "new mail" button, type in "TO" well, type is "Subject" well, etc.). In the described embodiment, file usage statistics from scenario runs are collected from running IIS logs on various scenarios. The different scenarios are directed to ensuring, with some degree of probabilistic support, that the file download order reflects, in some way, the files that will likely be used by the user first.

It will be appreciated that the file usage statistics can be provided dynamically by building a knowledge base that describes the actual tasks that people typically accomplish. The information that is maintained in the knowledge base can then be used to generate and adapt download scenarios that actually conform to patterns that are established across a user base.

If extension writers want to pass the package manifest creation tool 1100 this information, they need to specify the log directory, as well as the start and end dates of the section of the log that the tool should analyze. For third parties, the download priority order within a group will be the order in which the group's files were requested in the logs across all scenarios.

In one implementation, the approach is somewhat more sophisticated. Additional information (in addition to the scripted steps) is stored in the IIS logs and includes scenario priority and checkpoints. The scenario priority is a priority that is assigned for each scenario. So, for example, if one scenario is ten times more important than another scenario, this information can be maintained. The priority (e.g. a rating from between 1 to 100, with 100 being the highest priority), should be equal to a best guess as to the percentage of the time that users will step through the scenario, assuming they use the extension at all. Checkpoints provide a way to separate one scenario from another. For example, checkpoints designated as "Offline" and "Shutdown" can be automatically added at the beginning and end of the scenarios, respectively, so there can be a differentiation between scenario runs in the log. Additionally, script authors can optionally use checkpoints mid-scenario to indicate a change in group priority, e.g. part of a scenario script could be labeled as an "On demand" feature and another part could be labeled as "Offline".

Figure 12:
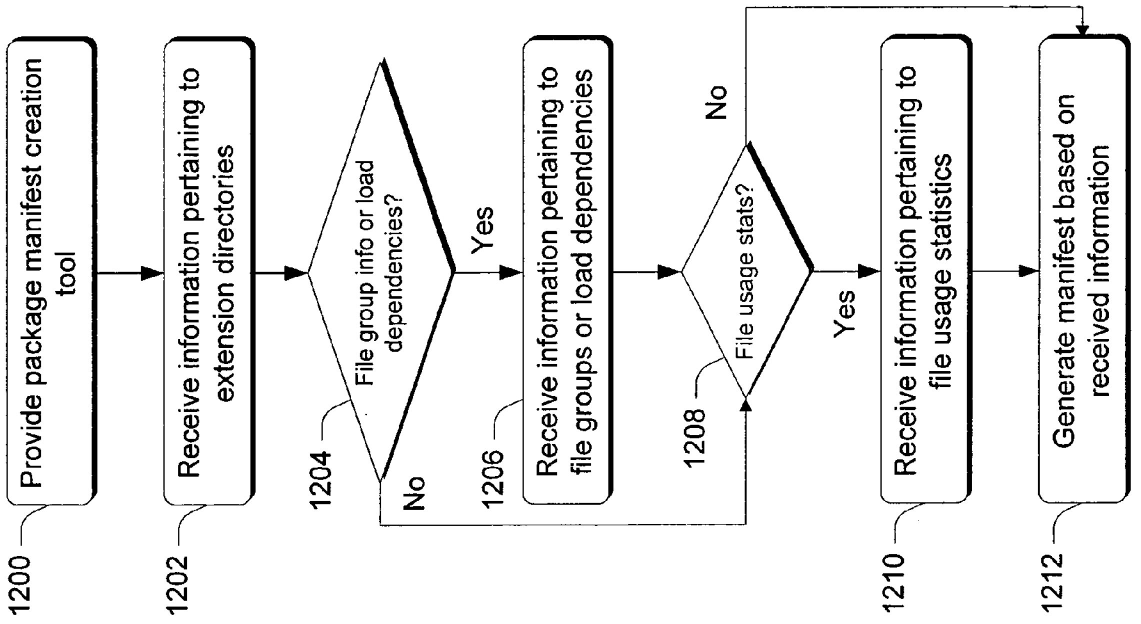
FIG. 12 is a flow diagram that describes steps in a method in accordance with one described embodiment.

FIG. 12 is a flow diagram that describes steps in a package manifest creation method in accordance with the described example. The method can be implemented in any suitable hardware, software, firmware or combination thereof. In the described example, various steps of the method are implemented by a manifest creation tool that is implemented in software.

Step 1200 provides a package manifest creation tool. This tool can be a software tool that resides on an extension author's machine. Step 1202 receives information pertaining to an extension directory as a first input parameter. Step determines whether there is any file group information or load dependency information provided by the extension author. If there is, step 1206 receives the information as an input parameter. Step 1208 determines whether there is any file usage statistic information. Such information can be provided, in one embodiment, through the use of scenario runs as described above. If such information is provided, then step 1210 receives the information as an input parameter. Step 1212 then uses all of the information provided as input parameters to generate a manifest automatically.

Exemplary File Ordering Heuristics Based on File Usage Statistics

Figure 13:
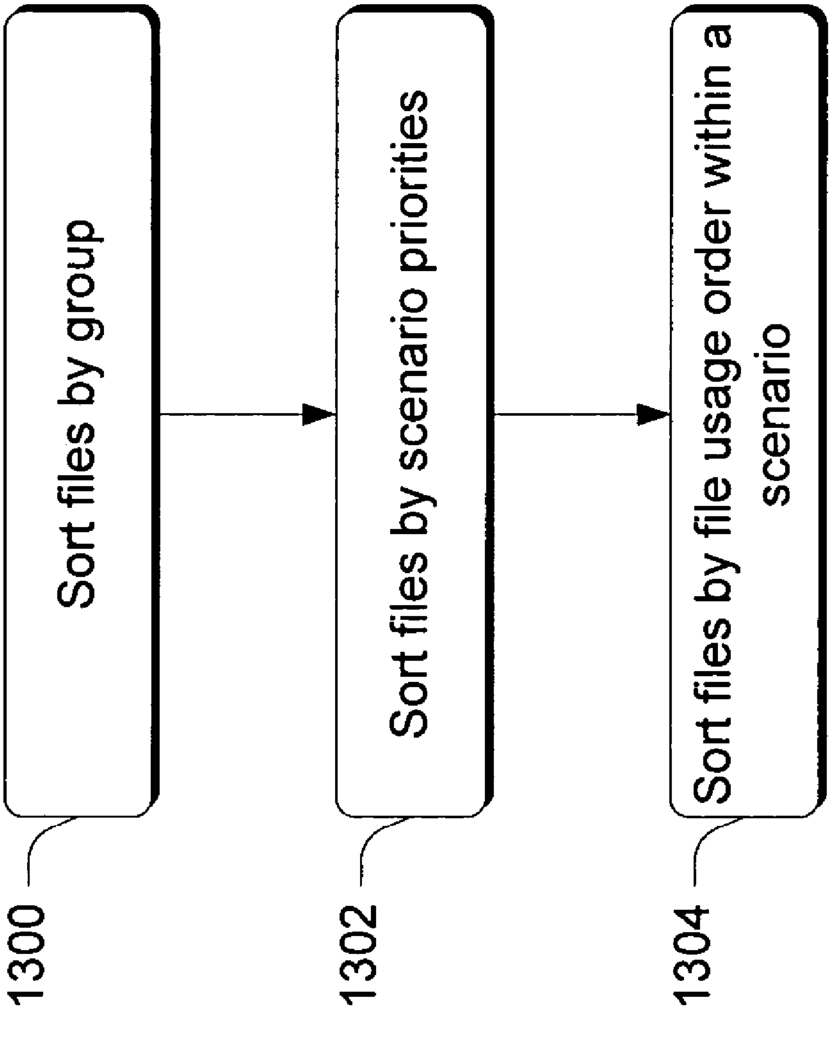
FIG. 13 is a flow diagram that describes steps in a method in accordance with one described embodiment.

FIG. 13 is a flow diagram that describes but one exemplary file ordering or sorting heuristic in accordance with the described embodiment. It is to be understood that this specific example constitutes but one way of ordering files for download. Accordingly, other heuristics can be used without departing from the spirit and scope of the claimed subject matter.

Step 1300 sorts files by file group. Recall that in the illustrated example above, files can be grouped in one of four possible groups: Required, Offline, On Demand and Online Only. A file's group is determined first by the manifest, and, if it does not provide any group information, then by the highest priority group that it uses, according to checkpoint information in the log. Files in the "Required" set should not be considered because their order is already known. If no group information is included about a file, then an assumption is made that the EDF and all DLLs are "Required" files and all other files in the directory are "Offline".

Consider, for example, the following initial file usage information for three different scenarios:

Scenario 1 file usage: 1) FileA.gif, 2) FileB.xml, 3) FileE.dll

Scenario 2 file usage: 1) FileC.xml, 2) FileA.gif

Scenario 3 file usage: 1) File D.js, 2) FileA.gif

Scenario 1=priority 80

Scenario 2=priority 80

Scenario 3=priority 40

In this example, there are three scenarios that have files associated with them. Each of the scenarios has a priority with which it is associated. The files are first sorted by group (step 1300). Recall that in this ordering heuristic, DLLs are "Required" and all other files are considered "Offline". This provides the following sorted files:

Required Files

FileE

Offline Files

FileA, FileB, FileC, File D

Step 1302 sorts files based on scenario priorities (from highest to lowest). Higher priority files are ordered so that they are downloaded first. This step provides the following sorted files:

Required Files

FileE

Offline Files

Priority 80 group: files used by Scenarios 1 & 2=File A, File B, and File C

Priority 40 group: files used by Scenario 3 (that are not already listed)=File D.

Step 1304 then sorts the files by file usage order within a scenario run. For each priority grouping with more than one file, the files are sorted according to the average order in which they were downloaded within scenarios of their labeled priority. Scenarios with a smaller average usage order will be downloaded earlier. Ties are broken based on the order in which the scenarios appear in the input file. As an example, consider the following:

File A: average order=(Scenario 1 order+Scenario 2 order)/2=(1+2)/2=1.5.

File B: average order=(Scenario 1 order)/1=(2)/1=2.

File C: average order=(Scenario 2 order)/1=(1)/1=1.

Here, file A got used first by scenario 1 and second by scenario 2 for an average of 1.5, and so one. File C has the smallest order number so, of the Offline files, it is sent first. The final file order is shown below:

Required Files

FileE

Offline Files

FileC, FileA, FileB, File D

Code, Components and "Bits"

The following files and resources can be, but need not be included with an extension. This list is not exclusive, as other resources can certainly be incorporated into an extension.

Customized UI and keyboard shortcuts

Components and Behaviors

XML browsing and editing components (including XSL and business logic objects)

Static pages or other resources

Third-party defined custom content

Users install extensions by navigating to a network site for the extension. In an Internet implementation, the user navigates to an appropriate URL for the extension. Hosting administrators can also "push" extensions so that users can automatically receive them by adding an entry into the appropriate users' "Preference" settings.

Platform Set Up and Extension Installation

Figure 14:
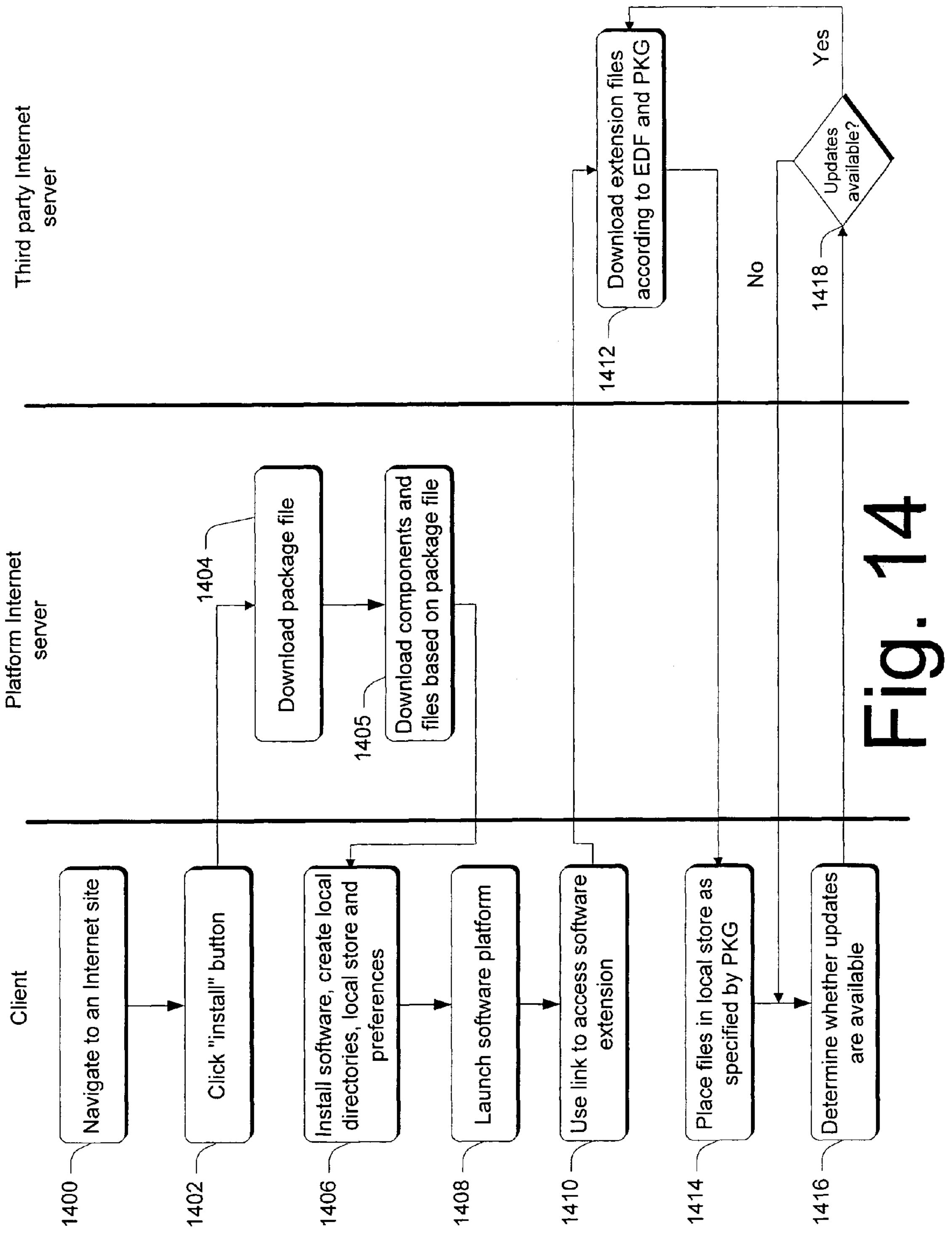
FIG. 14 is a flow diagram of steps in a method in accordance with the described embodiment.

FIG. 14 is a flow diagram that describes exemplary steps in a set up and extension installation process in accordance with the described embodiment. This example describes an Internet-based example. In the illustrated example, various extensions are maintained at or accessible through various Internet sites. The extensions are deliverable via the Internet to a client. It will be appreciated that the illustrated division of computers may not necessarily exist at all. For example, all of the functionality embodied by the computers may reside on one machine, or the extension may be local, or the platform and the extensions may be on the same machine, etc.

The flow diagram, in this example, is illustrated in connection with three separate "zones", one of which represents a client, one of which represents a "platform" Internet server, and one of which represents a third party Internet server. The acts that are described in connection with the different zones are performed, in this example, by the entities assigned to the zone. In some configurations, one or more of these zones may overlap. For instance, the platform server may be the same device as the extension server.

Step 1400 navigates a user to a particular Internet site that is associated with the software platform that is to be utilized as the foundation for extension installation described below. In step 1402, the user clicks an "install" button that sends a message to the software platform server that indicates that a user wishes to install the software platform. This step can be an optional step. Steps 1404 and 1405 then download the software associated with the software platform to the client. In the illustrated example, step 1404 downloads the package file for the single navigable window application and based on that file's contents step 1405 downloads other components and files to the user's computer. Step 1406 installs the software code on the client machine and can create local directories for the application cache, a local store and preferences. It will be appreciated, however, that local directories or preferences are not necessarily needed. Step 1408 launches the software platform.

The steps described immediately above constitute steps associated with an initial set up in which the software code for the single navigable window application is delivered to and installed on a client machine. The steps described immediately below are associated with extension installation.

Step 1410 uses a link that is associated with an extension to access the extension. This step can be implemented by a user navigating their browser to a particular Internet site through which one or more extensions can be accessed. Alternately, a reference to the link can be placed in the user's preferences or the preferences of a computing group with which the user is associated (e.g. the system administrator can place a reference in a group's preferences). The link can advantageously be associated with a third party Internet server or Internet site. Step 1412 downloads extension files according to the PKG associated with an EDF. The files are delivered to the client and step 1414 places the extension files in a local store as specified by the PKG specification. At this point, an extension is installed and the user can utilize the functionality provided by the extension. Step 1416 determines whether extension updates are available. This can be done by periodically polling an extension catalog (discussed in an "Extension Catalog" section below) to ascertain whether there are any updates to various extensions. Alternately, notifications might be automatically sent to the client so that the client is aware of updates or any other method might be used to determine if updates are available. If there are updates available, step 1418 branches to step 1412 which downloads the extension files associated with the update and installs them on the client.

Developing Extensions

Developing extensions for the software platform is a fairly straight-forward process. A developer develops the extension content using a tool such as Notepad or other tools such as Visual Studio. The extension is then described in an EDF and PKG and the PKG is digitally-signed and then optionally compressed. The extension can then be hosted on a particular network server.

FIG. 15 is a flow diagram that describes steps in an extension development method in accordance with the described embodiment. One or more of these steps can be performed by a software developer or organization that creates a particular extension. Some of the steps are implemented in software. Step 1500 develops an extension. Any suitable tools can be used to develop the extension. Step 1502 then creates an extension definition file (EDF) for the extension. The EDF, in this example, is defined using XML as discussed above. Other formats can, of course, be used to describe the EDF. Step 1504 creates a package manifest (PKG) for the extension. The PKG, in this example, is defined using XML as discussed above. Step 1506 then hosts the EDF and PKG on a network server such as an Internet server. Additionally, the associated extension files that are described in the PKG can also be hosted by the network or Internet server (step 1508). Having accomplished the above, users can now navigate to an EDF directly (using, for example, the associated URL or some other network address), which then installs the extension by caching any required files locally and placing a reference to the extension in the user's preferences.

Specifically, step 1510 delivers the EDF and PKG files to a client. This step can be implemented by a user navigating to a particular Internet site where the appropriate files are hosted and then downloading the files. Step 1512 delivers the extension files that are associated with the EDF and PKG files to the client, whereupon they can be installed and used.

Extension Catalog

One optimization, discussed briefly in connection with FIG. 14, is an extension or EDF catalog which provides an additional level of indirection to the EDF. An EDF catalog allows organizations to group extensions and provides a single place to determine when an extension changes. The desired extension can be automatically selected from the catalog by the software platform based upon the user's settings. The catalog can be queried to determine which extension is most appropriate for the user.

In the described embodiment, a catalog is an XML file that contains mappings from extension URNs to one or more package URNs based upon language, version or other attributes. Catalogs can, however, be defined using any suitable format. Catalogs can provide:

- The ability for a hosting organization to update version information for one or more hosted extensions in a single place
- Optional automatic indirection to correct version based upon user's settings. For instance, a catalog may list several versions of an extension for different languages. The catalog file can be processed to find the version of the extension that matches the user's language settings.
- Optional automatic upgrade to new versions of extensions as they become available Like EDFs, catalogs can be compressed and digitally signed to prevent tampering. By subscribing to a catalog in order to detect changes for one or more hosted extensions, the number of server pings required from the client (or notifications to the client) in order to discover extension updates can be reduced.

FIG. 16 shows an exemplary XML catalog structure. Entries in the catalog can be structured as follows:

| Attribute | Type | Required | Description |
|---|---|---|---|
| extensionURN | uri | Y | Identifier for an extension. There may be more than one entry for a given extension urn in a single catalog representing different versions, languages, etc. |
| name | String | N | Friendly name for an extension. |
| packageURN | uri | Y | Required urn for the package. Package urn corresponds to a discrete set of bits. It is different from the extension urn: For each user, the extension urn (name) corresponds to a specific set of files based upon language preferences and version. This means that, for shared machines, different users may have different extensionURN to packageURN maps based upon their preferences. |
| packageURL | uri | Y | url of the digitally signed compressed file containing the PKG file is required. |
| language | String | N | Language is an optional language specifier. |
| version | String | N | Version is an optional version specifier |
| defaultLanguage | String | N | DefaultLanguage is an optional attribute specifying the default language package. For a given version of an extension, there should be only one entry with DefaultLanguage attribute. |
| defaultVersion | String | N | DefaultVersion is an optional attribute specifying default version for an extension. For a given extension urn and language attribute there should be only one entry with DefaultVersion attribute. |

In this particular example:

- The default language of the netdocs-planner is the English version.
- The default English version is 1.1. The default French version is 1.0. If there is no version available in the user's specified language on the platform, they will get the English version 1.1 by default.
- The English version of netdocs-planner has been upgraded from V1 to V1.1.
- There is also a French version. The extension URN is the same as the English version. There is no 1.1 release for French yet, so 1.0 is the current version for French speaking users.
- A query against the catalog returns only the rows where language matches the user's language preferences. The query would also return all rows where language is the user's language or default='yes' and throw out duplicates for the same name.

Architecture

In the described embodiment, one of the aspects that provide desirable utility is the extensibility of the software platform. That is, third and fourth party developers are free to develop their own extensions which can then be used within the framework of the software platform. The extensions are integrated directly into the software so that the platform's functionality is modified by the extensions. Recall that in order to provide an extension, the developer simply authors the extension, describes their extension in an EDF and PKG, and then hosts the EDF, PKG, and associated files on a network server.

The EDF, as pointed out above, can be defined in an XML schema that includes a root node (i.e. the "extension" tag) and one or more child nodes. In this particular example, the child nodes generally correspond to the individual extension feature types that are desired for incorporation into the software platform. For example, recall that Tables 1-3 above describe various exemplary predefined feature types that can be added through an extension using the predefined XML schema.

Consider now a developer who wants to add two menus and a toolbar to the software platform. The menus and toolbar might be associated with a retail store that maintains a Web site for its customers. The retail store might want a customer who visits its Web site to be presented with a UI that is unique to the retail store and provides services that are specifically tailored to the store. To do this, the developer develops two different menus, one of which might be associated with displaying the most recent specials, and other of which might be associated with providing a search mechanism through which the user can search for specific products. The toolbar might contain specific buttons that are unique to the retail store. A simplified EDF called "retail.edf" for the retail store's extension is shown directly below:

```
<edf:extension name= "retail extension" urn= "extension.retail.com">
  <edf:menus>
    <edf:menu    url= "url1.htm"/>
    <edf:menu    url= "url2.htm"/>
  </edf:menus>
  <edf:toolbars>
    <edf:toolbar url= "url3.htm"/>
  </edf:toolbars>
</edf:/extension>
```

Here, the outer "extension" tag designates this XML file as an extension. The inner "menus" and "toolbars" tags are top level tags that designate that the information between these tags pertains respectively to menus and toolbars that correspond to the extensions that the developer has added. The boldface "menu" and "toolbar" tags describe data pertaining to the actual extension and contain a URL that is associated with each extension as described above. The EDF above logically describes the extensions that are being provided as including two menus and one tool bar.

Consider also that the above EDF can constitute but one of many EDFs that are loaded into the system. Each EDF can contain one or more top level tags, each of which is associated with one or more specific extensions that are to be added to the software platform.

Figure 17:
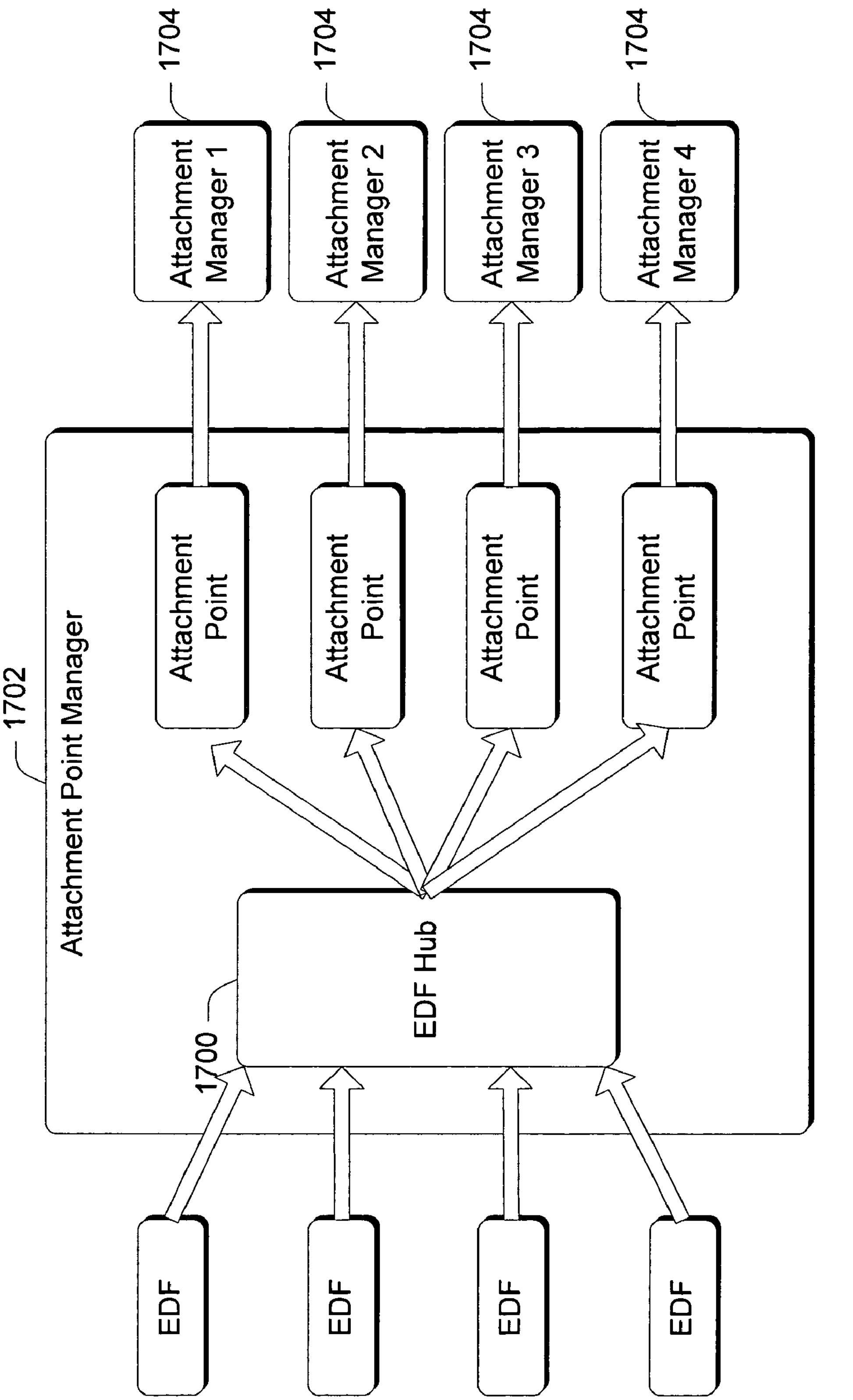
FIG. 17 is a block diagram of a software architecture in accordance with the described embodiment.

FIG. 17 is a block diagram of an exemplary software architecture that is configured to process multiple different EDFs so that the software components that are responsible for incorporating each particular extension into the software platform receive the appropriate information that is specific to their extension. This example is specific to the XML implementation that is discussed throughout this document. It is to be understood that other architectures, similar in functionality to the one discussed below, can be used in other implementations without departing from the spirit and scope of the claimed subject matter.

Utility objects, herein referred to as attachment points, are used to process the information from the multiple EDFs. An attachment point is simply a collection of objects that fire events to registered listeners as objects are added to or removed from the collection. Many types of attachment points can be created, but all take data from a source (often another attachment point), process it (either dynamically or statically), and expose the results of their processing. Some of the simplest attachment points include:

An XML attachment point, which loads an XML file and exposes the top-level nodes of the XML as objects in its collection.

A filter attachment point, that connects to another attachment point and exposes only those objects from it that meet some criteria.

A merge attachment point, that connects to one or more other attachment points and exposes all of their objects as one, merged collection of objects.

In the illustrated example, the architecture includes a collection of one or more attachment points, including a funnel structure known as an EDFHub 1700, an attachment point manager 1702, and multiple attachment managers 1704. The EDFHub 1700 receives all of the EDFs and merges them together and exposes them as a single list. Other individual attachment points provide mechanisms that manipulate (including filter, merge and expand) the single list that is exposed by the EDFHub 1700. Whenever a new extension or EDF is added to or removed from the EDFHub, the various attachment points will see to it that the appropriate attachment manager(s) is notified. This is done by firing events to the appropriate attachment managers. The attachment point manager 1702 creates, destroys and manages the various attachment points in the system and allows easy reuse of identical attachment points.

For each top level tag (i.e. "menus" and "toolbars" tags), there is a corresponding attachment manager 1704 that uses data provided by the attachment points to incorporate a particular type of feature within the software platform. Each attachment manager requests a set of attachment points from the attachment point manager 1702. These manipulate the data exposed by the EDFHub 1700. In the illustrated example, the attachment points can be requested as a predicate chain that the attachment point manager uses to create and build a set of attachment points that operate on the data exposed by the EDFHub 1700.

Figure 18:
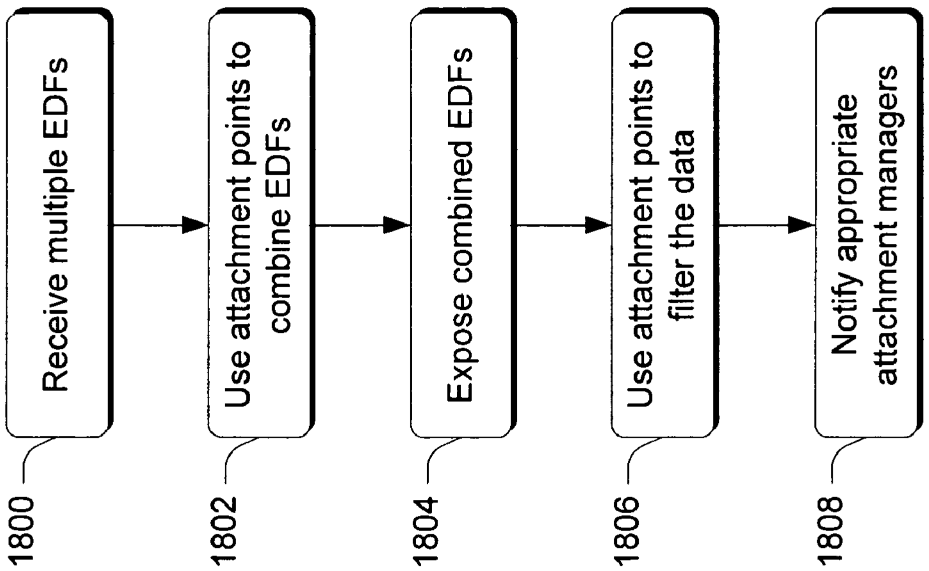
FIG. 18 is a flow diagram of steps in a method in accordance with the described embodiment.

FIG. 18 is a flow diagram that describes steps in a method in accordance with the described embodiment. The method is implemented in software and, in this example, by the software components of FIG. 17.

Step 1800 receives multiple EDFs. These files can be received in any suitable way. For example, a user can specify in their preferences particular extensions that they desire to be loaded when they are online. Alternately, a user might navigate using a link to a particular Internet site that recognizes that the user is executing a software platform that is configured to dynamically add the extensions. The EDFs, in this example, are funneled into the EDFHub 1700 which uses attachment points to combine the EDFs (step 1802). In this example, the EDFs are defined as XML files and the nodes are combined into one single XML list. Step 1804 exposes the combined EDFs. In this particular example, the EDFs are combined into a single XML list that is exposed to other various attachment points which then further manipulate that data (step 1806). One goal of the attachment points is to avoid having the attachment managers 1704 re-query the whole system every time an extension gets added or removed from the system. Thus, if an extension gets added or removed, the attachment points ensure that only the appropriate attachment manager 1704 is notified of the specific additions or deletions of the extension. For example, if an EDF indicates the addition of a menu, then only the attachment manager associated with menus is notified. Accordingly, step 1808 notifies the appropriate attachment manager of any new data that matches the attachment managers requirements.

Attachment Points and the Attachment Point Manager

Attachment points are objects that expose collections of ordered objects and fire notifications when new objects are inserted or deleted. In the exemplary system, the objects are XML nodes, but they could be any type of object. Although there are many types of attachment points, they all follow a similar process:

1) Initially attach to one or more data sources. These could be files or, commonly, other attachment points.
2) Process the data based on some logic. Usually the logic is quite simple and could involve something like filtering the objects based on some criteria.
3) Expose the results of the processing step 2 in a new collection of objects.
4) Fire events to indicate how the exposed collection of objects changed (OnInserted(index, count) or OnRemoved(index, count).
5) Optionally, continue to listen for changes in the data sources and repeat step 2-4 when changes occur.

Alone, each attachment point is quite simple, but when different types of attachment points are combined to form "chains", where one attachment point processes data from a second attachment point, the processing can be quite powerful. This is especially true if the attachment points only process the changed data in step 2, since they only do a small amount of simple work at any one time. In the exemplary system, this incremental processing means that the whole system does not have to be re-queried when a new extension is installed or when an existing extension is removed. Additionally, each attachment manager in the exemplary system uses a specific chain of attachment points and so is only informed of changes that impact its area of extensibility.

The attachment point manager performs two important functions when building chains of attachment points. First, it allows the chains to be described as predicate strings. The attachment point manager interprets these strings and builds the required chain of attachment points. Second, it allows the reuse of identical attachment points, which makes the system more efficient. As the attachment point manager creates each chain of attachment points, it tracks which predicate string corresponds to which attachment point. If that predicate string is later requested again, it simply reuses the existing attachment point without creating a new one.

As an example, consider that the attachment manager associated with menus has requested the following predicate chain of attachment points that utilizes the retail.edf file above: (Note: this example does not assume the presence of an EDFHub attachment point).

Explode(Filter("menus", Explode (URL ("retail.edf"))))

This string represents all of the menus in the retail.edf file. The XML file located at retail.edf is loaded by the URL attachment point which exposes the root node of the XML file as the only object in its collection. The inner Explode attachment point uses the URL attachment point as its data source and exposes all of the children of the objects in that source collection. In this case, the children of the root node are the top level XML tags "menu" and "toolbars". The Filter attachment point uses the Explode attachment point as its data source and filters the exposed objects looking only for the nodes that are "menus". The outer Explode attachment point uses the Filter attachment point as its data source and exposes all of the children of the filtered menu nodes to provide a list containing the two menus that are added by the extension. Since this particular XML file contained menus that were identified by the attachment points associated with menu attachment manager, that attachment manager is then notified that two menus have been added by an extension.

Figure 19:
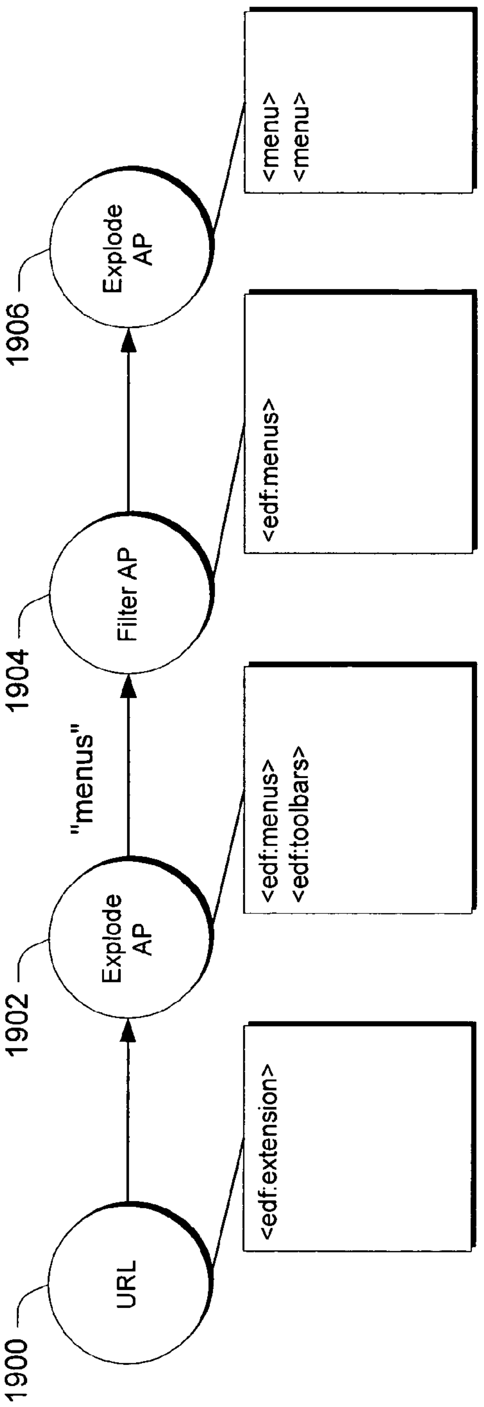
FIG. 19 is a diagram that illustrates one aspect of attachment point architecture in accordance with the described embodiment.

This process is diagrammatically illustrated in FIG. 19 which shows attachment points 1900, 1902, 1904, and 1906. Each attachment point exposes a list of XML nodes. URL attachment point 1900 takes an input (a URL to an XML file—e.g. retail.edf) and exposes a list of XML nodes. This list contains only the root node "<edf:extension>". Explode attachment point 1902 takes as an input attachment point 1900 and exposes a list of XML nodes which are children of source XML nodes. In this example, the list of XML nodes exposed by attachment point 1902 are the "<menus>" nodes and the "<toolbars>" nodes. The filter attachment point 1904 takes attachment point 1902 as an input and filters on "menus." It then exposes an XML list having only "<menus>" nodes in it. The explode attachment point 1906 takes attachment point 1904 as an input and exposes a list with the XML nodes that are contained in the "<menus>" nodes—here both of the "<menu>" nodes.

Consider additionally that the toolbar attachment manager would request a predicate chain of attachment points which would also use URL attachment point, an Explode attachment point and a filter attachment point 1904 that filters on "toolbars". Thus, the corresponding explode attachment point 1906 would expose an XML list containing only the "<toolbar>" node. But, the attachment point manager would detect the commonality of the URL attachment point and the inner Explode attachment point, so it would reuse the same attachment points it created for the menu attachment manager. The Filter attachment points used by the toolbar attachment manager and the menu attachment manager would use the same Explode attachment point as their data sources but would expose different collections of nodes, because they were filtering based on different criteria.

Figure 20:
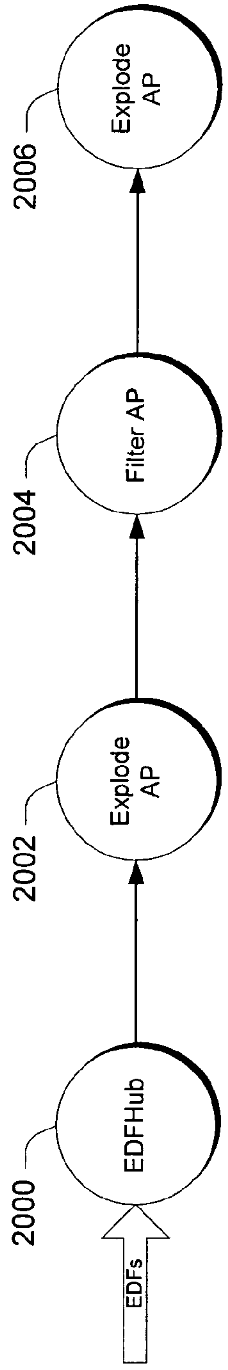
FIG. 20 is a diagram that illustrates one aspect of the FIG. 17 architecture.

Consider FIG. 20 which incorporates an EDFHub attachment point 2000. This attachment point receives all of the EDFs and, as discussed above, combines them into a single XML list. The EDFHub then exposes the root nodes of all of the EDFs. The explode attachment point 2002 then exposes an XML list that contains all of the top level nodes for all of the EDFs. As an example, there may be multiple EDFs that each contain top level menu nodes, toolbar nodes, accelerator nodes and the like. Explode attachment point 2002 exposes an XML list that contains all of these top level nodes for all of the EDFs. Filter attachment point 2004 can then filter the XML list exposed by the explode attachment point 2002 in accordance with any suitable parameters (i.e. filter on menu nodes, tool bar nodes, accelerator nodes and the like). The final explode attachment point 2006 then exposes a list of the individual children nodes of the list exposed by the filter attachment point 2004. This list describes all of the specific features (of the particular type that were filtered) that have been added by all of the EDFs.

The table below lists a number of different attachment points that can be utilized in accordance with this described embodiment but many more can easily be created.

| Attachment Point | Purpose |
|---|---|
| URL | Loads the URL and exposes the top level XML node as a member of the collection |
| Context | For every member, it gets the "expression" attribute and binds to it. If the expression evaluates to true, then the member is exposed. |
| EDF | Same as the URL AP, but also exposes a fabricated member with data to create an APP based on the URL and URN (which exists in the XML DOM). |
| Merge | Takes zero or more Attachment Points (of any type) and merges them together. The order and continuity of the original collections will be maintained. |
| Filter | Monitors a single Attachment Point and only exposes those nodes that match the specified name. The order of the original collection will be maintained. |
| Duplicate | Monitors a single Attachment Point and filters out any duplicates. A duplicate is defined to be having the same URN attribute. If no URN attribute is present then the node is exposed. Order of the original collection will be maintained. |
| Explode | Monitors a single Attachment Point and for every member exposes the children of that member as its members. The |

-continued

| Attachment Point | Purpose |
|---|---|
| | order of the original collection will be maintained as well as the order of the children within the nodes. |
| Link | Monitors a single Attachment Point and for every member looks for a URL attribute and creates a URL AP and merges it into itself. If the optional include Content is set to true, it will merge the original collection in as well. |
| Order | Monitors a single Attachment Point. For every member, it gets three attributes: id, before and after. Based on this information, it reorders the members as specified. If no ordering information is supplied, the order of the original collection will be maintained. |
| EDFHub | This Attachment Point is the central merge point that represents all the EDF points. |

CONCLUSION

The embodiments described above provide a platform solution that provides for customization and extensibility through a consistent and logical extensibility mechanism and object model that can be easily understood by third party developers. Internet-based downloads can be accomplished without a great deal of user intervention and without manipulating any user persisted settings. Extensions can be provided to a software platform or application program dynamically based upon the user's computing context.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:

one or more processors;

one or more computer-readable media;

computer-readable instructions on the one or more computer-readable media which, when executed by said one or more processors, cause said one or more processors to implement a method comprising:

describing one or more software extensions using descriptions, the extensions being configured for incorporation in a software platform executing on a client; and delivering the descriptions of the one or more extensions to the client via a network, the descriptions containing code for implementing, without downloading the extensions, at least part of a functionality of the extensions and being configured for use in downloading the software extensions via the network;

said acts of describing and delivering being configured to enable software to be delivered over the network, wherein delivery of the software is performed by delivering software files in accordance with a file download priority determined by scenario runs, wherein file usage statistics collected from the scenario runs and one or more priority levels associated with the scenario runs define a download order that reflects files that will likely be used by a user first.

2. The system of claim 1, wherein the network comprises the Internet.

3. The system of claim 1, wherein the descriptions comprise a tag-based, hierarchical language.

4. The system of claim 1, wherein the descriptions comprise XML descriptions.

5. The system of claim 1, wherein: the network comprises the Internet; and descriptions comprise XML descriptions.

6. The system of claim 1, wherein the software extensions are configured to make context-based changes in the operation of the software platform, the context-based changes being associated with the computing context of a user.

7. The system of claim 1, wherein the software platform is configured to provide a single application program having multiple different functionalities that can enable a user to accomplish multiple different tasks.

8. The system of claim 7, wherein the software extensions are configured to make context-based changes in the operation of one or more of the multiple different functionalities that change the manner in which a user can accomplish a task associated with a particular functionality.

9. The system of claim 1, wherein the software extensions provide user interface elements.

10. The system of claim 1, wherein the software extensions provide behaviors, components, or objects.

11. The system of claim 1, wherein the software extensions provide store elements.

12. The system of claim 1, wherein the software extensions provide user-defined elements.

13. The system of claim 1, wherein the software extensions provide one or more of the following:

user interface elements;

behaviors, components, or objects;

store elements; and user-defined elements.

14. The system of claim 1, wherein at least one extension provides an ability to add new points of extensibility.

15. The system of claim 1, wherein the describing of the one or more software extensions comprises describing the extensions using an extension description file (EDF) comprising an XML file that describes a logical attachment to the software platform.

16. The system of claim 1, wherein one or more of the descriptions contains an implementation of all of the functionality of an extension.

17. A system of managing network-based software extensions comprising:

one or more processors;

one or more computer-readable media;

computer-readable instructions on the one or more computer-readable media which, when executed by said one or more processors, cause said one or more processors to implement a method comprising:

grouping multiple software extension descriptions containing code for implementing, without downloading a software extension, at least part of a functionality of the software extension in a catalog in a network-accessible location to enable delivery of software via a network, the delivery of software performed by delivering software files in accordance with a file download priority determined by scenario runs;

accessing the network-accessible location;

querying the catalog to ascertain an extension description; and delivering the extension description to a computing device based on the catalog query, the delivered extension useful to update a software extension that is resident on the computing device.

18. The system of claim 17, wherein the method further comprises sending a notification to subscribers of said catalog responsive to one or more software extensions changing.

19. The system of claim 17, wherein the method further comprises querying the catalog based on a user's personal setting.

20. The system of claim 17, wherein the extension descriptions are defined in XML.

* * * * *